United States Patent
Ashizuka

(10) Patent No.: US 8,923,783 B2
(45) Date of Patent: Dec. 30, 2014

(54) TRANSMIT AND RECEIVE TRANSMISSION CIRCUITS COUPLED TO A COMMON ANTENNA FOR A WIRELESS COMMUNICATION DEVICE

(71) Applicant: Panasonic Corporation, Osaka (JP)

(72) Inventor: Tetsuya Ashizuka, Fukuoka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 14/053,733

(22) Filed: Oct. 15, 2013

(65) Prior Publication Data

US 2014/0120852 A1     May 1, 2014

(30) Foreign Application Priority Data

Oct. 30, 2012 (JP) .................................. 2012-239472
Feb. 25, 2013 (JP) .................................. 2013-034167
Mar. 28, 2013 (JP) .................................. 2013-070143

(51) Int. Cl.
*H04B 1/44* (2006.01)
*H01P 1/15* (2006.01)
*H04B 1/04* (2006.01)

(52) U.S. Cl.
CPC .................................. *H04B 1/0458* (2013.01)
USPC ................ 455/78; 455/83; 333/126; 333/176

(58) Field of Classification Search
CPC ........... H04B 1/44; H04B 1/0458; H01P 5/12
USPC ........................ 455/78, 83, 129; 333/126, 176
See application file for complete search history.

(56) References Cited

U.S. PATENT DOCUMENTS

| | | | |
|---|---|---|---|
| 6,633,206 B1 | 10/2003 | Kato | |
| 6,721,544 B1 * | 4/2004 | Franca-Neto | .................. 455/83 |
| 6,735,418 B1 | 5/2004 | MacNally et al. | |
| 6,766,149 B1 | 7/2004 | Hikita et al. | |
| 6,847,269 B2 | 1/2005 | Watanabe et al. | |
| 7,026,887 B2 | 4/2006 | Watanabe et al. | |
| 2002/0180556 A1 | 12/2002 | Watanabe et al. | |
| 2005/0077980 A1 | 4/2005 | Watanabe et al. | |
| 2006/0160501 A1 | 7/2006 | Mendolia et al. | |

(Continued)

FOREIGN PATENT DOCUMENTS

| | | |
|---|---|---|
| EP | 1014592 | 6/2000 |
| EP | 1024605 | 8/2000 |

(Continued)

OTHER PUBLICATIONS

English translation of Japanese Office Action to Japanese Patent Application No. 2012-239472. mail date is Dec. 11, 2012.

(Continued)

*Primary Examiner* — Blaine J Jackson
(74) *Attorney, Agent, or Firm* — Greenblum & Bernstein, P.L.C.

(57) ABSTRACT

Provided is a wireless communication device in which an antenna switch module is omitted. The wireless communication device includes a PA that amplifies a transmission signal, a transmission circuit that processes the amplified transmission signal, an antenna, and a control unit that alternately activates and deactivates the PA, the transmission circuit being configured to match an impedance between the transmission circuit and the antenna when the PA is activated, and to put an impedance as seen from the antenna toward the transmission circuit when the PA is deactivated in a high impedance state.

19 Claims, 38 Drawing Sheets

(56) References Cited

U.S. PATENT DOCUMENTS

| | | |
|---|---|---|
| 2007/0099583 A1 | 5/2007 | Vaisanen |
| 2007/0142014 A1 | 6/2007 | Wilcox |
| 2007/0197180 A1 | 8/2007 | McKinzie, III et al. |
| 2007/0232249 A1 | 10/2007 | Kwon et al. |
| 2007/0262829 A1 | 11/2007 | Chominski |
| 2008/0125061 A1 | 5/2008 | Kuriyama et al. |
| 2009/0253385 A1 | 10/2009 | Dent et al. |
| 2010/0188169 A1 | 7/2010 | Hossain et al. |

FOREIGN PATENT DOCUMENTS

| | | | | |
|---|---|---|---|---|
| EP | 1187357 | 3/2002 | | |
| EP | 1843477 | 10/2007 | | |
| JP | 11-112253 | 4/1999 | | |
| JP | 2002-290257 | 10/2002 | | |
| JP | 2004-166185 | 6/2004 | | |
| JP | 2004-235815 | 8/2004 | | |
| JP | 2004-343517 | 12/2004 | | |
| JP | 2004343517 | * 12/2004 | ................ | H01P 1/15 |
| JP | 2005-354502 | 12/2005 | | |
| JP | 2007-028459 | 2/2007 | | |
| JP | 2010-057204 | 3/2010 | | |
| JP | 2010-246154 | 10/2010 | | |
| JP | 2011-199725 | 10/2011 | | |
| JP | 2011-211589 | 10/2011 | | |
| WO | 00/72457 | 11/2000 | | |
| WO | 2009/019795 | 2/2009 | | |

OTHER PUBLICATIONS

European Search Report, mail date is Feb. 21, 2014.

* cited by examiner

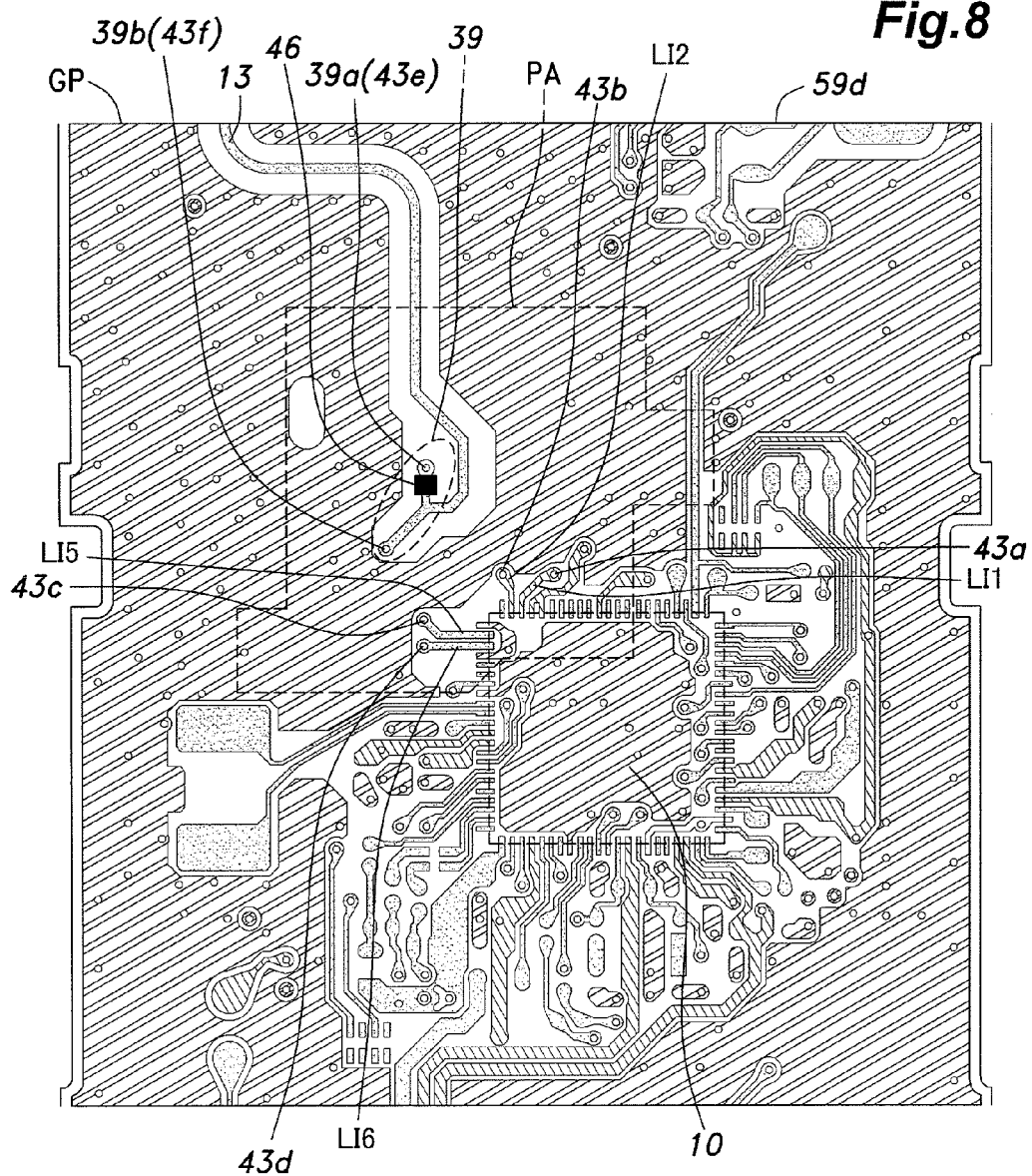

impedance chart admittance chart immittance chart

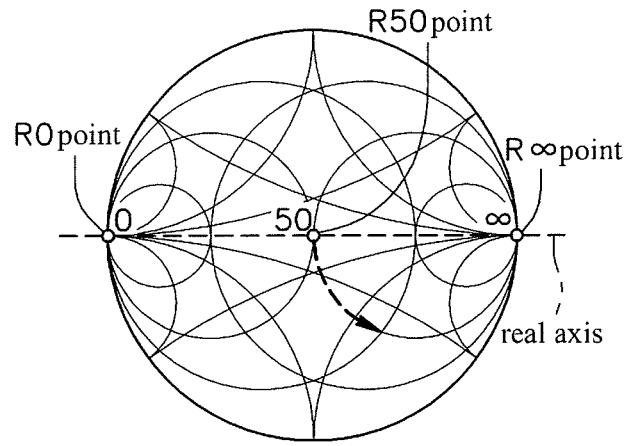
Capacitor is added in series with 50 Ω load
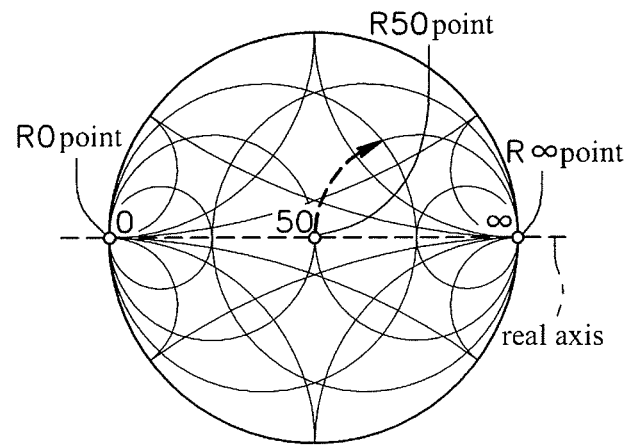
Indoctor is added in series with 50 Ω load Capacitor is added in parallel with 50 Ω load Inductor is added in parallel with 50 Ω load Transmission line is connected to certain impedance load

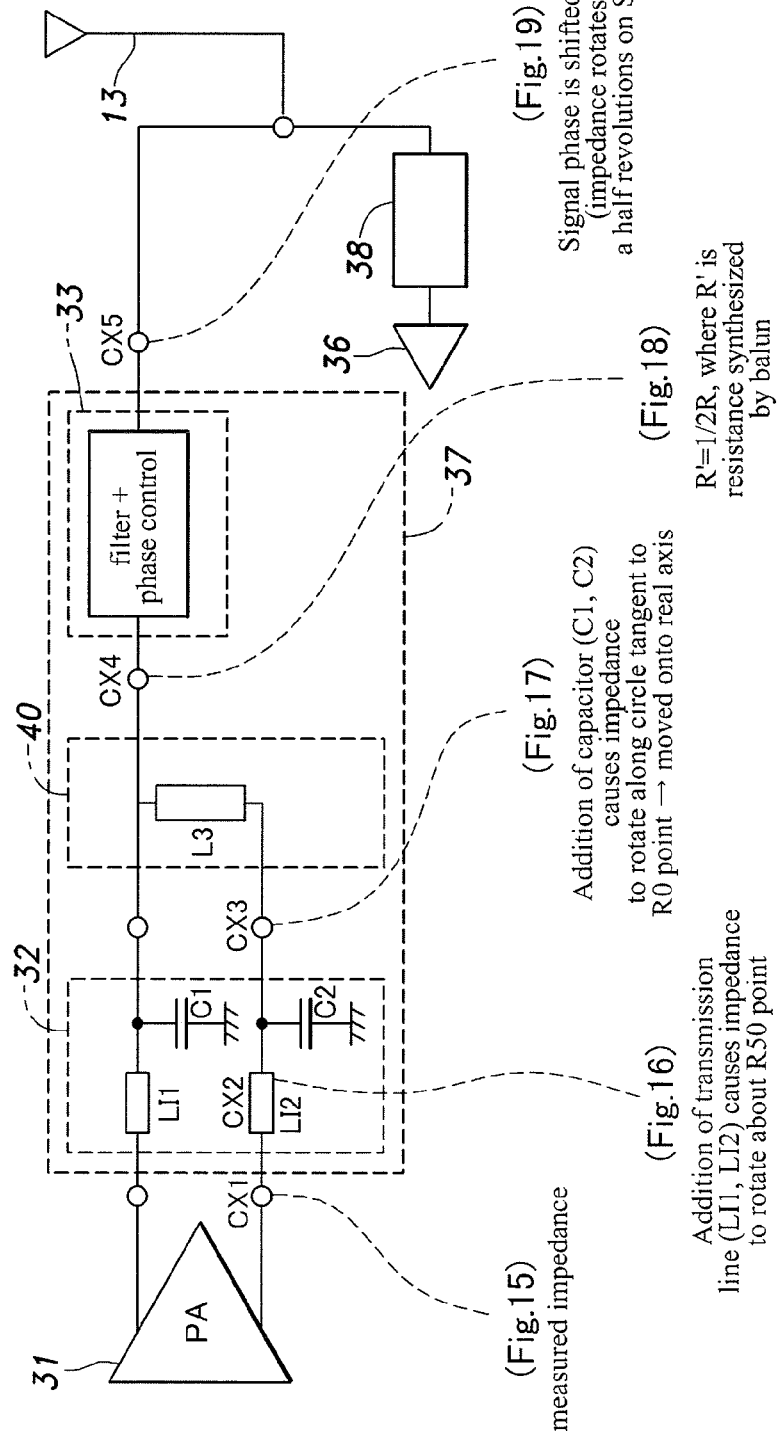

○ impedance when PA is ON
⊘ impedance when PA is OFF

○ impedance when PA is ON (after shifting)
⊘ impedance when PA is OFF (after shifting)
◌ impedance when PA is ON (before shifting)
▨ impedance when PA is OFF (before shifting)

○ impedance when PA is ON (after shifting)
⊘ impedance when PA is OFF (after shifting)
◌ impedance when PA is ON (before shifting)
▦ impedance when PA is OFF (before shifting)

○ impedance when PA is ON (after shifting)
⊘ impedance when PA is OFF (after shifting)
⊙ impedance when PA is ON (before shifting)
▨ impedance when PA is OFF (before shifting)

○ impedance when PA is ON (after shifting)
⊘ impedance when PA is OFF (after shifting)
◌ impedance when PA is ON (before shifting)
▨ impedance when PA is OFF (before shifting)

during transmission (PA is ON and LNA is OFF)

during reception (PA is OFF and LNA is ON)

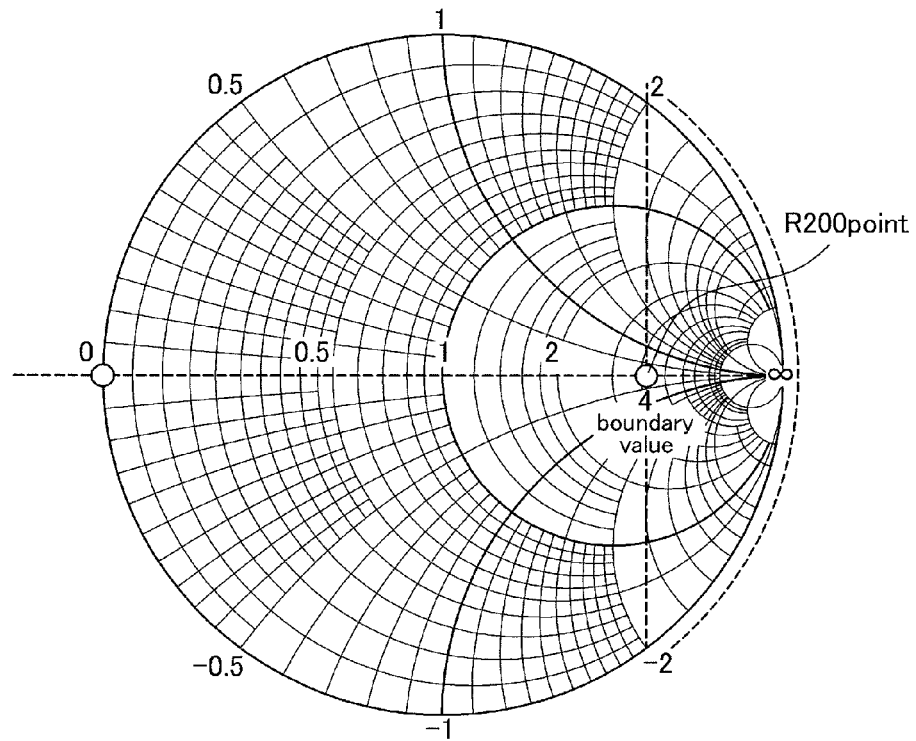
*Fig.21a*
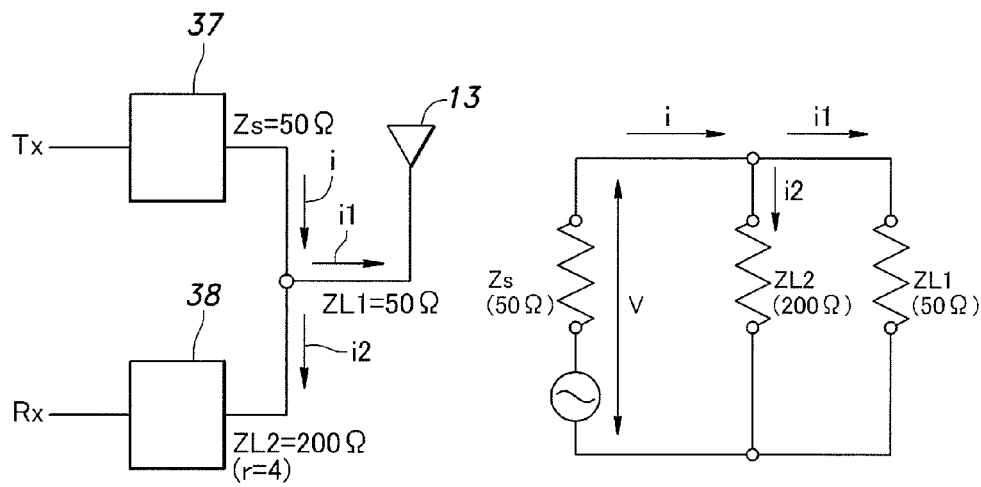
*Fig.21b*  *Fig.21c*

◉ impedance when PA is ON (after shifting)

◐ impedance when PA is OFF (after shifting)

◌ impedance when PA is ON (before shifting)

◐ impedance when PA is OFF (before shifting)

◉ impedance when PA is ON (after shifting)
⊘ impedance when PA is OFF (after shifting)
◉ impedance when PA is ON (before shifting)
⊘ impedance when PA is OFF (before shifting)

⬤ impedance when PA is ON (after shifting)
◐ impedance when PA is OFF (after shifting)
⬤ impedance when PA is ON (before shifting)
◐ impedance when PA is OFF (before shifting)

- impedance when LNA is ON (after shifting)
- impedance when LNA is OFF (after shifting)
- impedance when LNA is ON (before shifting)
- impedance when LNA is OFF (before shifting)

⬤ impedance when LNA is ON (after shifting)

⊘ impedance when LNA is OFF (after shifting)

⬤ impedance when LNA is ON (before shifting)

⊘ impedance when LNA is OFF (before shifting)

◉ impedance when LNA is ON (after shifting)
⦸ impedance when LNA is OFF (after shifting)
◌ impedance when LNA is ON (before shifting)
⦸ impedance when LNA is OFF (before shifting)

- impedance when PA is ON (after shifting)
- impedance when PA is OFF (after shifting)
- impedance when PA is ON (before shifting)
- impedance when PA is OFF (before shifting)

- impedance when PA is ON (after shifting)
- impedance when PA is OFF (after shifting)
- impedance when PA is ON (before shifting)
- impedance when PA is OFF (before shifting)

TRANSMIT AND RECEIVE TRANSMISSION CIRCUITS COUPLED TO A COMMON ANTENNA FOR A WIRELESS COMMUNICATION DEVICE

BACKGROUND OF THE INVENTION

1. Field of the Invention

The present invention relates to wireless communication devices, such as mobile information terminals, having wireless transmission and reception functions and used in wireless communication systems, such as a cordless telephone system, a PHS (Personal Handy-phone System), a WLAN (Wireless Local Area Network) and so on.

2. Description of the Related Art

Wireless communication systems such as a wireless telephone system, in which voice signals and other data are communicated between a base unit and a handset, are conventionally known. It has been proposed to constitute a front-end module for a wireless communication device used in such a wireless communication system, such that the front-end module includes a transmission circuit connected to a power amplifier (PA), a reception circuit connected to a low noise amplifier (LNA), and an antenna switch module (ASM) that switches the connection between an antenna and the transmission/reception circuits in a time divisional manner (see JP2002-290257A, for example). In a wireless communication device equipped with such a front-end module, it is possible to perform transmission and reception substantially at the same time by operating the antenna switch module at a high speed.

However, the antenna switch module can consume several tens of percent of electric power when in operation, and therefore, attempts have been made to allow transmission and reception to be performed without use of the antenna switch module, thereby to reduce the power consumption and/or the number of component parts to lower the cost. For example, there have been disclosed a technology in which the output end of the power amplifier is disconnected from both the power source line and the ground during signal reception so as to put the output end of the power amplifier in a high impedance state (JP2007-028459A), a technology in which a first phase shift line is provided between the power amplifier and the antenna and a second phase shift line is provided between the antenna and the low noise amplifier such that the impedance of the power amplifier as seen from the antenna is put in a substantially open state when the power supply to the power amplifier is shut off, and the impedance of the low noise amplifier as seen from the antenna is put in a substantially open state when the power supply to the low noise amplifier is shut off (JP2004-343517A), and a technology in which a phase shift circuit formed of a low-pass filter is used to adjust the phase shift angle so as to shift the impedance of the amplifier when the amplifier is not in operation from a substantially short-circuit state to a substantially open state (JP2010-057204A).

However, in the structure disclosed in JP2007-028459A, though the antenna switch module is omitted, a switch for disconnecting the output end of the power amplifier from the power source line is included instead of the antenna switch module.

Further, in the structure disclosed in JP2007-028459A, the output end of the power amplifier is put in a high impedance state during signal reception. However, there is a transmission impedance conversion circuit provided between the antenna and the power amplifier, and therefore, the signal received by the antenna during signal reception can flow to the transmission impedance conversion circuit. Thus, the structure disclosed in JP2007-028459A merely puts the output end of the power amplifier in a high impedance state, and does not put the impedance of the transmission circuit (here, the transmission impedance conversion circuit) as seen from the antenna in a high impedance state.

Consequently, there are problems such as increase in the power consumption due to operation of the switch, increase in the number of component parts and/or the circuit scale due to the presence of the switch, and degradation in performance in signal reception.

It is described in JP2004-343517A that addition of phase shift lines can cause the power amplifier to shift to a high impedance state for a reception band when the power supply to the power amplifier is shut off, and cause the low noise amplifier to shift to a high impedance state for a transmission band when the power supply to the low noise amplifier is shut off. However, according to the technology disclosed in JP2004-343517A, such an effect can be achieved only when a specific prerequisite is met. Namely, it is required that the power amplifier and the low noise amplifier exhibit an impedance consisting of a substantially pure reactance component and a reflection coefficient larger than or equal to 0.8 for the reception and transmission bands, respectively, when the power supply there to is shut off. Thus, the technology disclosed in JP2004-343517A has a problem in view of versatility, in that the power amplifiers and low noise amplifiers to which the technology is applicable are limited.

Further, it is described in JP2010-057204A that a phase shift circuit may be used to adjust the phase shift angle of the impedance of the amplifier when the amplifier is not in operation so as to shift the impedance from a short-circuit state to an open state. However, similarly to the technology disclosed in JP2004-343517A, the technology disclosed in JP2010-057204A also has a problem in versatility since the power amplifiers and low noise amplifiers that can be brought into a high impedance state by simply adjusting the phase shift angle are limited.

SUMMARY OF THE INVENTION

A wireless communication device according to an embodiment of the present invention includes: a first amplifier that amplifies a transmission signal; a transmission circuit that processes the transmission signal amplified by the first amplifier; an antenna that transmits the transmission signal processed by the transmission circuit; and a control unit that alternately activates and deactivates the first amplifier, wherein, provided that an impedance as seen from the antenna toward the transmission circuit when the first amplifier is activated by the control unit is denoted by ZonT and an impedance as seen from the antenna toward the transmission circuit when the first amplifier is deactivated by the control unit is denoted by ZoffT, the transmission circuit includes: a first impedance matching circuit that shifts ZonT and ZoffT such that ZonT matches an impedance of the antenna and an absolute value of a voltage reflection coefficient r corresponding to ZoffT increases; and a first phase adjustment circuit that further shifts ZoffT to a high impedance state. Such a structure provides a wireless communication device that enables an antenna switch module to be omitted.

BRIEF DESCRIPTION OF THE DRAWINGS

Now the present invention is described in the following in terms of preferred embodiments thereof with reference to the appended drawings, in which:

FIG. 8 is an explanatory diagram showing a signal processing unit and its peripheral circuit implemented on a board;

FIGS. 12a and 12b are explanatory diagrams each showing a trajectory of an impedance (admittance) on an immittance chart when a certain parameter(s) of an element(s) forming a high-frequency circuit is varied;

FIG. 14 is a block diagram schematically showing a transmission circuit;

FIG. 21a is an explanatory diagram for explaining a high impedance state on a Smith chart, FIG. 21b is an explanatory diagram showing a current flow in a high impedance state, and FIG. 21c shows an equivalent circuit of the state shown in FIG. 21b;

DESCRIPTION OF THE EMBODIMENTS (First Embodiment)

In the following, a first embodiment of the present invention will be described with reference to FIG. 1 to FIG. 22.

First, with reference to FIG. 1a and FIG. 1b, explanation will be given of a base unit 100 and a handset 200 of a wireless communication system according to the first embodiment.

In the first embodiment, explanation will be made taking as an example a digital cordless telephone system basically conforming to DECT (Digital Enhanced Cordless Telecommunications). DECT is a standard of digital cordless telephone systems established in 2011, and a frequency range of 1.9 GHz band (1,895,616 KHz to 1,902,528 KHz), and TDMA (Time Division Multiple Access)-WB as a communication method. It is said that DECT can reduce communication failure caused by radio wave interference with other devices and the 1.9 GHz frequency used in DECT does not interfere with a wireless LAN or a microwave oven, and therefore, DECT can maintain the quality of communication of a facsimile, telephone or the like. Further, DECT is known as a communication method that enables a wideband voice/data communication, in which the state of use of frequency channels is monitored at all times, so that the device itself can select an optimum channel, whereby frequencies can be used efficiently.

It is to be noted that a characteristic structure of a later-described wireless unit 12 may be applicable not only to wireless communication devices of the DECT type, but also to wireless communication devices of another type. For example, the structure may be applicable to various wireless communication devices of GSM (registered trademark) (Global System for Mobile Communications) type which is used worldwide, where such devices may include mobile phones, smartphones, PHS telephones, WLAN devices, mobile information terminals (which may be a tablet type) or the like. The structure may also be applicable to car phones, mobile phones or the like of DCS (Digital Cellular System) type.

Figures 1A, 1B:
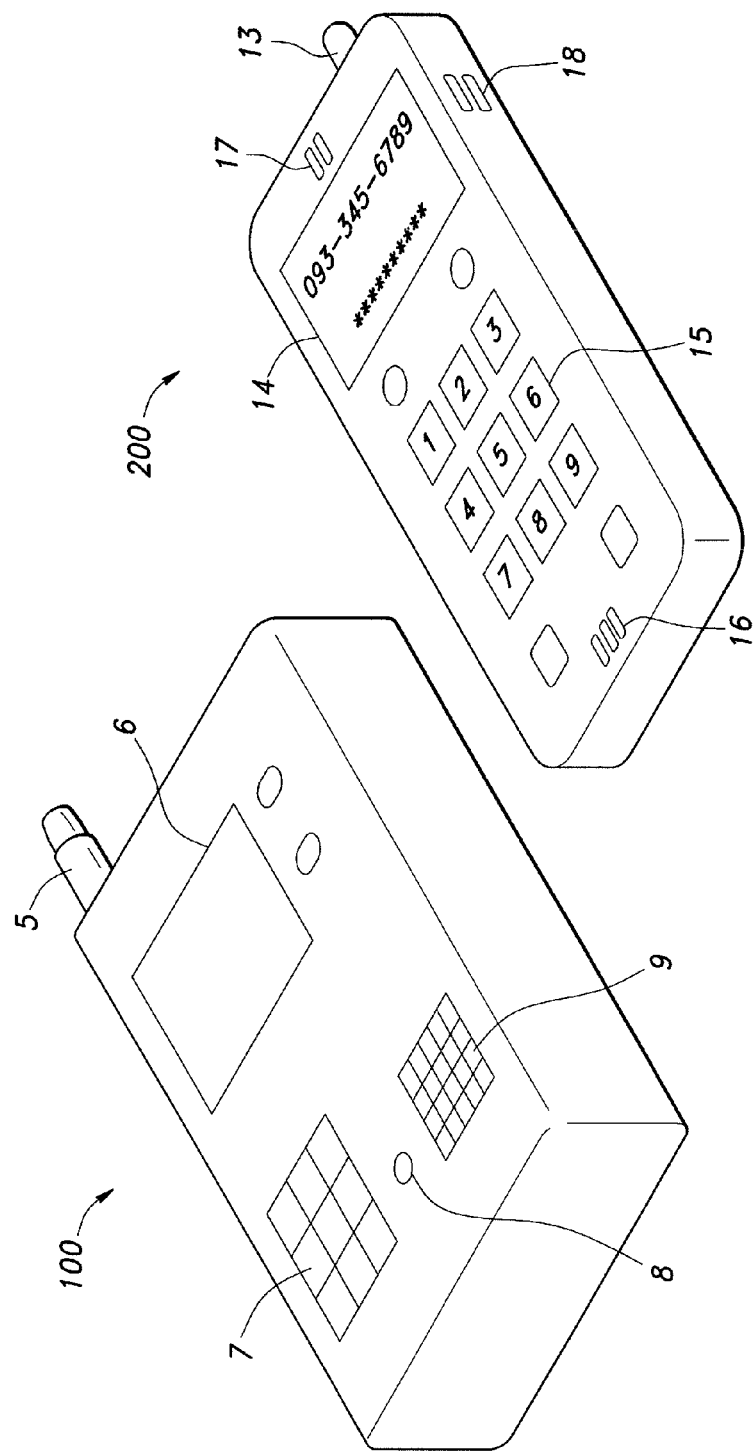
FIG. 1a is an overall perspective view of a base unit of a wireless communication system according to a first embodiment.
FIG. 1b is an overall perspective view of a handset of the wireless communication system.

With reference to FIG. 1a, when a user places a phone call using the base unit 100, the user searches for or inputs the telephone number of a party to be called by use of a display unit 6 and/or an operation unit 7 of the base unit 100 in a manner similar to when using an ordinary fixed-line phone. Once the connection is established, voice data can be communicated between the base unit 100 and another telephone connected thereto via a public telephone line (wire line) not shown in the drawings. The base unit 100 is equipped with a microphone 8 and a speaker 9, so that the user can talk with the party on the other end in the so-called hands-free condition.

With reference to FIG. 1b, the user may use the handset 200 to transmit and receive voice data via the base unit 100. When using the handset 200 also, the user inputs or otherwise specifies the telephone number of the party to be called by use of a display unit 14 and/or an operation unit 15 of the handset 200. The handset 200 is equipped with a microphone 16 for capturing the voice to be transmitted, an audio-output speaker 17 for outputting the voice regenerated from the reception signal, and a ringer speaker 18.

The base unit 100 has an antenna (base unit antenna) 5, and transmits and receives digital voice data superimposed on a carrier wave having a predetermined frequency to and from an antenna (handset antenna) 13 provided to the handset 200. In this way, wireless communication can be performed between the base unit 100 and the handset 200.

Figure 2:
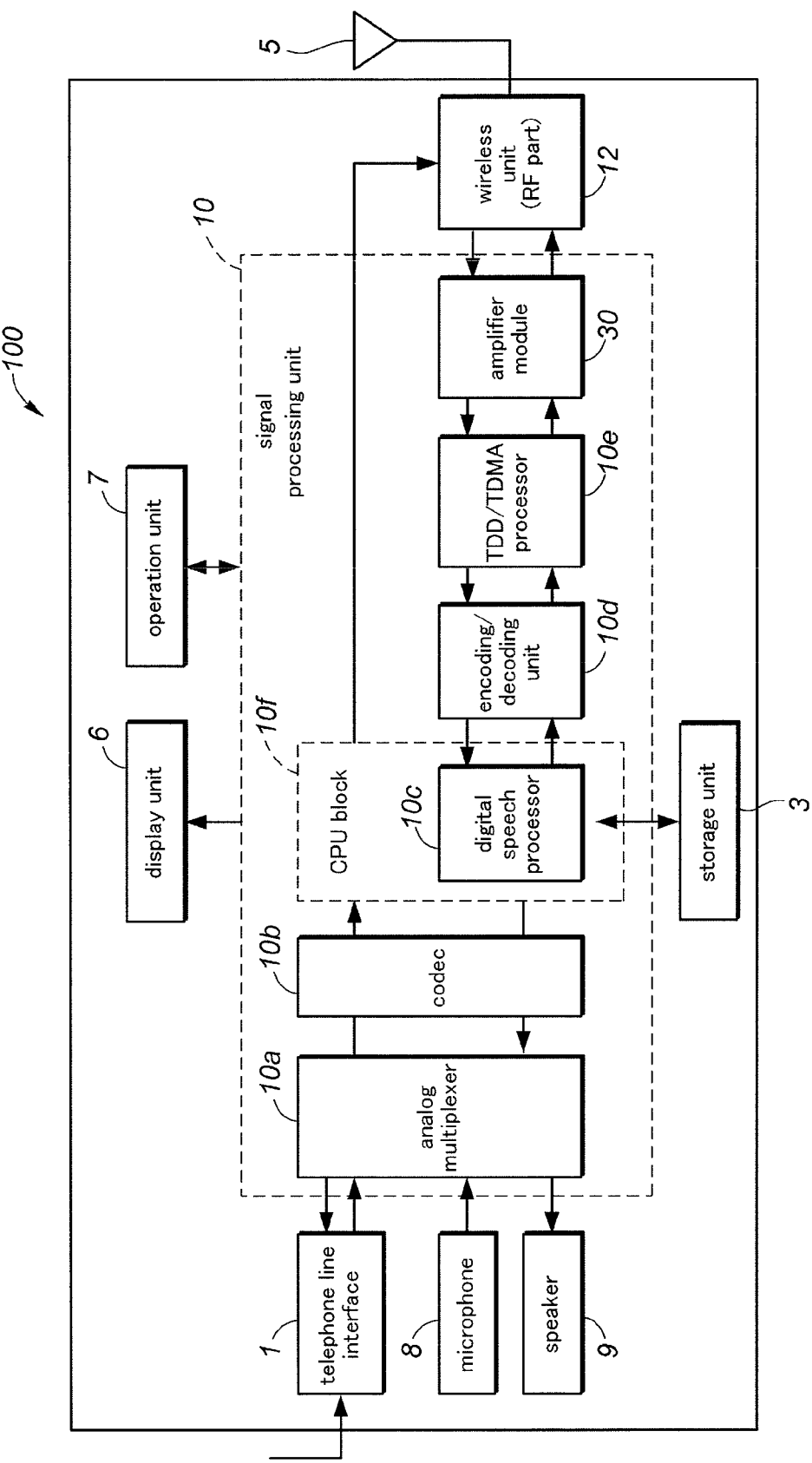
FIG. 2 is a block diagram showing a general structure of the base unit of the wireless communication system.

With reference to FIG. 2, in addition to the above-described display unit 6, operation unit 7, microphone 8 and speaker 9, which serve as a user interface, the base unit 100 includes a telephone line interface 1 serving as an external interface, and the base unit 100 connects to the public telephone line via the telephone line interface 1. Further, the base unit 100 is provided with a storage unit 3, which may be embodied as a flash memory or the like, to store frequently accessed telephone numbers, for example. When the base unit 100 is used as an answering machine, the storage unit 3 may be used to store the voice data transmitted from the other end of the line after the data has been digitized.

The base unit 100 further includes a signal processing unit 10, and the signal processing unit 10 includes an analog multiplexer 10a, a codec 10b, a CPU block 10f, an encoding/decoding unit 10d, a TDD/TDMA processor 10e, a digital speech processor (speech processing unit) 10c mounted on the CPU block 10f, and an amplifier module 30. In the following, description will be given of the structural elements of the signal processing unit 10.

The analog multiplexer 10a selects one of the input/output channels corresponding to the audio signal input via the telephone line interface 1, the audio signal received by the microphone 8, and the audio signal output to the speaker 9, respectively, where each of the audio signals is an analog signal.

The codec 10b is a so-called audio codec, and specifically is formed of a DA converter and an AD converter performing conversion between digital and analog signals. An analog audio signal input to the base unit 100 by the codec 10b via the telephone line interface 1 and an analog audio signal acquired by the microphone 8 are converted into digital audio signals. On the other hand, a digital audio signal processed digitally by the digital speech processor 10c, which will be described later, is converted by the codec 10b into an analog audio signal, which is output from the speaker 9.

Though not shown in the drawings, the CPU block 10f includes a CPU (Central Processing Unit), an EEPROM (Electrically Erasable Programmable Read Only Memory) storing a control program, a RAM (read only memory) serving as a work memory, and a bass connecting these component elements, and controls the overall operation of the base unit 100. Further, the CPU block 10f includes the digital speech processor 10c which processes audio signals. The digital speech processor 10c performs noise/echo cancellation, enhancement of specific audio frequencies, encryption/description, etc. on the digital audio signal obtained through AD conversion performed by the codec 10b and/or the digital audio signal decoded by the later-described encoding/decoding unit 10d. It is to be noted that these audio signal processings are often performed as filtering processes including fast convolution, and a DSP (Digital Signal Processor) or the like specifically designed to perform these signal processings may be used. Of course, the CPU not shown in the drawing and the digital speech processor 10c may be embodied in a single processor. Further, the entirety of the signal processing unit 10 may be embodied as a single DSP.

The encoding/decoding unit 10d encodes a digital signal included in an output from the digital speech processor 10c to be communicated (transmitted) wirelessly via the antenna 5, and decodes a signal (which is already digitized in this embodiment) received via the antenna 5. The encoding/decoding unit 10d may adopt ADPCM (Adaptive Differential Pulse Code Modulation) techniques, for example. According to ADPCM techniques, an amount of data can be reduced without compromising the sound quality by digitizing (or quantizing) the difference between a sample in question and the immediately preceding sample with a variable size of quantization step. It is said that data that would require 16 bits/sample when encoded according to simple PCM (Pulse Code Modulation) technique can be compressed to about 12 bits by use of ADPCM technique without sacrificing the sound quality. This improves the data transmission efficiency.

TDD/TDMA (Time Division Duplex/Time Division Multiple Access) processor 10e divides a carrier frequency used for transmission into units known as timeslots, so that multiple communications can be performed on the same frequency (time division multiple access). Thus, transmission and reception can be performed in a very short time period by sharing the same frequency, and therefore, transmission and reception may appear to be performed substantially simultaneously. Further, TDMA may be used along side FDMA (Frequency Division Multiple Access) for allocating frequency bands (or channels), thereby to provide a large number of channels while avoiding interferences between frequencies. The TDD/TDMA processor 10e switches between transmission and reception periodically in a short period of time as described in the foregoing, and more concretely, the TDD/TDMA processor 10e serves as a control unit that alternately and exclusively performs turning ON (activation) and turning OFF (deactivation) of a power amplifier 31 (first amplifier, hereinafter referred to as "PA") that amplifies a transmission signal and a low noise amplifier 36 (second amplifier, hereinafter referred to as "LNA") that amplifies a reception signal, the PA 31 and LNA 36 being provided in the wireless unit 12 (see FIG. 4). The activation and deactivation may be achieved, for example, by controlling the power supply to the PA 31 and LNA 36 or by controlling a gate circuit provided in an input stage or an output stage of each amplifier. In this way, control is conducted such that when the PA 31 is ON, the LNA 36 is always OFF, and when the LNA 36 is ON, the PA 31 is always OFF. This alternating and exclusive activation/deactivation control is performed periodically at a frequency of about 100 Hz or 200 Hz, for example.

It is to be noted that the TDD/TDMA processor 10e includes therein a DA converter and an AD converter not shown in the drawing. The TDD/TDMA processor 10e converts with the DA converter a digital signal (transmission signal) input from the digital speech processor 10c via the coding/decoding unit 10d into an analog signal and outputs the analog signal to the amplifier module 30, and converts with the AD converter an analog signal (reception signal) input from the LNA 36 in the wireless unit 12 via the amplifier module 30 into a digital signal and outputs the digital signal to the coding/decoding unit 10d. Thus, an analog signal interface including the amplifier module 30 is provided between the TDD/TDMA processor 10e and the wireless unit 12.

The wireless unit 12 includes a transmission circuit 37 (see FIG. 4) through which the transmission signal (analog signal) output from the amplifier module 30 is passed to the antenna 5 for emission, and a reception circuit 38 (see FIG. 4) through which the reception signal (analog signal) received by the antenna 5 is passed to the TDD/TDMA processor 10e. The structure of the amplifier module 30 as well as the transmission circuit 37 and the reception circuit 38 included in the wireless unit 12 will be described in detail later.

Figure 3:
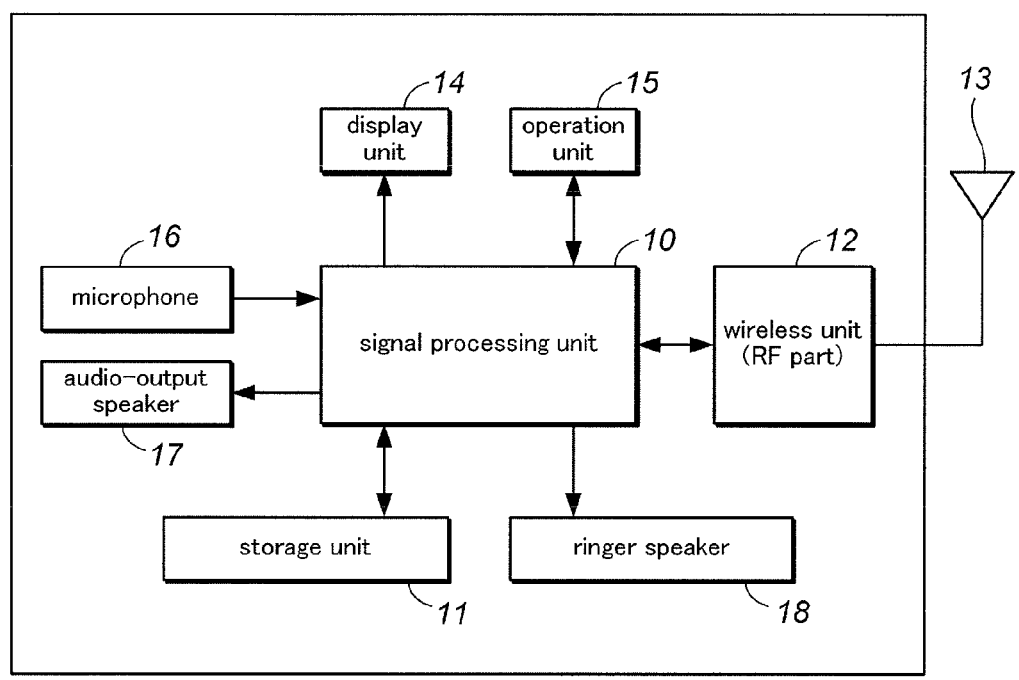
FIG. 3 is a block diagram showing a general structure of the handset of the wireless communication system.

With reference to FIG. 3, the handset 200 includes the display unit 14, operation unit 15, microphone 16, audio-output speaker 17, storage unit 11, ringer speaker 18, antenna 13, signal processing unit 10 and wireless unit 12, as described in the foregoing.

The handset 200 is generally designed to be compact in size so as to be portable, but the basic functions thereof are substantially the same as those of the base unit 100 described above with reference to FIG. 2. Namely, the structure and function of the signal processing unit 10 and the wireless unit 12 of the handset 200 are substantially the same as those of the signal processing unit 10 and wireless unit 12 of the base unit 100 described above. (for this reason, the same reference numbers are used). Therefore, detailed description of these component parts of the handset 200 will be omitted. However, when explanation is given of an actual board structure in the following description, reference will be mainly made to the handset 200 having a smaller size than the base unit 100, for convenience of explanation.

Figure 4:
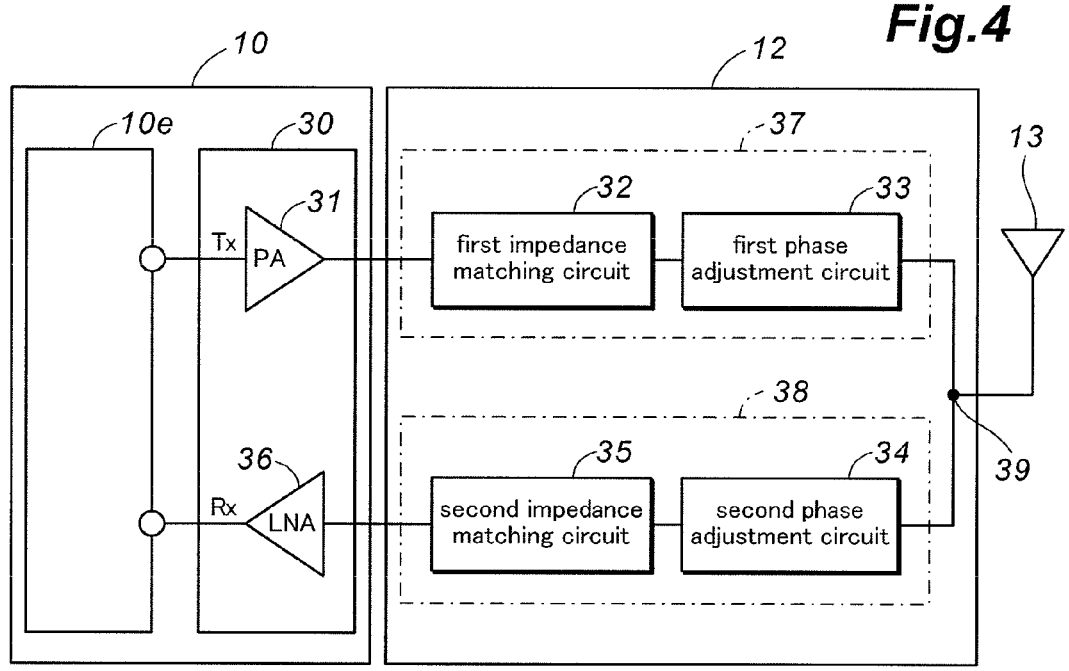
FIG. 4 is a block diagram showing a general structure of an amplifier module provided in a signal processing unit and a radio communication unit.

With reference to FIG. 4, the wireless unit 12 is formed of the transmission circuit 37 and the reception circuit 38, and the transmission circuit 37 and the reception circuit 38 are electrically connected with each other at a connection point 39, which is connected to the antenna 13. It is to be noted that "electrically connected" here does not necessarily mean that there is no element between the output end of the transmission circuit 37 and the input end of the reception circuit 38. As will be described later, a structure in which the output end of the transmission circuit 37 and the input end of the reception circuit 38 are connected with each other via a capacitor satisfies the condition "electrically connected." This is because though the capacitor provided between the ends of the circuits has a function of blocking DC, the capacitor can pass signals of high frequencies which are used in DECT.

The amplifier module 30 is formed of the PA (first amplifier) 31 and the LNA (second amplifier) 36. The PA 31 is a power amplifier and has an input end TX connected to TDD/TDMA processor 10e in the signal processing unit 10 such that the transmission signal (analog signal) output from the TDD/TDMA processor 10e is input thereto. The LNA 36 is a low noise amplifier and receives and amplifies the reception signal (analog signal) output from the reception circuit 38. An output end Rx of the LNA 36 is connected to the TDD/TDMA processor 10e such that the TDD/TDMA processor 10e receives the amplified reception signal (analog signal). It is to be noted that the amplifier module 30 is mainly formed of an analog circuit, and the signal processing unit 10 is configured as a so-called mixed digital-analog chip.

Further, the TDD/TDMA processor 10e outputs to the amplifier module 30 a control signal not shown in the drawings to control the activation (ON) and deactivation (OFF) of the PA 31 and LNA 36. It is to be noted that a deactivated state may be achieved by not only cutting off power supply to the entirety of the PA 31 but also cutting off power supply to a part of the PA 31, blocking signals to an internal circuit of the PA 31, blocking input/output signals by a gate circuit, etc.

The transmission circuit 37 is formed of a first impedance matching circuit 32 and a first phase adjustment circuit 33. The first impedance matching circuit 32 functions to match the impedance between the output of the transmission circuit 37 and the antenna 13 when the PA 31 is in the activated state, and to create an impedance mismatch between the transmission circuit 37 and the antenna 13 when the PA 31 is in the deactivated state.

The first phase adjustment circuit 33 causes the impedance of the transmission circuit 37 on the side of the connection point 39 to rotate on a later-described immittance chart (Smith chart) by a prescribed angle irrespective of whether the PA 31 is activated or deactivated, such that the matched impedance state is maintained when the PA 31 is activated, and the impedance is shifted to a high impedance sufficient to achieve a high impedance state when the PA 31 is deactivated.

The reception circuit 38 is formed of a second impedance matching circuit 35 and a second phase adjustment circuit 34. The functions of the second impedance matching circuit 35 and the second phase adjustment circuit 34 are basically the same as those of the corresponding circuits in the transmission circuit 37 described above. Namely, the second impedance matching circuit 35 functions to match the impedance between the antenna 13 and the reception circuit 38 when the LNA 36 is in the activated state, and to create an impedance mismatch between the antenna 13 and the reception circuit 38 when the LNA 36 is in the deactivated state.

The second phase adjustment circuit 34 causes the impedance of the reception circuit 38 on the side of the connection point 39 to rotate on the immittance chart (Smith chart) by a prescribed angle irrespective of whether the LNA 36 is activated or deactivated, such that the matched impedance state is maintained when the LNA 36 is activated, and the impedance is shifted to a high impedance sufficient to achieve a high impedance state when the LNA 36 is deactivated.

Namely, provided that a 50Ω point (corresponds to a 1 (one) Ω point in normalized impedance, and will be referred to as "R50 point" hereinafter) is set on a horizontal line dividing the circles of the Smith chart, which is a complex plane, into upper and lower halves (the horizontal line represents a pure resistance component and will be referred to as "real axis" hereinafter), the first impedance matching circuit 32 causes the impedance of the output of the transmission circuit 37 to move to a position in the vicinity of the R50 point when the PA 31 is in the activated state, and causes the output impedance of the transmission circuit 37 to move to a position significantly distant from the R50 point when the PA 31 is in the deactivated state.

The first phase adjustment circuit 33 causes the impedance at the output of the transmission circuit 37 (i.e., at the connection point 39) to rotate on a circle having the R50 point as its center. Specifically, the first phase adjustment circuit 33 includes an element that causes a phase shift in the transmission signal, thereby causing the impedance to rotate. It is to be noted here that since the first phase adjustment circuit 33 causes the impedance to rotate on a circle having the R50 point as its center by a prescribed angle regardless of whether the PA 31 is activated or deactivated, the impedance when the PA 31 is activated remains in the matched state even after the rotation (since the impedance is in the vicinity of the R50 point). On the other hand, the impedance when the PA 31 is deactivated may be changed significantly by the rotation, and can be shifted to a high impedance by adjustment of the rotation angle (i.e., an amount of phase shift of the transmission signal).

It is to be noted that the first impedance matching circuit 32 and the first phase adjustment circuit 33 in the transmission circuit 37 and the second impedance matching circuit 35 and the second phase adjustment circuit 34 in the reception circuit 38 are characteristic structural elements in the first embodiment. Detailed explanation of the operation of these structural elements will be given later with reference to a Smith chart.

Figure 5:
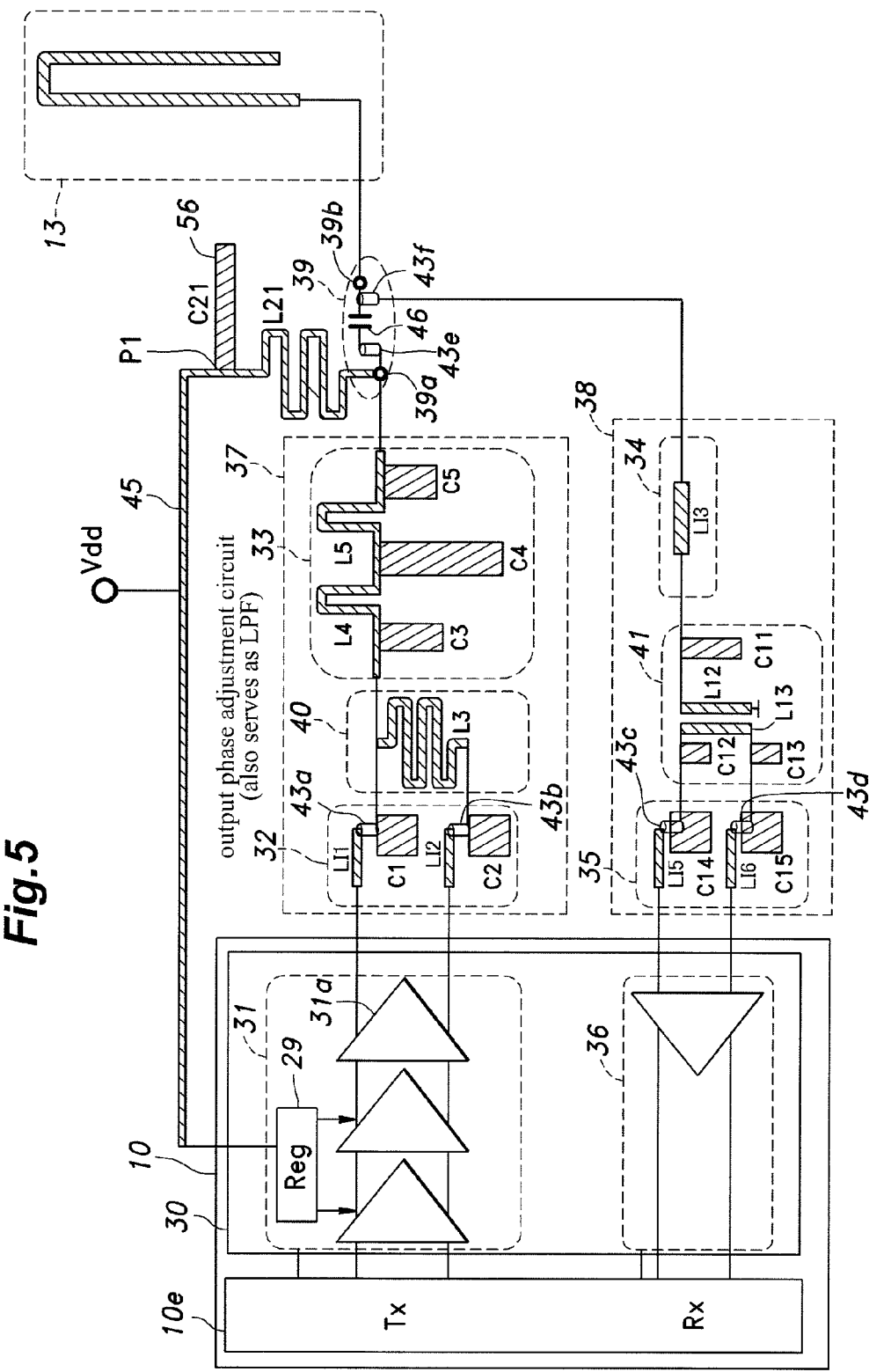
FIG. 5 is a diagram showing a concrete structure of a transmission circuit and a reception circuit.

With reference to FIG. 5, a part hatched with oblique lines extending from the upper right to the lower left represents a transmission line or an inductor, and a part hatched with oblique lines extending from the upper left to the lower right represents a capacitor, while thin lines in the transmission circuit 37 and the reception circuit 38 are dummy lines only indicating the connection relationship between structural elements, and do not have any physical length and width. Thus, each of the transmission circuit 37 and the reception circuit 38 includes at least an inductor(s) and a capacitor(s) as its circuit elements.

Figure 7:
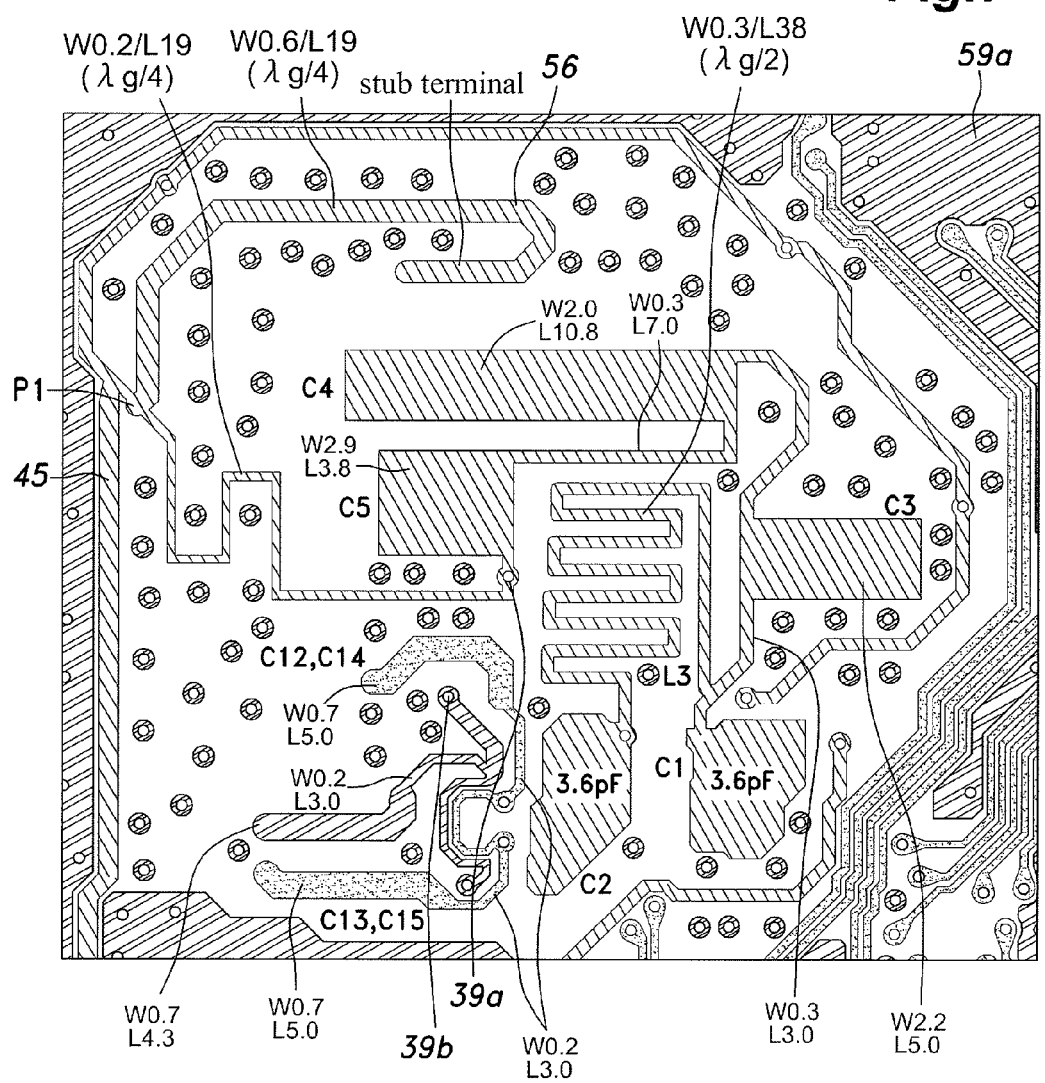
FIG. 7 is an explanatory diagram showing actual dimensions (sizes) of the transmission circuit and the reception circuit on the board.

Further, "W" in FIG. 7 indicates a width of a wiring pattern constituting a circuit, and similarly, "L" indicates a length of a wiring pattern. The number following "W" or "L" represents an actual width or length on an exemplary board, and the unit therefore is [mm].

In the following description, a board on which the transmission circuit 37 and the reception circuit 38 are implemented will be referred to as a first board 59a, and a board on which the signal processing unit 10 is implemented will be referred to as a fourth board 59d.

The various capacitors that will be described in the following are constituted of wiring patterns (copper foils) formed on the first board 59 and ground patterns formed on a second board 59b and a third board 59c, which constitute a multi-layer board in cooperation with the first board 59a (see FIG. 9e). Namely, a glass epoxy resin that is a main material of theses boards makes insulation layers of the capacitors. One end of each capacitor is connected to a related circuit such that the capacitor is connected in parallel with the related circuit, while the other end of each capacitor is the ground patterns themselves, and thus, is grounded. It is to be noted that the capacitance of each capacitor can be varied by changing the distance between the pattern on the first board 59a and the pattern on the second board 59b and/or the third board 59c (i.e., the thickness of the boards).

FIG. 8 shows wiring patterns on the fourth board 59d, in which the signal processing unit 10 implemented on the fourth board 59d is indicated by a broken line extending along an outer boundary thereof, and a DC-cutting capacitor 46 is represented by a black filled rectangle.

In the following, with reference to FIGS. 5-9, detailed explanation will be given of the structure of the transmission circuit 37 and the reception circuit 38 in the first embodiment and their peripheral structure.

Figure 6:
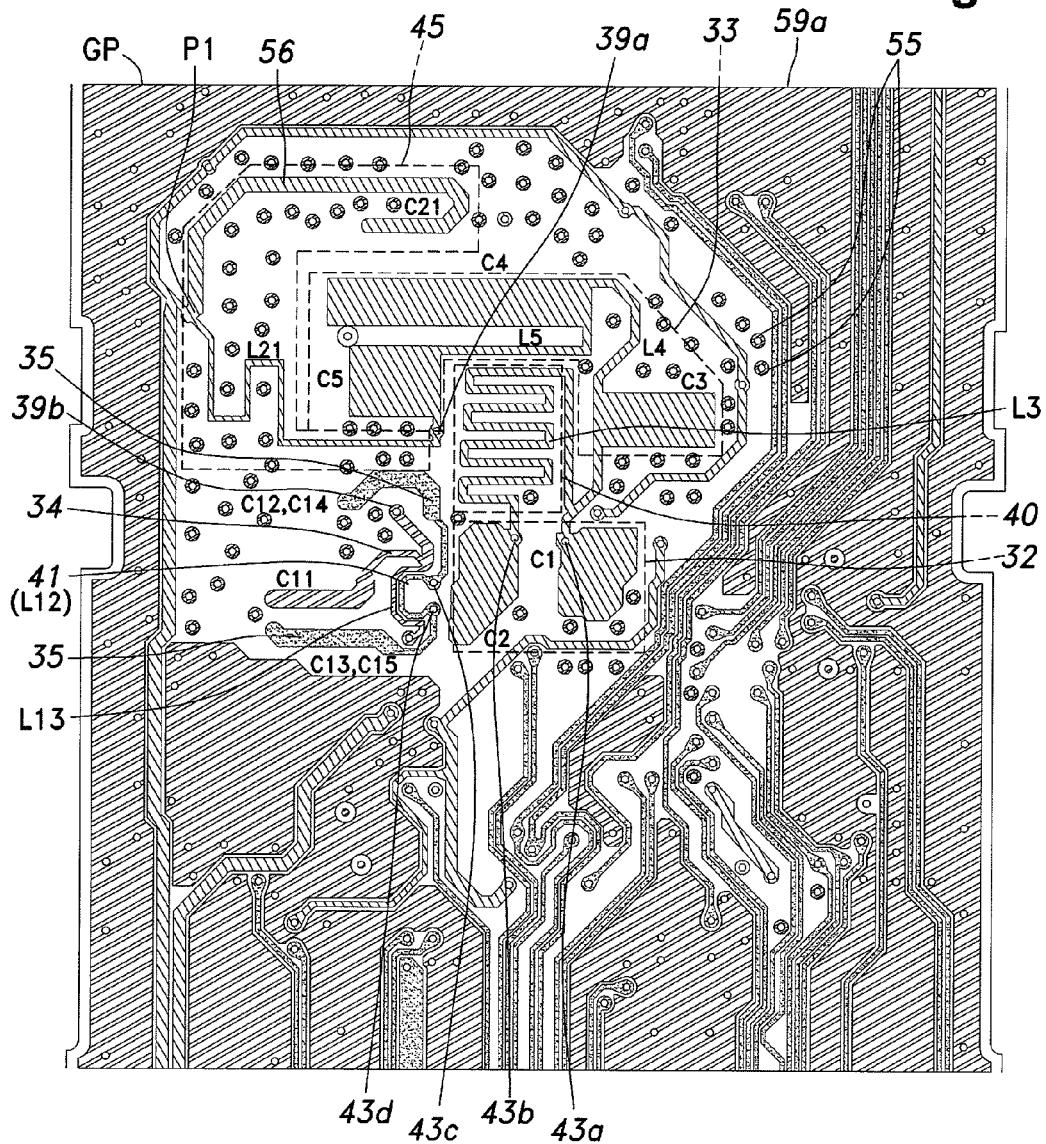
FIG. 6 is an explanatory diagram showing the transmission circuit and the reception circuit implemented on a board.

As shown in FIG. 6, the first impedance matching circuit 32 (excluding a part of transmission lines), the first phase adjustment circuit 33 and a first balun 40 forming the transmission circuit 37 and the second impedance matching circuit 35 (excluding a part of transmission lines), the second phase adjustment circuit 34 and a second balun 41 forming the reception circuit 38 are formed only of wiring patterns on the first board 59a.

Further, as shown in FIG. 8, transmission lines forming a part of the first impedance matching circuit 32 and the second impedance matching circuit 35 are formed only of wiring patterns on the fourth board 59d (detailed description will be provided later).

Thus, no discrete electronic element is used and this can reduce the cost significantly. It is to be noted that in FIG. 6, the hatched portion denoted by GP represents a ground pattern. Thus, the transmission circuit 37 and the reception circuit 38 are also surrounded by the ground pattern GP on the same board.

Figure 9A:
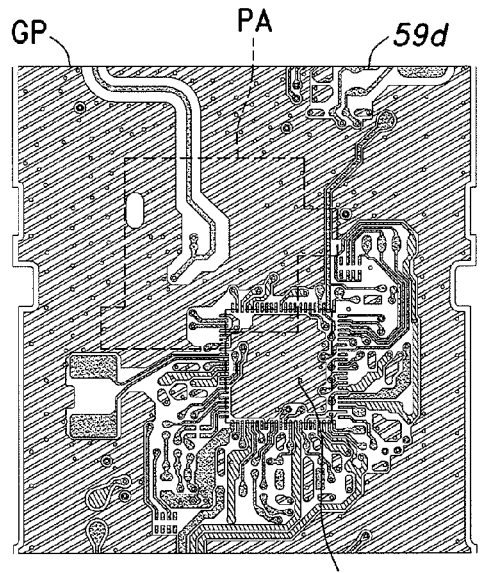
FIGS. 9a to 9d are explanatory diagrams showing a structure for shielding the transmission circuit and the reception circuit.
Figure 9B:
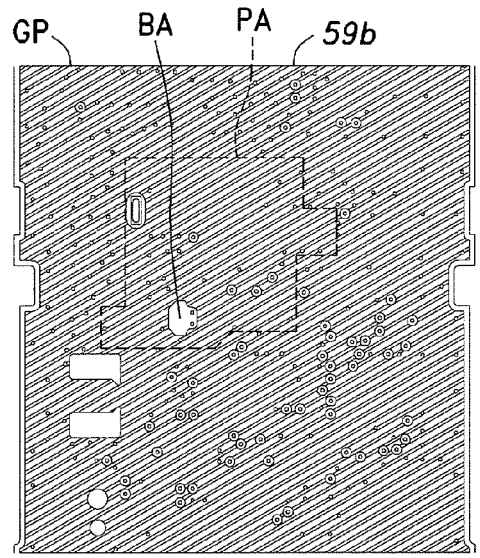
Figure 9C:
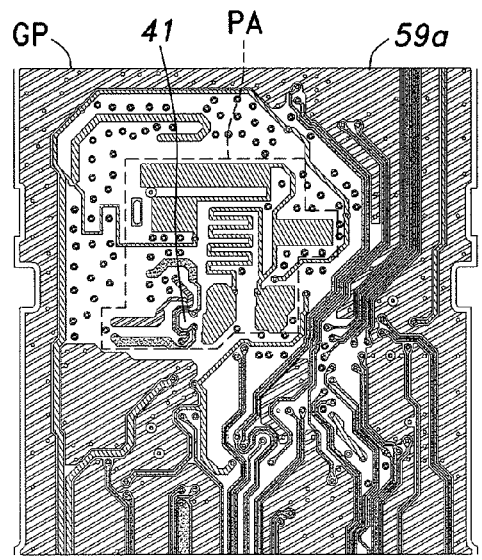
Figure 9D:
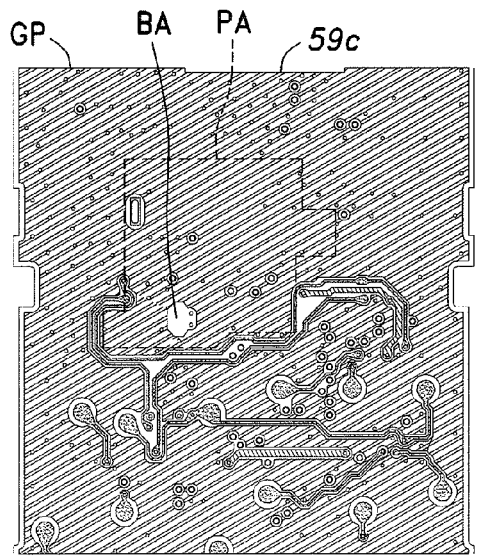
Figure 9E:
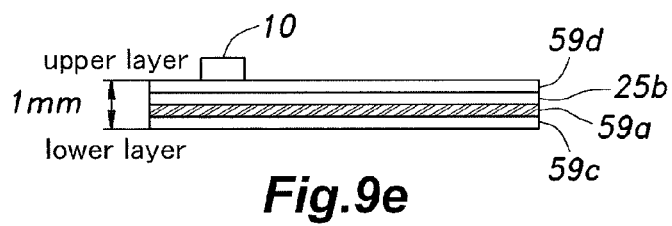
FIG. 9e is an explanatory diagram showing a multi-layer board.

Further, as shown in FIG. 9e, the first board 59a is one of the layers constituting a multi-layer board. In the first embodiment, a multi-layer board including four layers is used, and the fourth board 59d, second board 59b, first board 59a and third board 59c are arranged in this order from the top, the total thickness being set at about 1 mm. Of the four boards, the uppermost fourth board 59d has the signal processing unit 10 implemented thereon such that the signal processing unit 10 includes the amplifier module 30 (not shown in the drawings).

With reference to FIGS. 9b and 9d, in the second board 59b and the third board 59c also, "GP" indicates a ground pattern as in the first board 59. As seen, the second board 59b and the third board 59c are each provided with a ground pattern over a substantially entire surface thereof. The first board 59a has the aforementioned transmission circuit 37, reception circuit 38, power source line 45, etc. formed thereon.

In FIGS. 9a to 9d, "PA" indicates a transmission/reception circuit positioning area in the first board 59a and a corresponding area in the second board 59b, third board 59c and fourth board 59d. The first board 59a is sandwiched between the second board 59b and the third board 59c such that the major surfaces of the first board 59a face the second and third boards 59b and 59c, respectively. Each of the second board 59b and the third board 59c has a ground pattern formed over an area corresponding to the transmission/reception circuit positioning area PA of the first board 59a except for a part of the area, whereby an electromagnetic shield is provided to isolate the transmission circuit 37 and the reception circuit 38 formed on the first board 59a from external electromagnetic waves.

Further, as shown in FIG. 6, a number of via holes 55 are provided in the first board 59a around the first impedance matching circuit 32, first phase adjustment circuit 33 and first balun 40 constituting the transmission circuit 37 and around the second impedance matching circuit 35, second phase adjustment circuit 34 and second balun 41 constituting the reception circuit 38. These via holes 55 are used to connect each other the ground patterns formed on the second board 59b and the third board 59c that interpose the first board 59a therebetween, and thus, the transmission circuit 37 and the reception circuit 38 are protected by electromagnetic shield provided not only by the ground patterns on the second and third boards 59b, 59c facing the major surfaces of the first board 59a on which the circuits are formed but also by the via holes 55 in the board 59a.

However, a part of the electromagnetic shield formed by the second board 59b and the third board 59c includes a window area BA (see FIGS. 9b and 9d), which is not formed with a ground pattern. In an area of the first board 59a corresponding to the window area BA is disposed a resonator of the second balun 41 (see FIG. 5, etc.), such that a problem (reduction in wavelength selection performance of the resonator) that would be caused by a capacitance component created by sandwiching this part with the ground patterns is prevented. The second balun 41 will be described in detail later.

In the following, description will be made of individual elements constituting the transmission circuit 37 in order along the path through which the transmission signal passes.

As shown in FIG. 5, the PA 31 includes a three stage amplifier. The power from the power source line 45 is supplied to the two stages close to the input end Tx after being regulated by a regulator 29 and is mainly used as operating power of a logic circuit. The structure for feeding electric power to the third stage amplifier (final stage amplifier 31a) that is the closest to the input end of the transmission circuit 37 will be described later.

As described earlier, in the signal processing unit 10 (including the amplifier module 30) implemented on the fourth board 59d or the uppermost board (see FIG. 8 and FIG. 9e), the PA 31 outputs a differential signal (pair), and this differential signal pair is transferred via the via holes 43a and 43b to the first board 59a, which constitutes the third layer from the top.

The first impedance matching circuit 32 includes a pair of transmission lines LI1 and LI2 and a pair of capacitors C1 and C2, each one of the pair of transmission lines LI1 and LI2 and each one of the capacitors C1 and C2 processing a corresponding one of the differential signal pair. The transmission lines LI1 and LI2 are each formed of a wiring pattern drawn on the fourth board 59d (see FIG. 8) and are respectively connected in series with the output ends of the PA 31 for outputting a differential signal. The capacitors C1 and C2 each include a wiring pattern drawn on the first board 59a (see FIG. 6), and one end each capacitor C1, C2 is connected to the output end of a corresponding one of the transmission lines LI1 and LI2 while the other end thereof is grounded such that each capacitor C1, C2 is connected in parallel with the circuit.

The length of each transmission line LI1, LI2 and the capacitance of each capacitor C1, C2 (concrete values of these parameters are determined depending on the frequency of the signal applied to these circuit elements, the length and width (area) of the wiring patterns formed on the board to realize the elements, etc.) are determined such that impedance matching is achieved between the transmission circuit 37 and the antenna 13 in the state where the PA 31 is activated. For example, the shape (area) of each capacitor C1, C2 shown in FIG. 7 may be determined so as to set the capacitance thereof to be 3.6 pF to adjust the impedance when the PA 31 is activated. The process of adjustment of the impedance of the transmission circuit 37 by the inductors LI1, LI2 and the capacitors C1, C2 forming the first impedance matching circuit 32 will be described in detail later with reference to a Smith chart.

The output from the first impedance matching circuit 32 is forwarded to the first balun 40. The first balun 40 converts the differential signal to a single-ended signal, and includes an inductor L3. As shown in FIG. 7, the wiring pattern forming the inductor L3 has a length of 38 mm in the illustrated embodiment.

Incidentally, for the 1.9 GHz band used in DECT, the spatial wavelength λ is calculated as follows:

$$\lambda = c/f = 3 \times 10^8 / 1.9 \times 10^{-9} = 158 \text{ mm (where c is the light speed)} \quad \text{(Equation 1)}$$

However, since the first board 59a is one of the boards forming a multi-layer board and is sandwiched by other boards (dielectric bodies) to make an intermediate layer, and this makes the wavelength shorter. In the first embodiment, first board 59a to fourth board 59d each include a so-called glass epoxy board formed by impregnating a glass fiber fabric with epoxy resin and making it subject to heat curing so as to be formed in a plate-like shape, and as such a board has an dielectric constant ∈=4.2, an intra-board wavelength λg is obtained as follows:

$$\lambda g = \lambda / \in^{1/2} = 158 \text{ mm}/4.2^{1/2} = 77 \text{ mm} \quad \text{(Equation 2)}$$

A transmission line length equal to λg/4 (in the above example, 77/4≈19 mm) will be a basic unit in designing of wiring patterns.

With reference to FIG. 7, the length of the inductor L3 forming the first balun 40 is 38 mm, which approximately corresponds to λg/2. When a transmission line is added to a certain impedance load to vary a signal phase, the coordinate representing the impedance on a Smith chart is moved so as to rotate on a circle having its center at the R50 point. Thus, the impedance can be varied by adding a transmission line that changes a signal phase. Provided that an initial value of an impedance Z is equal to 0, for example, the impedance Z is varied so as to repeatedly becomes ∞ and 0 (each being a point on the real axis) for every increase of the transmission line length by λg/4. With regard to the first balun 40, the inductor L3 is formed to have a length of λg/2, such that the signal phase does not change between the input and output of the balun. However, since the first balun 40 is configured to convert a differential signal to a single-ended signal, the transmission circuit 37 as seen from the antenna 13 includes parallel circuits. Therefore, in a case where the output impedance of the first impedance matching circuit 32 has only a component (R0) on the real axis of the Smith chart, the provision of the first balun 40 between the transmission circuit 37 and the antenna 13 causes the impedance of the transmission circuit 37 as seen from the antenna 13 to be reduced to a half (R0/2). As a result, with an appropriate selection of R0, the output impedance of the first balun 40 can be set in the vicinity of the R50 point on the Smith chart, such that impedance matching is achieved between the output of the first balun 40 and the antenna 13 when the PA 31 is in the activated state.

Figure 10A:
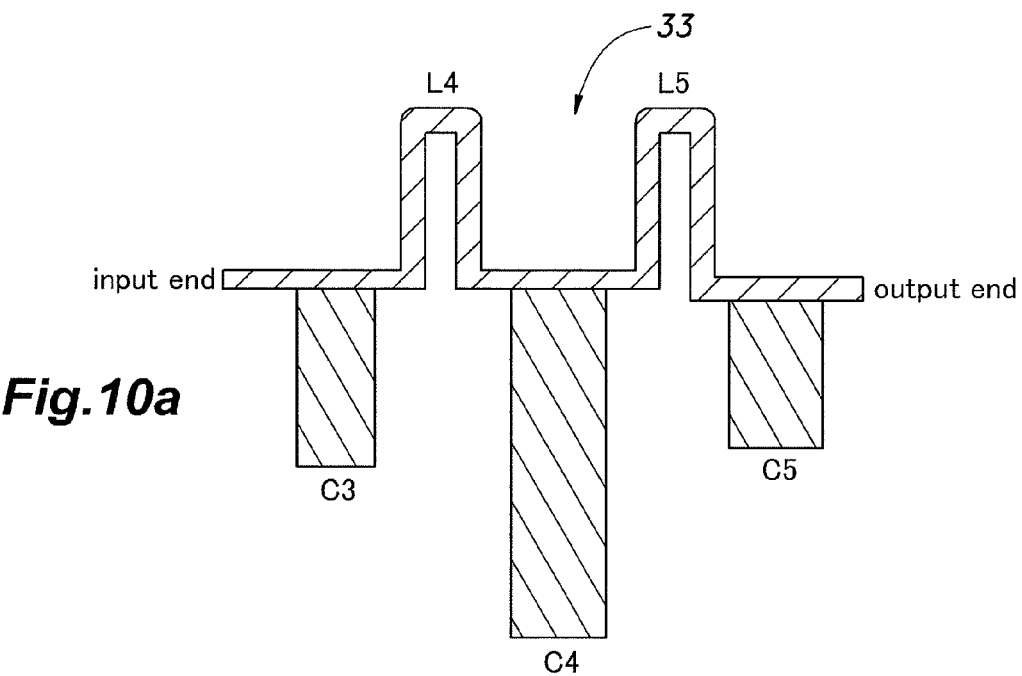
FIG. 10a is a block diagram showing a structure of a first phase adjustment circuit.
Figure 10B:
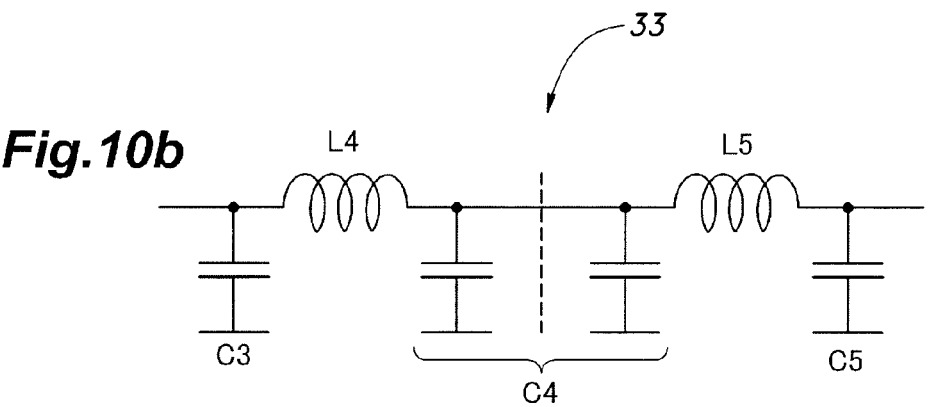
FIG. 10b is an explanatory diagram of an equivalent circuit of the first phase adjustment circuit.

As shown in FIG. 10a, the first phase adjustment circuit 33 includes inductors L4 and L5 arranged in this order from an input end side and connected in series with each other, capacitors C3, C4 and C5 having one end connected to between the input end and the inductor L4, between the inductors L4 and L5, and between the inductor L5 and an output end, respectively, and having the other end that is grounded. Thus, the first phase adjustment circuit 33 includes at least an inductor and a capacitor as explicit circuit elements. As is shown in an equivalent circuit of FIG. 10b, this structure is equivalent to a structure including two Π-type low-pass filters connected in series, with the capacitor C4 between the two inductors L4 and L5 being commonly used by the first-stage and second-stage low-pass filters. The low-pass filter has an ability to delay the signal phase, and thus, this structure also can cause the impedance to rotate about the R50 point on the Smith chart. It is to be noted that the low-pass filter in the illustrated embodiment has an enhanced damping property and thus causes a large shift (delay) of the signal phase, which results in a rotation on the Smith chart over one revolution.

The capacitor C4 disposed between the inductors L4 and L5 may have an arbitrary capacitance to form a low-pass filter so long as the capacitor on the output side of the first-stage low-pass filter and the capacitor on the input side of the second-stage low-pass filter have the same capacitance. By adjusting the capacitance of the capacitor C4, setting of the amount of damping and phase adjustment performed by the entire low-pass filter can be achieved easily with a high degree of freedom. For example, a steep damping property can be obtained by using the capacitor C4 with a large capacitance.

In a case where the low-pass filter is formed of conventional discrete electronic elements, a parasitic inductance component and/or a parasitic capacitance component attributed to the elements themselves may be generated, and this tends to result in insufficient damping property particularly in a high frequency region so that the phase adjustment virtually cannot be achieved. In the first embodiment, the low-pass filter serving as a phase adjustment unit is formed by drawing wiring patterns and is provided with a shield structure realized by use of a multi-layer board, as described in the foregoing, whereby a high frequency property sufficient for practical use is obtained for the first time.

As shown in FIG. 7, the capacitor C3 provided at the input end of the first phase adjustment circuit 33 is given a width W of 2.2 mm and a length L of 5.0 mm (area=11 mm²). On the other hand, the capacitor C5 provided at the output end is given a width W of 2.9 mm and a length L of 3.8 mm (area=11.02 mm²), whereby the capacitor C3 and the capacitor C5 have slightly different capacitances. It is possible in general to expand the bandwidth of the low-pass filter by varying the capacitance slightly between the capacitor at the input end of the first stage and the capacitor at the output end of the second stage, as described in the foregoing.

As described above, in the state where the PA 31 is activated, the output impedance of the first balun 40 in the transmission circuit 37 is adjusted to match the antenna 13 (namely, the impedance is adjusted so as to have a value near the R50 point on the Smith chart). If the signal phase is varied in such an impedance-matched state, the impedance moves on a circle having its center at the R50 point. Namely, in a state where impedance matching has been established, the impedance is in the vicinity of the R50 point that is a rotation center, and therefore, the established impedance matching does not collapse if the signal phase is varied.

Theoretically, it is possible to vary the signal phase by adjusting the length of the transmission line connected in series with an impedance load. However, in the first embodiment, the first phase adjustment circuit 33 is formed of a low-pass filter. The reason the phase change is carried out other than by adjustment of the length of the transmission line is that this may result in a very long transmission line length. In general, when the damping property of a low-pass filter is improved, the phase delay also is increased, and if this is to be achieved by only adjustment of a transmission line length, a phase delay of ¾ λg, for example, will require a wiring length of 19 mm×3=54 mm. As will be readily appreciated with reference to the dimensions shown in FIG. 7, the wiring length of 54 mm can impart a significant influence on the circuit design. If a low-pass filter is used instead, it can be implemented readily as a two stage structure.

In general, the impedance of the output end of the PA 31 changes between when the PA 31 is activated and when the PA 31 is deactivated, and it is only when the PA 31 is activated that impedance matching is achieved by the aforementioned first impedance matching circuit 32, first balun 40 and first phase adjustment circuit 33. In other words, in the state where the PA 31 is deactivated, the output impedance of the first balun 40 is not on or in the vicinity of the R50 point on the Smith chart (namely, impedance matching with the antenna 13 is not achieved). Thus, by shifting the impedance to a point distant from the R50 point by the first impedance matching circuit 32 and the first balun 40 and further adjusting the impedance by the first phase adjustment circuit 33 that varies the signal phase of the transmission signal, the impedance of the transmission circuit 37 when the PA 31 is deactivated rotates (or change) around the R50 point significantly and may be shifted to a high impedance state depending on an amount of variation of the signal phase.

In this way, in the state where the PA 31 is activated (namely, during transmission), impedance matching is achieved between the output end of the transmission circuit 37 and the antenna 13, while in the state where the PA 31 is deactivated (namely, during reception), the output end of the transmission circuit 37 is brought into a high impedance state as seen from the antenna 13, preventing the reception signal from flowing into the transmission circuit 37.

It is to be noted that though the first phase adjustment circuit 33 constitutes a low-pass filter in the first embodiment as described in the foregoing, it may be configured to have a band-pass filter characteristic.

The transmission signal having been subjected to the aforementioned signal processing passes a first connection point 39a, and thereafter, is forwarded from the first board 59a to the uppermost fourth board 59d via a via hole 43e. Then, the transmission signal is emitted to the air from the antenna 13 connected via a DC-cutting capacitor 46 on the fourth board 59d. This DC-cutting capacitor 46 prevents the voltage applied to the power source line 45 from being transmitted to the antenna 13, and allows only the transmission signal to be forwarded to the antenna 13.

In the following, with reference to FIGS. 5 to 9 again, description will be made of individual elements constituting the reception circuit 38 in order along the path through which the reception signal passes.

The reception signal received by the antenna 13 passes the second connection point 39b, and thereafter, is forwarded from the fourth board 59d to the reception circuit 38 on the first board 59a via a via hole 43f. In the reception circuit 38, the reception signal is first input to the second phase adjustment circuit 34.

As shown in FIGS. 5 and 6, the second phase adjustment circuit 34 consists of a transmission line LI3. In the aforementioned transmission circuit 37, the phase adjustment circuit is made of a low-pass filter to not only shift the signal phase but also remove signal noise. In the reception circuit 38, however, the LNA 36 rarely becomes a noise source, and thus, there is no need for a noise filter, and the impedance of the reception circuit 38 when the LNA 36 is in the deactivated state can be shifted to a sufficiently high impedance by simply connecting a transmission line in series with the impedance load. Such a structure corresponds to the characteristics of the LNA 36 adopted in the first embodiment, and another LNA 36 may require a transmission line having a long line length, though, in any case, adjustment of the wiring pattern length can readily achieve a high impedance of the reception circuit 38 when the LNA 36 is deactivated. It is of course possible to provide a filter that positively rotates the signal phase as the first phase adjustment circuit 33 in the transmission circuit 37.

The output from the second phase adjustment circuit 34 is input to the second balun 41. The second balun 41 includes a capacitor C11 having one end connected to the input end of the second balun 41 and the other end connected to the ground, inductors LI2 and LI3 provided on the board so as to oppose each other, and capacitors C12 and C13 each having one end connected to a corresponding end of the inductor LI3 and the other end connected to the ground. It is to be noted that in FIG. 6, the capacitors C12 and C13 are respectively unified with the capacitors C14 and C15 constituting the second impedance matching circuit 35.

The second balun 41 converts the reception signal that is a single-ended signal to a differential signal (differential input), but unlike the first balun 40 in the transmission circuit 37, includes a transformer or resonator formed of the inductors LI2 and LI3 disposed to oppose each other. Since only electromagnetic waves having frequencies that satisfy the resonance condition can exist within the resonator, the second balun 41 virtually has a band-pass filtering property. This makes it possible to remove the electromagnetic waves having unnecessary frequencies included in the signal received by the antenna 13. Further, because the second balun 41 is configured to convert a single-ended signal to a differential signal, the impedance at the input of the second balun 41 as seen from the antenna becomes a half (½) of the input impedance of the later-described second impedance matching circuit 35, provided that the input impedance of the LNA 36 has been shifted onto the real axis of the Smith chart by the second impedance matching circuit 35. As described in the foregoing, a part of the ground pattern is removed at the position opposing the second balun 41 (see the window area BA in FIGS. 9b and 9c), and this improves the band-pass filter characteristics.

The output from the second balun 41 is input to the second impedance matching circuit 35. The second impedance matching circuit 35 includes a pair of capacitors C14 and C15 and a pair of transmission lines LI5 and LI6, each one of the pair of transmission lines LI5 and LI6 and each one of the capacitors C14 and C15 processing a corresponding one of the differential signal pair. The capacitors C14 and C15 are each formed of a wiring pattern drawn on the first board 59a (see FIG. 6), and one end thereof is connected to the input end of a corresponding one of the transmission lines LI5 and LI6 while the other end is grounded. The transmission lines LI5 and LI6 are each formed of a wiring pattern drawn on the fourth board 59d (see FIG. 8) and are respectively connected in series with the input ends of the LNA 36 for receiving a differential signal.

The length of each transmission line LI5, LI6 and the capacitance of each capacitor C14, C15 (concrete values of these parameters are determined depending on the frequency of the signal applied to these circuit elements, the length and width (area) of the wiring patterns formed on the board to realize the elements, etc.) are determined such that impedance matching is achieved between the reception circuit 38 and the antenna 13 in the state where the LNA 36 is activated. For example, the shape (area) of each capacitor C14 (including the capacitor C12), C15 (including the capacitor C13) shown in FIG. 7 may be determined so as to make the capacitance thereof at an appropriate value, thereby adjusting the impedance when the LNA is activated.

The output from the second impedance matching circuit 35 is forwarded from the first board 59a to the uppermost fourth board 59d via via holes 43c, 43d, and then input to the LNA 36 of the amplifier module 30 included in the signal processing unit 10 implemented on the fourth board 59d. The LNA 36 amplifies the reception signal and provides it to the TDD/TDMA processor 10e.

Hereinafter, with reference to FIG. 5, FIG. 7 and FIG. 8, description will be given of the structure of the power source line 45 (structure for supplying power) in the first embodiment.

As shown in FIG. 5, the power source line 45 includes a capacitor C21 and an inductor L21, the inductor L21 having one end connected to the output end of the transmission circuit 37 at the first connection point 39a. As shown in FIG. 7, the capacitor C21 connected to the power source line 45 forms an open stub 56 on the circuit. It is to be noted here that a stub is a distributed constant line connected in parallel with a transmission line in a high-frequency circuit, and particularly, the one having an open end in accordance with a type of a terminal load is referred to as an open stub. In the first embodiment, the length of the open stub 56 is set to be 19 mm. Further, provided that the connection point between the open stub 56 and the inductor L21 is referred to as a connection point P1, the transmission line length of the inductor L21 disposed between the first connection point 39a and the point P1 (namely, inserted in series with the power source line 45) is also set to be 19 mm. As is described in the foregoing, the length of 19 mm corresponds to $\lambda_g/4$. This means that, in the structure configured as above, if the impedance of the power source line 45 is 0, the impedances of the terminal end of the open stub 56 and the output end of the transmission circuit 37 (namely, first connection point 39a) as seen from the power source line 45 are $\infty$. It is to be noted here that the circuit behaves as having an impedance of $\infty$ for 1.9 GHz which is a carrier wave frequency, and thus, the output from the transmission circuit 37 modulated at 1.9 GHz cannot enter the power source line 45. Similarly, the 1.9 GHz reception signal received by the antenna 13 cannot enter the power source line 45. Therefore, according to this structure, it is possible to reliably prevent noise from entering the power source from the transmission circuit 37 or the antenna 13.

On the other hand, the power source line 45 supplies DC electric power to the final stage amplifier 31a of the PA 31 via the first connection point 39a and the transmission circuit 37. The transmission power (antenna power) set forth by the DECT standard is on the order of 10 mW in average, but the final stage amplifier 31a consumes a relatively large power, and is repeatedly activated (ON) and deactivated (OFF) at a frequency of several hundred Hz, generating a rush current or the like, which tends to make the final stage amplifier 31a a noise source. In the conventional structure, the power source line 45 is directly connected to the amplifier module 30 to supply electric power, and the noise generated by the final stage amplifier 31a may be transmitted via the power source line 45 to various electronic elements constituting the wireless communication device, and thus, a measure against the noise generated by the final stage amplifier 31a is necessary. Namely, the direct supply of power to the final stage amplifier 31a requires a power feed circuit that can block all harmonic components (2×f0, 3×f0, . . . ) of the fundamental wave frequency f0, and this makes the structure complicated.

However, according to the first embodiment, if noise is generated at the final stage amplifier 31a, the noise is caused to pass the transmission circuit 37 and is attenuated by the first phase adjustment circuit 33 (a low-pass filter formed of circuit elements including an inductor and a capacitor) included in the transmission circuit 37. Therefore, it is only necessary to block 1.9 GHz which is the fundamental frequency f0 in DECT. Further, even if another noise component enters through the power source line 45, the low-pass filter can attenuate the noise component. Namely, a single low-pass filter formed of circuit elements can suppress both the noise on the transmission signal and the noise from the power supply.

Further, the power source line 45 connected to the first connection point 39a is cut off by the open stub 56 and the inductor L21 each having a transmission line length corresponding to λg/4 as described in the foregoing, and thus, the noise attributed to the carrier wave is prevented from entering the power source line 45. This prevents the noise generated at the final stage amplifier 31a from propagating to the various parts of the device via the power source line 45.

On the other hand, the LNA 36 to which the output end of the reception circuit 38 is connected consumes a relatively low power and does not generate high frequency noise, and thus, though not shown in the drawings, the LNA 36 is supplied with electric power from the power source line 45 directly (via the signal processing unit 10).

With reference to FIG. 5, the structure according to the first embodiment includes the first connection point 39a connecting the output of the transmission circuit 37 and the power source line 45 with each other, and the second connection point 39b connecting the antenna 13 and the input of the reception circuit 38 with each other, where the first connection point 39a and the second connection point 39b are connected with each other via a capacitor (DC-cut capacitor 46).

More specifically, the connection between the power source line 45 and the output end of the transmission circuit 37 is achieved at the first connection point 39a on the first board 59a (see FIG. 6). This first connection point 39a is connected to the via hole 43e extending to the fourth board 59d (see FIG. 8). On the other hand, the input end of the reception circuit 38 is connected to the via hole 43f extending from the first board 59a to the fourth board 59d and is connected to the antenna 13 on the fourth board 59d to form the second connection point 39b (see FIG. 8). Further, the first connection point 39a and the second connection point 39b are connected with each other via the capacitor 46 surface-mounted on the fourth board 59d (see FIG. 8).

Thus, the first connection point 39a and the second connection point 39b are not connected with each other directly. However, as described in the foregoing, for high frequencies such as 1.9 GHz that is used in the wireless communication device according to the present invention, the capacitor is virtually conductive, and thus, it may be considered that the first connection point 39a and the second connection point 39b are electrically connected to form a single connection point 39. Taking this into account, it can be said that the wireless communication device according to the first embodiment includes the antenna 13 that transmits electromagnetic wave, the PA 31 (more specifically the final stage amplifier 31a included in the PA 31) that amplifies the transmission signal transmitted from the antenna 13, the transmission circuit 37 that performs signal processing on the transmission signal amplified by the PA 31, the power source line 45 that supplies electric power to the PA 31, and the connection point 39 that electrically connects the output of the transmission circuit 37 and the antenna 13 with each other, thereby connecting the power source line 45 with the connection point 39 to supply electric power to the PA 31 via the transmission circuit 37.

The foregoing description specifies only the peripheral structure of the transmission circuit 37 of the wireless communication device, and if the structure relating to signal reception is added thereto, it can be said that the structure in the first embodiment includes the antenna 13 that transmits and receives electromagnetic wave, the PA 31 (more specifically the final stage amplifier 31a included in the PA 31) that amplifies the transmission signal transmitted from the antenna 13, the transmission circuit 37 that performs signal processing on the transmission signal amplified by the PA 31, the reception circuit 38 that performs signal processing on the reception signal received by the antenna 13, the power source line 45 that supplies electric power to the PA 31, and the connection point 39 that electrically connects the output of the transmission circuit 37, the input of the reception circuit 38 and the antenna 13 with one another, thereby connecting the power source line 45 with the connection point 39 to supply electric power to the PA 31 via the transmission circuit 37.

Figure 11A:
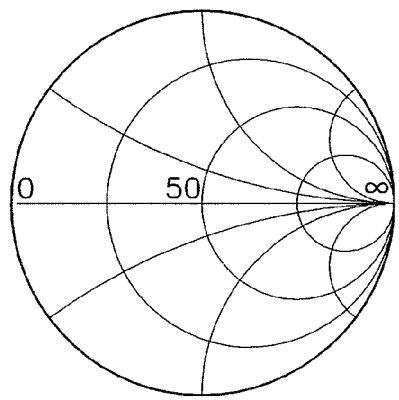
FIG. 11a is an explanatory diagram of an impedance chart.
Figure 11B:
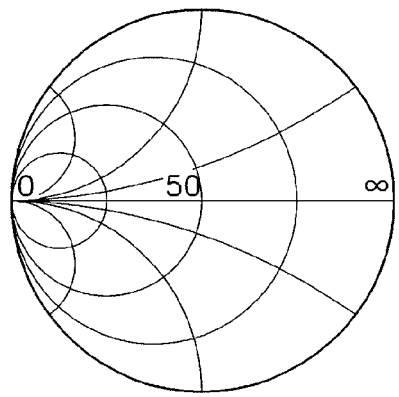
FIG. 11b is an explanatory diagram of an admittance chart.

In general, an impedance chart shown in FIG. 11a is called a Smith chart. The chart shown in FIG. 11b is mirror-symmetric to the impedance chart with respect to the vertical axis, and is called an admittance chart. When an inductor or a capacitor is connected in series with a circuit, one can understand the characteristics of the circuit easily by referring to the impedance chart, and when an inductor or a capacitor is connected in parallel with a circuit, one can understand the characteristics of the circuit easily by referring to the admittance chart.

Figure 11C:
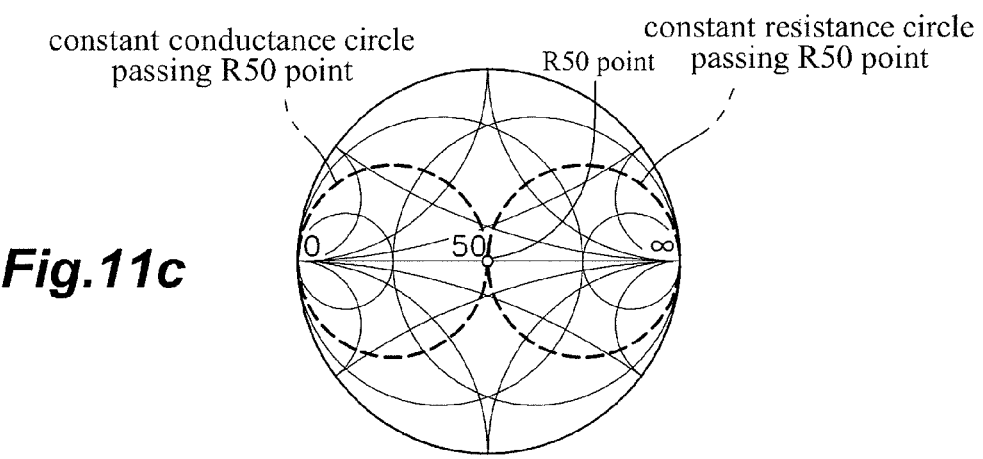
FIG. 11c is an explanatory diagram of an immittance chart.

Since a high-frequency circuit may include inductors and capacitors connected in series and/or in parallel, an immittance chart, in which an impedance chart and admittance chart are superimposed one over the other, is often used (see FIG. 11c). The following description will be made mainly based on the immittance chart. In the immittance chart also, the horizontal line dividing the circles of the chart into upper and lower halves represents a pure resistance component (real part), the left end thereof representing 0Ω (short-circuited), the right end thereof representing ∞Ω (open-circuited), and the center thereof representing 50Ω (R50 point), and upper and lower parts of the chart correspond to the imaginary part.

It is to be noted here that "a constant resistance line (circle) passing the R50 point" is a set of points each representing a complex impedance having a real part equal to 50Ω and a varying imaginary part (absolute value), and "a constant conductance line (circle) passing the R50 point" is a set of points representing the reciprocal of the constant resistance circle passing the R50 point. It is also to be noted that in the following description, the circle passing both the R50 point and the point where impedance=∞ is nothing but the "constant resistance circle passing the R50 point," and the circle passing both the R50 point and the point where impedance=0 is nothing but the "constant conductance circle passing the R50 point." Further, because the later described voltage reflection coefficient Γ=0 at the R50 point, "passing the R50 point" means the same as "passing the point where Γ=0."

FIGS. 12a and 12b and FIGS. 13a-13c are each an explanatory diagram showing a trajectory of an impedance (admittance) on the immittance chart when a certain parameter(s) of an element(s) forming a high-frequency circuit is varied.

FIG. 12a shows the trajectory of the impedance on the immittance chart when a capacitor is added in series with a 50Ω load. In this case, the impedance rotates counterclockwise on the circle passing the R50 point and the point where the impedance=∞Ω (hereinafter, "R∞ point") on the real axis of the immittance chart.

FIG. 12b shows the trajectory of the impedance on the immittance chart when an inductor is added in series with a 50Ω load. In this case, the impedance rotates clockwise on a circle that passes the R50 point and the R∞ point on the real axis of the immittance chart.

Figure 13A:
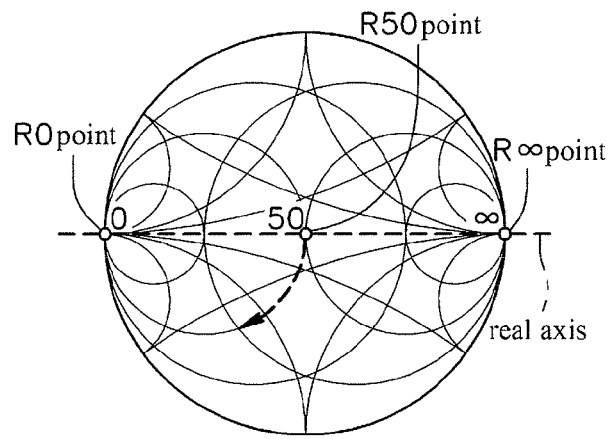
FIGS. 13a to 13c are explanatory diagrams each showing a trajectory of an impedance (admittance) on an immittance chart when a certain parameter(s) of an element(s) forming a high-frequency circuit is varied.

FIG. 13a shows the trajectory of the impedance on the immittance chart when a capacitor is added in parallel with a 50Ω load (one end of the capacitor is grounded). In this case, the impedance rotates clockwise on the circle passing the R50 point and the point where impedance=0 (hereinafter, "R0 point") on the real axis.

Figure 13B:
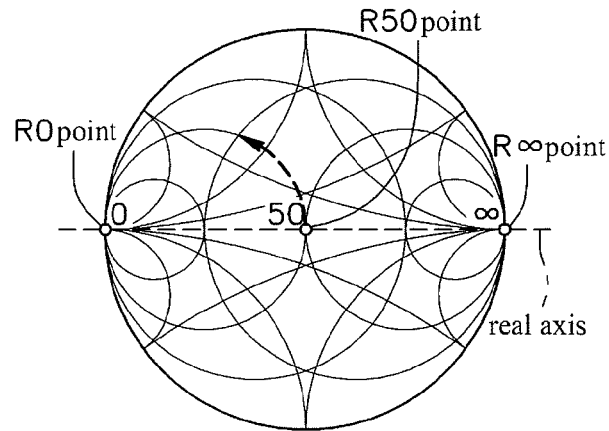

FIG. 13b shows the trajectory of the impedance on the immittance chart when an inductor is added in parallel with a 50Ω load (one end of the inductor is grounded). In this case, the impedance rotates counterclockwise on the circle passing the R50 point and the R0 point on the real axis.

Figure 13C:
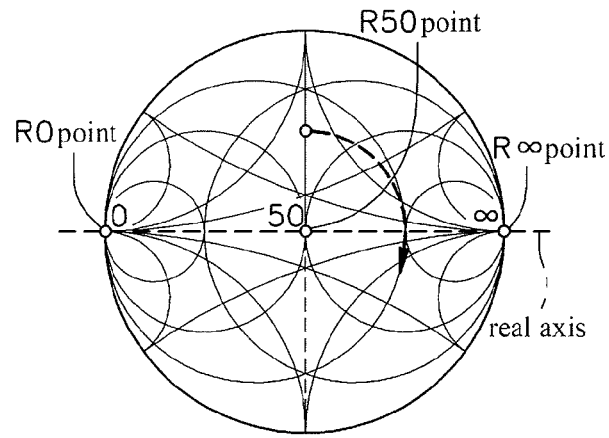

FIG. 13c shows the trajectory of the impedance on the immittance chart when a transmission line is connected in series with a certain impedance load. In this case, the impedance rotates clockwise on the circle having its center at the R50 point. This rotation of the impedance on the immittance chart is caused in accordance with a change in the signal phase in the transmission line. Provided that the wavelength of the signal is λ, for each ¼ λ shift of the signal phase, the impedance rotates a half revolution on the immittance chart. Namely, during a process of the signal phase being shifted by λ, the impedance rotates two revolutions on the immittance chart. Usually, when it is desired to shift the signal phase in the high-frequency circuit, a transmission line is added in series with the circuit, though it is possible to insert a low-pass filter in series so as to shift (delay) the signal phase and obtain the same effect as provided by addition of a transmission line.

In the following, with reference to FIGS. 14-19, detailed description will be made of the state of the impedance of various parts of the transmission circuit 37 according to the first embodiment. The following description will be made taking the transmission circuit 37 as an example for the sake of simplicity, though a similar description applies to the reception circuit 38.

In the following description, the impedance as seen from the antenna 13 toward the transmission circuit 37 when the PA 31 is activated is denoted by ZonT, and the impedance as seen from the antenna 13 toward the transmission circuit 37 when the PA 31 is deactivated is denoted by ZoffT.

Figure 15:
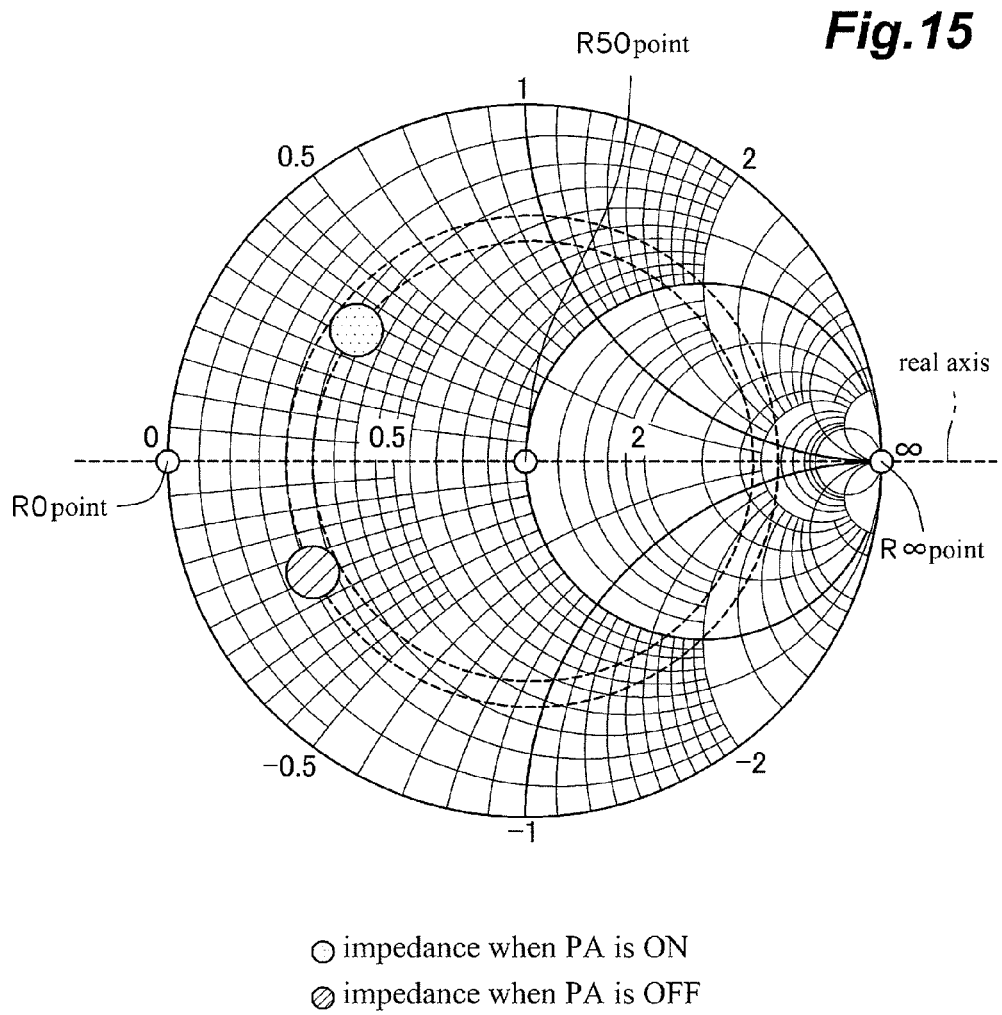
FIG. 15 is an explanatory diagram showing a measured impedance at an output of a PA when the PA is activated (ON) and deactivated (OFF)

FIG. 15 shows an example of the impedance at the output of the PA 31 (CX1 in FIG. 14) when the PA 31 is activated and when the PA 31 is deactivated. The circle with a dotted interior indicates the impedance when the PA 31 is activated, while the circle hatched with oblique lines indicates the impedance when the PA 31 is deactivated. In FIG. 15, these circles are positioned at a substantially same distance from the R50 point, and thus, correspond to a substantially same voltage reflection coefficient Γ, which increases as the impedance moves from the R50 point toward the outer periphery of the Smith chart. As will be described in the following, the wireless communication device according to the first embodiment has a novel feature that is not disclosed in the prior art; that is, even when an amplifier that provides a substantially same initial voltage reflection coefficient Γ when the amplifier is activated and when the amplifier is deactivated is used, the wireless communication device can shift the impedance when the amplifier is activated so as to achieve an impedance-matched state, while shifting the impedance when the amplifier is deactivated so as to achieve a high impedance state.

Figure 16:
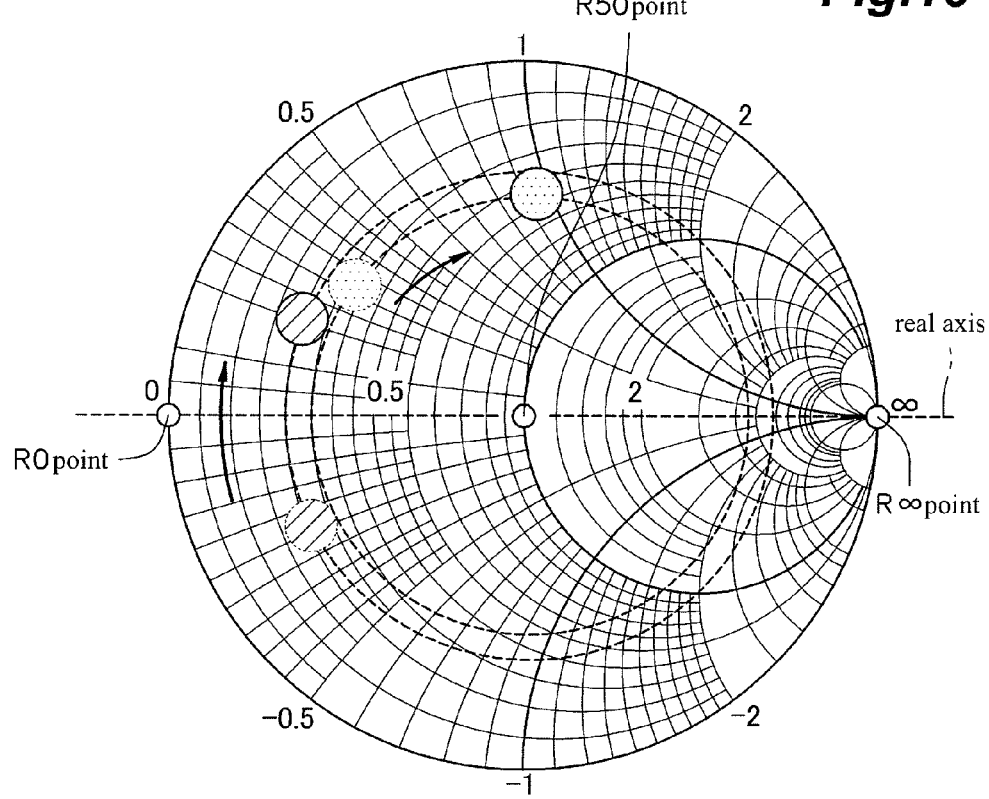
FIG. 16 is an explanatory diagram for explaining a change in the impedance caused by transmission lines LI1, LI2 when the PA is activated (ON) and deactivated (OFF)

FIG. 16 shows an impedance change caused by the transmission lines LI1, LI2 (CX2 in FIG. 14) in the first impedance matching circuit 32. The transmission lines LI1, LI2 added in series with the circuit cause the signal phase in the lines to shift, whereby the impedance rotates on a circle having the R50 point as its center, as described above with reference to FIG. 13c.

It is to be noted that in FIGS. 16-19, the solid line circle with a dotted interior indicates the impedance after shifting when the PA 31 is ON, the broken line circle with a dotted interior indicates the impedance before shifting when the PA 31 is ON, the solid line circle hatched with oblique lines indicates the impedance after shifting when the PA 31 is OFF, and the broken line circle hatched with oblique lines indicates the impedance before shifting when the PA 31 is OFF.

As shown in FIG. 16, each impedance is caused to rotate on the Smith chart by the transmission lines LI1, LI2, such that the two impedances are adjusted so as to be at different distances from the R0 point. It is to be note, however, that even after the impedances are varied (shifted) by the transmission lines LI1, LI2, the two solid line circles are at a substantially same distance from the R50 point, and thus, the voltage reflection coefficient Γ is not varied.

Figure 17:
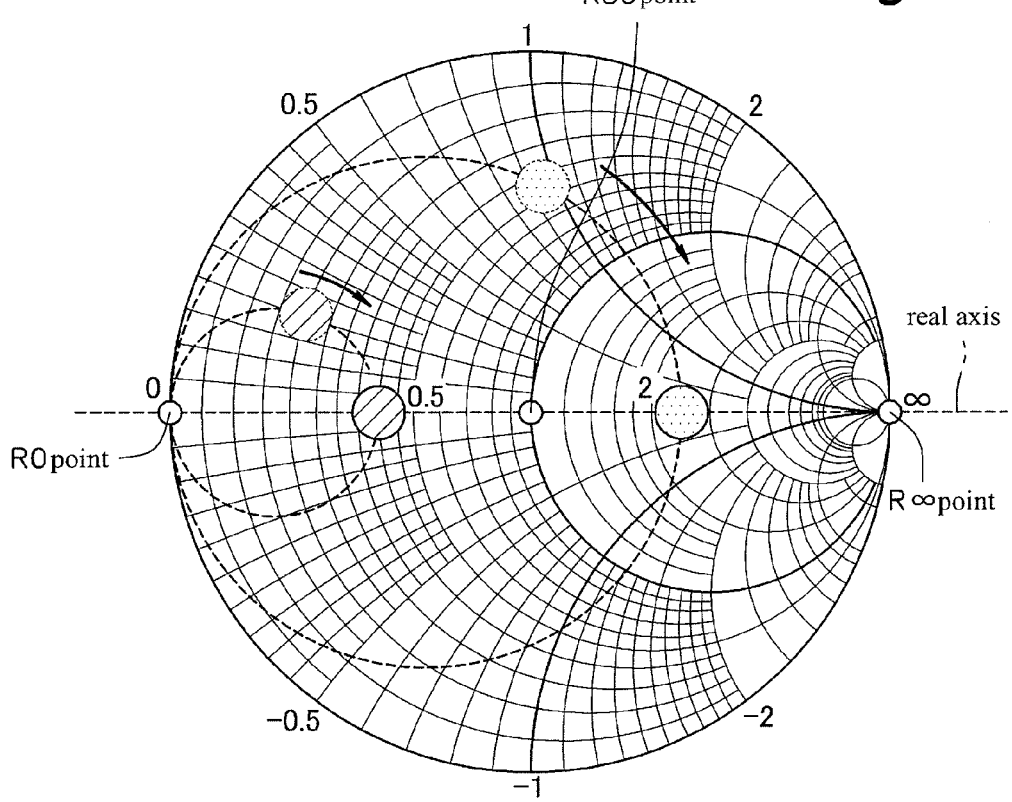
FIG. 17 is an explanatory diagram showing a change in the impedance of the output of a first impedance matching circuit when the PA is activated (ON) and deactivated (OFF)

FIG. 17 shows the impedance at the output of the first impedance matching circuit 32 (CX3 in FIG. 14). Namely, FIG. 17 shows the states before and after the impedance change caused by the capacitors C1,C2. As is described with reference to FIG. 13a, the capacitors cause the impedance to rotate on a circle tangent to the R0 point on the Smith chart, and the capacitance of each capacitor is selected such that at least the impedance of the transmission circuit 37 when the PA 31 is ON is shifted onto the real axis.

It is to be noted that in FIG. 17, the impedance when the PA 31 is OFF is also shifted onto the real axis. This is not essential but ideal, and thus, to achieve this, it is preferred that the amount of rotation around the R50 point, i.e., the transmission line length of the transmission lines LI1, LI2 be set such that "the impedance of the transmission circuit 37 after being shifted as a result of rotation caused by the capacitors C1, C2 is moved onto the real axis both when the PA31 is ON and when the PA 31 is OFF."

Thus, the first impedance matching circuit 32 shifts ZonT and ZoffT so as to approach the real axis of Smith chart.

Figure 18:
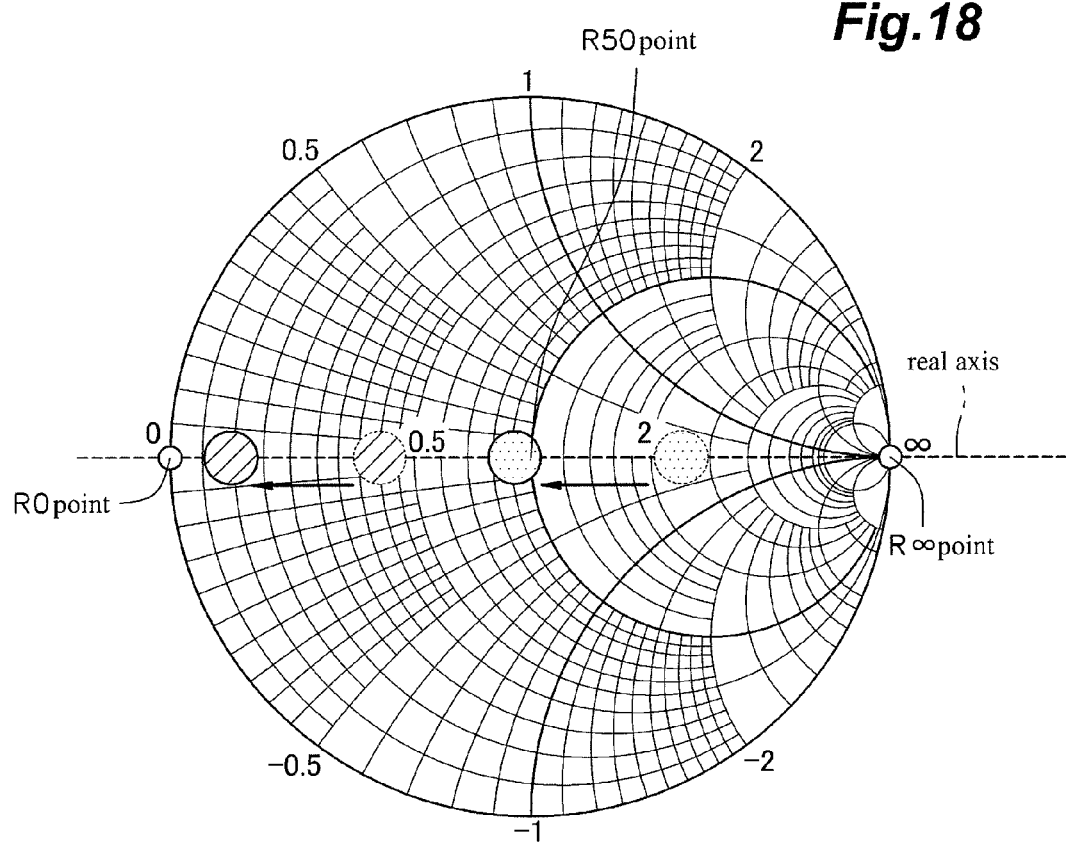
FIG. 18 is an explanatory diagram showing a change in the impedance of the output of a first balun when the PA is activated (ON) and deactivated (OFF)

FIG. 18 shows the impedance at the output of the first balun 40 (CX4 in FIG. 14). As described in the foregoing, the first balun 40 includes parallel circuits as seen from the antenna 13, and thus, if the impedance consists of a pure resistance (i.e., located on the real axis), the impedance as seen from the antenna 13 is reduced to a half. This causes the impedance when the PA 31 is ON to approach the R50 point and the impedance when the PA 31 is OFF to approach the R0 point. Namely, the first impedance matching circuit 32 and the first balun 40 cooperate to make the impedance when the PA 31 is ON approach the R50 point or to achieve impedance matching with the antenna 13, while moving the impedance when the PA 31 is OFF further away from the R50 point (or toward the R0 point).

The first balun 40 is formally an element that converts a differential signal to a single-ended signal, but the function thereof includes an impedance matching function, and thus, in view of the function, the first balun 40 may be considered as part of the first impedance matching circuit 32. Thus, the first impedance matching circuit 32 including the first balun 40 shifts the impedance such that the voltage reflection coefficient Γ of the transmission circuit 37 when the PA 31 is activated moves to the vicinity of 0 (zero), and the voltage reflection coefficient Γ of the transmission circuit 37 when the PA 31 is deactivated increases (more precisely, the absolute value of the voltage reflection coefficient Γ approaches 1 (one)).

Namely, the first impedance matching circuit 32 (including the first balun 40 provided between the first impedance matching circuit 32 and the first phase adjustment circuit 33 as a parallel circuit) shifts ZonT such that the voltage reflection coefficient Γ is moved to the vicinity of 0 and shifts ZoffT such that the absolute value of the voltage reflection coefficient Γ increases.

Figure 19:
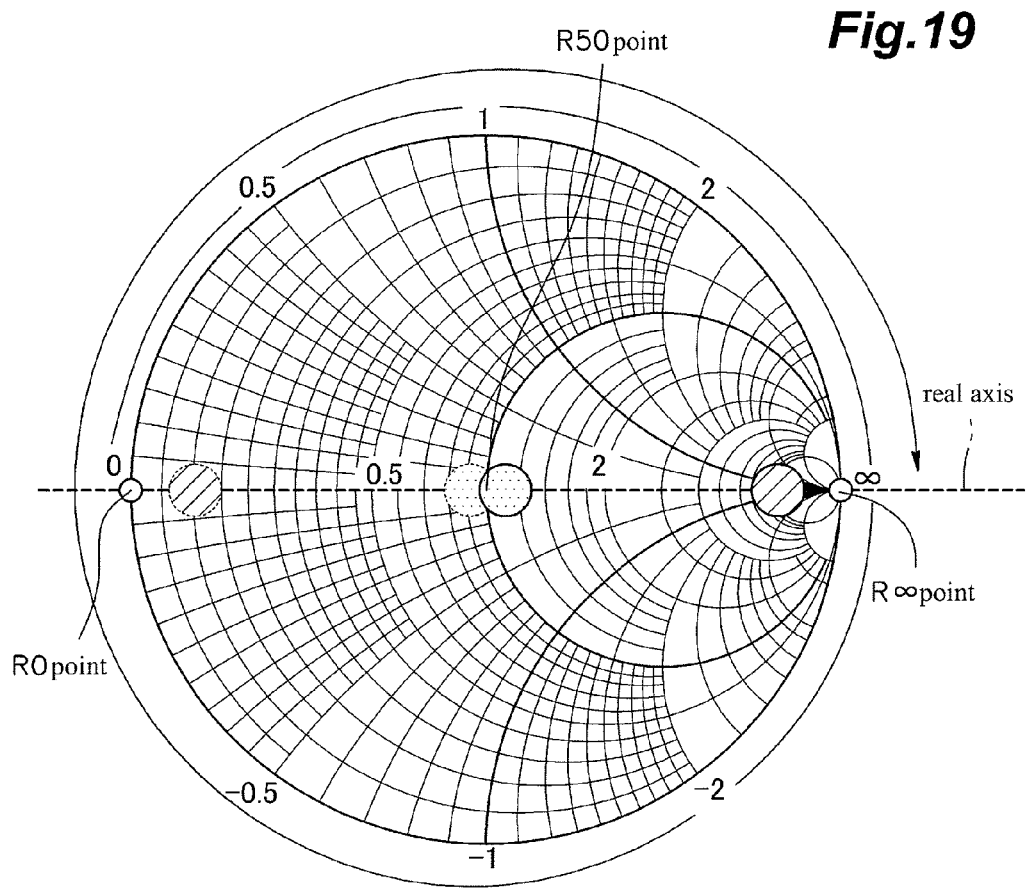
FIG. 19 is an explanatory diagram showing a change in the impedance of the output of a first phase adjustment circuit when the PA is activated (ON) and deactivated (OFF)

FIG. 19 shows the impedance at the output of the first phase adjustment circuit 33 (namely, at the output of the transmission circuit 37. CX5 in FIG. 14). The first phase adjustment circuit 33 in the first embodiment includes a two-stage low-pass filter, as described above, and this causes the signal phase of the transmission signal to shift. Thus, the low-pass filter behaves in the same manner as a transmission line added in series with the circuit, and causes the impedance to rotate on a circle having its center at the R50 point. However, in the first embodiment, the amount of shift of the signal phase is set such that the impedance rotates over one revolution on the Smith chart. In the illustrated embodiment, the first phase adjustment circuit 33 is configured to cause the signal phase of the transmission signal (wavelength λg) propagating in the first board 59a to shift by ¾ λg, such that the impedance rotates on the Smith chart one and a half revolutions. To simply achieve phase adjustment, it is not necessary for the first phase adjustment circuit 33 to cause a phase shift beyond ½ λg. However, to improve the damping property and enhance the low-pass filter function of the first phase adjustment circuit 33 (removal of noise from the transmission signal and prevention of entry of noise from the power source line 45), it is desirable to design the first phase adjustment circuit 33 to cause a large signal phase shift, as described above. On the other hand, in view of the phase adjustment, the first phase adjustment circuit 33 is equivalent to an element shifting the signal phase by just ¼ λg, and this causes the impedance of the transmission circuit 37 when the PA 31 is deactivated to shift from the vicinity of the R0 point to the vicinity of the R∞ point, thereby achieving a high impedance state.

In the foregoing example, description was made with an assumption that the initial state of the impedance of the PA 31 is as that shown in FIG. 15. However, by appropriately selecting the values of LI1, LI2, C1 and C2, the first impedance matching circuit 32 can shift various impedance states to the states shown in FIG. 16 and FIG. 17 via the state shown in FIG. 15. Thus, in the first embodiment, it may be said that the impedance of the transmission circuit 37 when the PA 31 is activated and the impedance of the same when the PA31 is deactivated are first adjusted so as to be substantially symmetric on the Smith chart relative to the horizontal axis (namely, one being inductive and the other being capacitive), and thereafter, the impedance shifting is performed in accordance with the processes described in the foregoing.

In the foregoing, detailed description has been made of the structure and operation of the first phase adjustment circuit 32 (including the first balun 40) and the first phase adjustment circuit 33 in the transmission circuit 37. It is to be appreciated that, with regard to the reception circuit 38 also, the process for separating the impedance-matched state and the high impedance state is the same as that described above, and thus, detailed description therefore is omitted. Namely, provided that the impedance as seen from the antenna 13 toward the reception circuit 38 when the LNA 36 is activated is denoted by ZonR and the impedance as seen from the antenna 13 toward the reception circuit 38 when the LNA 36 is deactivated is denoted by ZoffR, it is only necessary that the parameters of the elements constituting the reception circuit be selected such that the relationship between ZonR and ZoffR similar to the above-described relationship between ZonT and ZoffT is achieved.

Figure 20A:
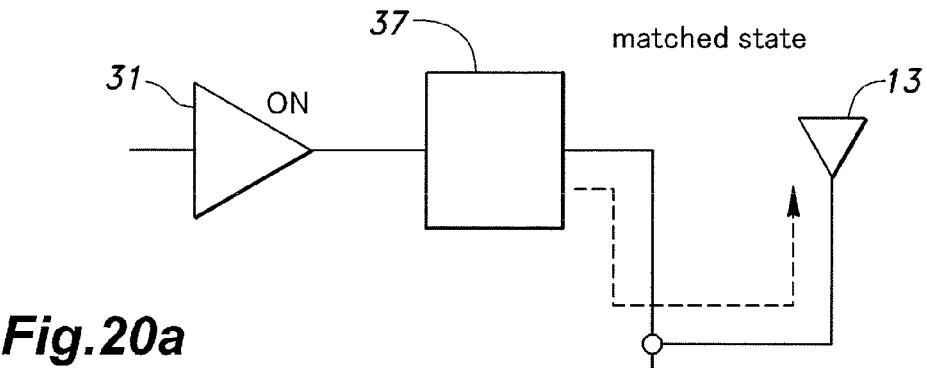
FIG. 20a is an explanatory diagram showing the state of impedance as seen from an antenna when the PA is activated.

As shown in FIG. 20a, when the PA 31 is ON (and the LNA 36 is OFF), the output impedance of the transmission circuit 37 is adjusted to match the antenna 13, so that an electromagnetic wave is emitted from the antenna 13, while the input impedance of the reception circuit 38 is made high, preventing the output from the transmission circuit 37 from flowing to the reception circuit 38.

Figure 20B:
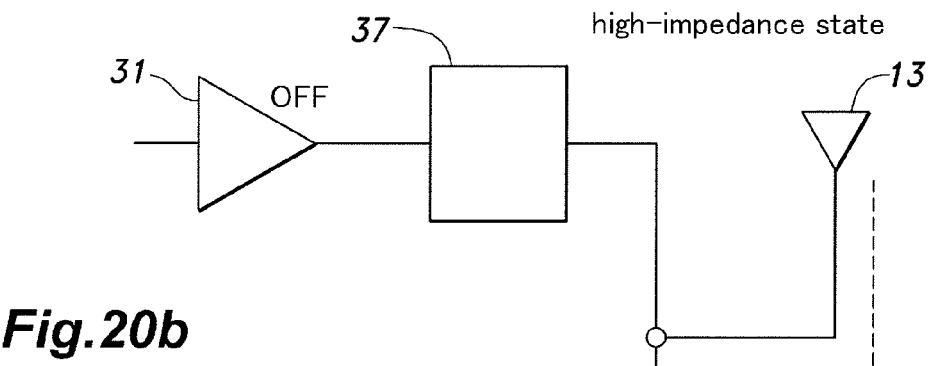
FIG. 20b is an explanatory diagram showing the state of impedance as seen from the antenna when the LNA is activated.

On the other hand, as shown in FIG. 20b, when the PA 31 is OFF (and the LNA 36 is ON), the output impedance of the transmission circuit 37 is made high, while the input impedance of the reception circuit 38 is adjusted to match the antenna 13, whereby the electromagnetic wave received by the antenna 13 is forwarded only to the reception circuit 38, and imparts no affect to the transmission circuit 37.

In the following, with reference to FIGS. 21a-21c, the high impedance state of the transmission circuit 37 and the reception circuit 38 will be described concretely.

With reference to FIG. 21a, in the first embodiment, a high impedance state is defined as a state when the impedance is in the region on the right side of "4Ω" on the real axis of the Smith chart (it is to be noted here that the real axis values in FIG. 21a indicate normalized impedances, and thus, this point generally indicates the point where the impedance is equal to 200Ω (50 Ω×4), and thus, hereinafter will be referred to as "R200 point"), namely, the region in which the impedance has a high resistance greater than or equal to 200Ω on the real axis.

FIG. 21b shows a state in which impedance matching is achieved between the output of the transmission circuit 37 and the antenna 13, and the input of the reception circuit 38 is in the high impedance state. In this state, the output impedance Zs of the transmission circuit 37 and the impedance ZL1 of the antenna 13 are each 50Ω. On the other hand, the input of the reception circuit 38 is in the high impedance state, and its input impedance ZL2 is equal to 200Ω. In this state, as shown in FIG. 21b, current i flows out from the transmission circuit 37 and is split into current i1 flowing to the antenna 13 and current i2 flowing to the reception circuit 38. An equivalent circuit for the structure in FIG. 21b is shown in FIG. 21c.

With regard to this equivalent circuit, a reflection loss will be first evaluated. When the total resistance of the parallel circuit formed of ZL1 and ZL2 is represented by ZL, the voltage reflection coefficient Γ is expressed as follows:

$$\Gamma=(ZL-Zs)/(ZL+Zs) \qquad \text{(Equation 3)}$$

Since the total resistance ZL is equal to $1/(1/200+1/50)=40\Omega$, the voltage reflection coefficient Γ where the impedance in the high impedance state is 200Ω is provided as follows:

$$\Gamma=(40-50)/(40+50)=-0.11$$

The reflection loss RL is defined as follows:

$$RL=1-\Gamma 2 \qquad \text{(Equation 4)}$$

and thus, RL=1−0.11²=0.987, which corresponds to −0.05 dB.

Next, a split loss P due to the current splitting will be calculated.

Given that the impedance ZL1 of the antenna 13 is 50Ω and the impedance ZL2 of the reception circuit 38 is 200Ω, the current i1 flowing to the antenna 13 is provided as {200/(200+50)} i. The split loss P is given by the following Equation 5:

$$P = v \times i1 \quad \text{(Equation 5)},$$

and thus, P is equal to {200/(200+50)} v×i=0.8 v×i, which corresponds to −0.97 dB.

Thus, it is found that total loss=reflection loss+split loss=−0.05−0.97=−1.02 dB.

Figure 22:
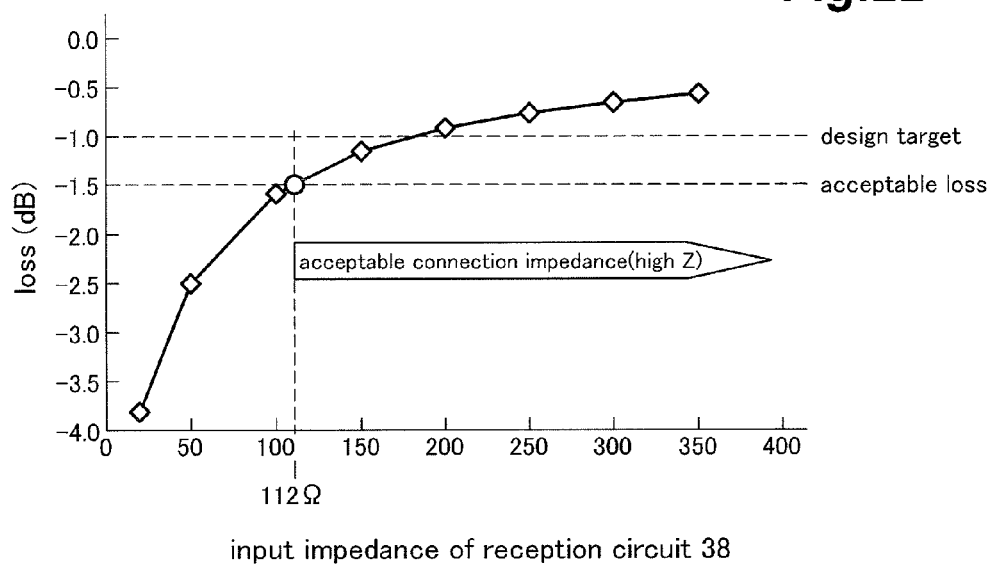
FIG. 22 is a graph showing a relationship between the input impedance of a reception circuit and a total loss when the PA is activated and the LNA is deactivated.

FIG. 22 is a graph showing the loss (total of the reflection loss and the split loss described above) relative to the change in the input impedance of the reception circuit 38 in FIG. 21c, where Zs=ZL1=50Ω (constant). Conventionally, if the RF circuit is formed of an antenna switch module and discrete electronic elements, a loss of about −1.0 dB is empirically considered to impose no problem on the sound quality in simultaneous transmission and reception. Therefore, the loss of −1.0 dB is generally treated as a design target when designing a circuit. As described in the foregoing, the structure according to the first embodiment can achieve the design target.

Further, according to the sensory evaluation performed by the inventors, when the loss becomes larger than about −1.5 dB, deterioration of the sound quality, etc. 音 is perceived, and thus, the loss of −1.5 dB is considered a limit to the acceptable loss. According to FIG. 22, the input impedance of the reception circuit 38 corresponding to the loss of −1.5 dB is about 112 Ω.

Thus, when the PA 31 in the transmission circuit 37 or the LNA 36 in the reception circuit 38 is deactivated, the output impedance of the transmission circuit 37 or the input impedance of the reception circuit 38 as seen from the antenna 13 is made high, and the concrete value of the "high" impedance Z is at least 112Ω (Z≥112Ω (r=2.24×50Ω)), and preferably is at least 200Ω (Z≥200Ω (r=4×50Ω)).

As described above, since ZonT is 50Ω, the first phase adjustment circuit 33 is designed to change the phase of the transmission signal such that the condition ZoffT>2× ZonT is achieved.

(Second Embodiment)

The structure of the wireless communication device according to the second embodiment is basically the same as that of the first embodiment, though some part is modified or changed from the first embodiment. Thus, a structural element in the second embodiment denoted by the same reference number and referred to as the same term as in the first embodiment corresponds to the structural element in the first embodiment denoted by the same reference number and referred to as the same term. It is to be noted that a structural element in the second embodiment referred to as the same term as in the first embodiment but denoted by a different reference number also corresponds to the structural element in the first embodiment referred to as the same term, and the different reference number is used for convenience of description.

In the following, description will be given of the second embodiment of the present invention with reference to FIGS. 23 to 33.

Figure 23:
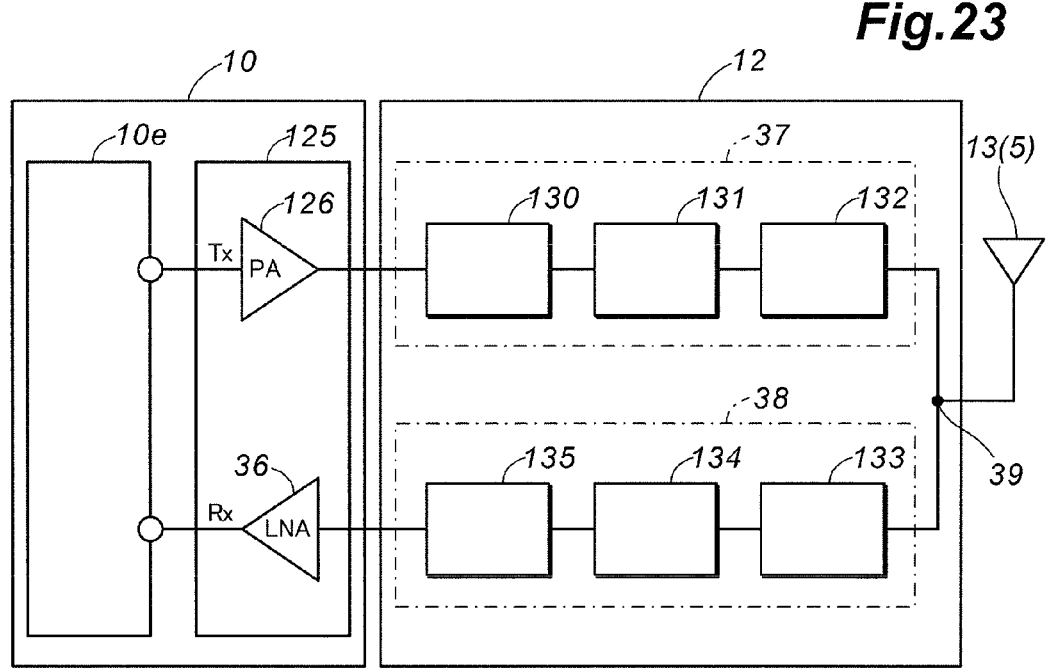
FIG. 23 is a block diagram showing a general structure of an amplifier module and a wireless unit provided in a signal processing unit.

With reference to FIG. 23, an amplifier module 125 is formed of a PA (first amplifier) 126 and an LNA (second amplifier) 36.

A TDD/TDMA processor 10e outputs a control signal to the amplifier module 125 via a path not shown in the drawings to control activation (ON) and deactivation (OFF) of the PA 126 and LNA 36. It is to be noted that a deactivated state may be achieved by not only cutting off power supply to the entirety of the PA 126 but also cutting off power supply to a part of the PA 126, blocking signals to an internal circuit of the PA 126, blocking input/output signals by a gate circuit, etc.

The transmission circuit 37 is formed of a first impedance shifting circuit 130, a first impedance matching circuit 131 and a first phase adjustment circuit 132. The first impedance shifting circuit 130 and the first impedance matching circuit 131 function to match the impedance between the output of the transmission circuit 37 and the antenna 13 when the PA 126 is in the activated state, and to create an impedance mismatch between the transmission circuit 37 and the antenna 13 when the PA 126 is in the deactivated state.

The first phase adjustment circuit 132 causes the impedance of the transmission circuit 37 on the side of the connection point 39 to rotate on the immittance chart (Smith chart) by a prescribed angle irrespective of whether the PA 126 is activated or deactivated, such that the matched impedance state is maintained when the PA 126 is activated, and the impedance is shifted to a high impedance sufficient to achieve a high impedance state when the PA 126 is deactivated.

The reception circuit 38 is formed of a second impedance shifting circuit 135, a second impedance matching circuit 134 and a second phase adjustment circuit 133. The functions of these structural elements are basically the same as those of the corresponding structural elements in the transmission circuit 37 described above. Namely, the second impedance shifting circuit 135 and the second impedance matching circuit 134 function to match the impedance between the antenna 13 and the reception circuit 38 when the LNA 36 is in the activated state, and to create an impedance mismatch between the antenna 13 and the reception circuit 38 when the LNA 36 is in the deactivated state.

The second phase adjustment circuit 133 causes the impedance of the reception circuit 38 on the side of the connection point 39 to rotate on the immittance chart (Smith chart) by a prescribed angle irrespective of whether the LNA 36 is activated or deactivated, such that the matched impedance state is maintained when the LNA 36 is activated, and the impedance is shifted to a high impedance sufficient to achieve a high impedance state when the LNA 36 is deactivated.

Namely, provided that a 50Ω point (corresponds to a 1 (one) Ω point in normalized impedance, and will be referred to as "R50 point" hereinafter) is set on a horizontal line dividing the circles of the Smith chart (including a later-described immittance chart), which is a complex plane, into upper and lower halves (the horizontal line represents a pure resistance component (real part of the impedance) and will be referred to as "real axis" hereinafter), the first impedance shifting circuit 130 and the first impedance matching circuit 131 cause the impedance of the output of the transmission circuit 37 to move to a position in the vicinity of the R50 point when the PA 126 is in the activated state, and cause the output impedance of the transmission circuit 37 to move to a position significantly distant from the R50 point when the PA 126 is in the deactivated state.

It is to be noted that the R50 point indicates the center of the Smith chart. Further, in the Smith chart, the direction perpendicular to the real axis indicates the imaginary part of an impedance, and the value of the imaginary part changes along the outer circumference of the chart. In the region above the real axis, the sign of the imaginary part is positive and in the region below the real axis, the sign of the imaginary part is negative.

The first phase adjustment circuit 132 causes the impedance at the output of the transmission circuit 37 (i.e., at the connection point 39 where the transmission circuit 37 is connected with the antenna 13) to rotate on a circle having the R50 point as its center. Specifically, the first phase adjustment circuit 132 includes an element that causes a phase shift in the transmission signal, thereby causing the impedance to rotate. It is to be noted here that since the first phase adjustment circuit 132 causes the impedance to rotate on a circle having the R50 point as its center by a prescribed angle irrespective of whether the PA 126 is activated or deactivated, the impedance when the PA 126 is activated remains in the matched state even after the rotation (since the impedance is in the vicinity of the R50 point). On the other hand, the impedance when the PA 126 is deactivated may be changed significantly by the rotation, and can be shifted to a high impedance by adjustment of the rotation angle (i.e., an amount of phase shift of the transmission signal determined based on the later-described transmission line length or filter parameter(s)).

It is to be noted that the first impedance shifting circuit 130, first impedance matching circuit 131 and first phase adjustment circuit 132 in the transmission circuit 37 and second impedance shifting circuit 135, second impedance matching circuit 134 and second phase adjustment circuit 133 in the reception circuit 38 are characteristic structural elements in the second embodiment.

Figure 24:
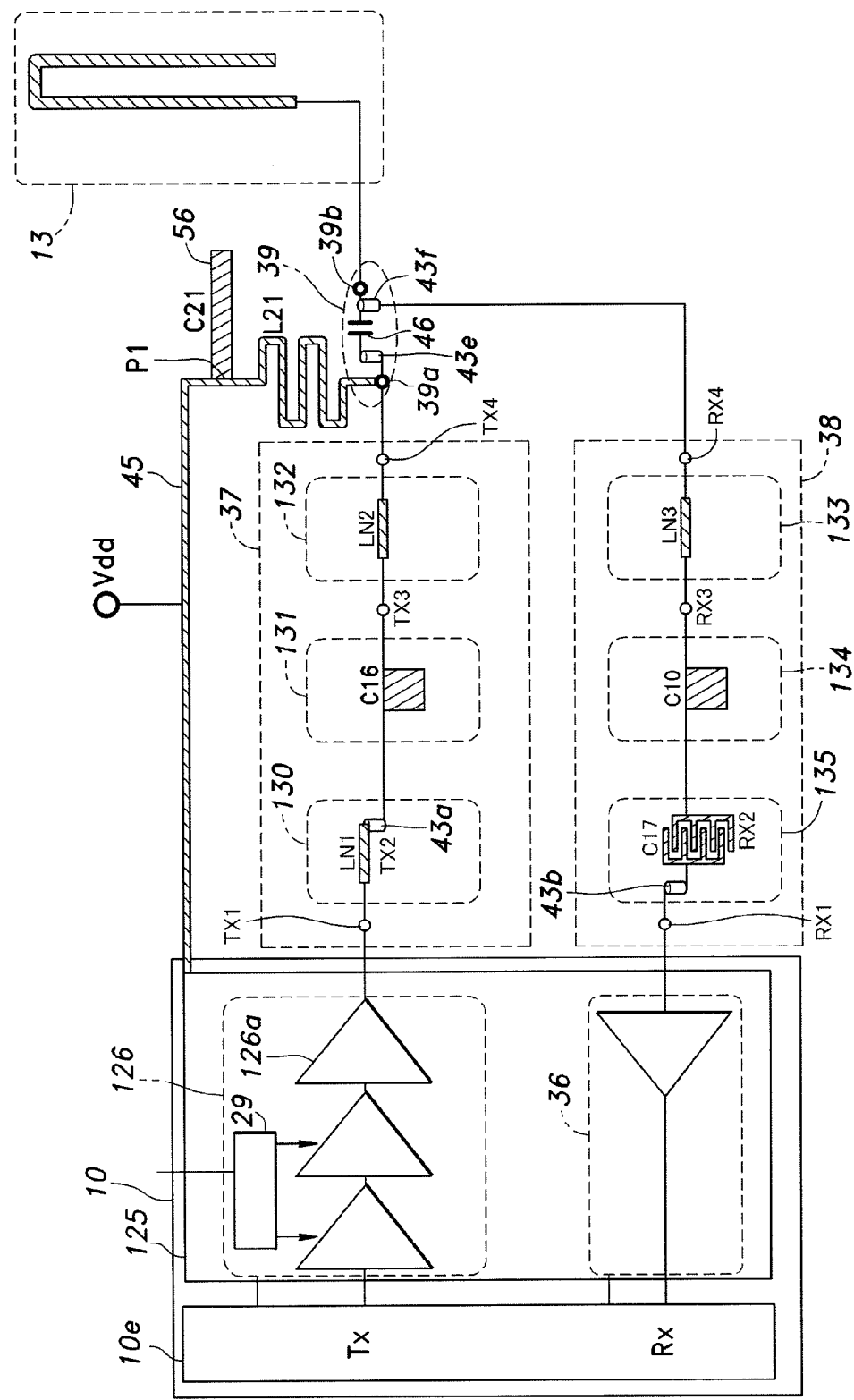
FIG. 24 is a diagram showing a concrete structure of a transmission circuit and a reception circuit.

With reference to FIG. 24, a part hatched with oblique lines extending from the upper right to the lower left represents a transmission line or an inductor, and a part hatched with oblique lines extending from the upper left to the lower right represents a capacitor. Thin lines in the transmission circuit 37 and the reception circuit 38 are dummy lines only indicating the connection relationship between structural elements, and have no physical length and width. Thus, each of the transmission circuit 37 and the reception circuit 38 includes at least an inductor(s) and a capacitor(s) as its circuit elements.

The wireless communication device in the second embodiment also has a multi-layer board structure including first to fourth boards 59a-59d as shown in FIGS. 9a-9e. As shown in FIG. 9b, the second board 59b and the third board 59c are each provided with a ground pattern over a substantially entire surface thereof. The first board 59a has the aforementioned transmission circuit 37, reception circuit 38, power source line 45, etc. formed thereon. In each of the boards 59a to 59d, the copper foils forming the wiring patterns and ground patterns are formed only on the upper surface of the base material of each board, for example. In this way, the patterns formed on one board can be separated from the patterns on another board by the base material, and thus, appropriate electrical insulation in the thickness direction can be achieved.

The first board 59a is sandwiched between the second board 59b and the third board 59c such that the major surfaces of the first board 59a face the second and third boards 59b and 59c, respectively. Each of the second board 59b and the third board 59c has a ground pattern formed over an area corresponding to an area of the first board 59a in which the transmission circuit 37 and reception circuit 38 are positioned, whereby an electromagnetic shield is provided to isolate the transmission circuit 37 and the reception circuit 38 formed on the first board 59a from external electromagnetic waves.

Further, a number of via holes are provided in the first board 59a around the first impedance shifting circuit 130, first impedance matching circuit 131 and first phase adjustment circuit 132 constituting the transmission circuit 37 and around the second impedance shifting circuit 135, second impedance matching circuit 134 and second phase adjustment circuit 133 constituting the reception circuit 38. These via holes are used to connect each other the ground patterns formed on the second board 59b and the third board 59c that interpose the first board 59a therebetween, and thus, the transmission circuit 37 (except for a transmission line LN1 constituting the first impedance shifting circuit 130) and the reception circuit 38 are protected by electromagnetic shield provided not only by the ground patterns on the second and third boards 59b, 59c facing the major surfaces of the first board 59a on which the circuits are formed but also by the via holes in the board 59a.

The capacitors included in the transmission circuit 37 and the reception circuit 38 as structural elements thereof (the capacitors connected in parallel with the circuits) are constituted of wiring patterns (copper foils) formed on the first board 59 and the ground patterns formed on the second board 59b and the third board 59c, which constitute a multi-layer board in cooperation with the first board 59a. Namely, a glass epoxy resin that is a main material of theses boards makes insulation layers of the capacitors. One end of each capacitor is connected to a related circuit such that the capacitor is connected in parallel with the related circuit, while the other end of each capacitor is the ground patterns themselves, and thus, is grounded. It is to be noted that the capacitance of each capacitor can be varied by changing the distance between the pattern on the first board 59a and the pattern on the second board 59b and/or the third board 59c (i.e., the thickness of the boards).

The capacitors connected in series with the circuits (for example, a capacitor C17 in the second impedance shifting circuit 135) each may be formed of a pair of comb-shaped electrodes facing each other such that the capacitor is realized as an assembly of small capacitors formed between the pair of comb-shaped electrodes. This is known as an interdigital capacitor. Alternatively, similarly to the capacitor connected in parallel with the circuit, the capacitor connected in series with the circuit may be realized as a so-called MIM (Metal Insulator Metal) capacitor by use of a pattern partially provided on the multi-layer board (this pattern is not grounded) and a via hole(s).

Further, a transmission line is realized as a wiring pattern drawn so as to oppose a ground pattern (GND). Any wiring pattern having a physical length makes an inductor, but so long as the wiring pattern extends along the ground pattern with a constant line width, the ratio of the inductance L to the capacitance C is constant (L/C=constant (=characteristic impedance)), and thus, a transmission line having a flat frequency characteristic is obtained. The characteristic impedance (such as 50Ω or 75Ω, for example) is low for a thick line and high for a thin line.

Further, an inductor may be realized by connecting lines having different widths (pattern widths) (namely, having different characteristic impedances). Where there is a discontinuity in the width of a line, the ratio between the voltage and the current changes and the electric charge having lost the destination flows back to the upstream side, so that a so-called reflected wave is generated. The reflected wave creates a variation in the distribution of the voltage wave and current wave (Z=V/I), whereby the part where the current wave is large and hence the magnetic field energy is large forms an inductor, while the part where the current wave is small exhibits its capacitive characteristic and forms a capacitor.

The first impedance matching circuit 131 and first phase adjustment circuit 132 forming the transmission circuit 37 and the second impedance shifting circuit 135, second impedance matching circuit 134 and second phase adjustment circuit 133 forming the reception circuit 38 are formed of wiring patterns drawn on the first board 59a. The first impedance shifting circuit 130 is formed of a wiring pattern drawn on the fourth board 59d.

Which of a transmission line, a capacitor and an inductor a wiring pattern functions as is determined uniquely based on the material, width, thickness and shape of the wiring pattern as well as the positional relationship of the wiring pattern relative to the ground pattern (parameters of the wiring pattern). In other words, if the foregoing parameters are known, it is possible to reproduce the actual circuit structure and understand the electric characteristics thereof.

Thus, no discrete electronic element is used and this can reduce the cost significantly. It is to be noted that the transmission circuit 37 and the reception circuit 38 are also surrounded by the ground pattern on the first board 59a.

In the following, description will be made of individual elements constituting the transmission circuit 37 in order along the path through which the transmission signal passes. As shown in FIG. 24, the PA 126 includes a three stage amplifier. The power from the power source line 45 is supplied to the two stages close to the input end Tx after being regulated by a regulator 29 and is mainly used as operating power of a logic circuit. The structure for feeding electric power to the third stage amplifier (final stage amplifier 126a) that is the closest to the input end of the transmission circuit 37 will be described later.

As is described earlier, in the signal processing unit 10 (including the amplifier module 125) implemented on the fourth board 59d or the uppermost board (see FIG. 8), the PA 126 outputs a single-ended signal, and this single-ended signal is input to the first impedance shifting circuit 130.

The first impedance shifting circuit 130 includes a transmission line LN1 formed of a wiring pattern drawn on the fourth board 59d. The transmission line LN1 has one end connected with the output end of the PA 126 for outputting a single-ended signal. The other end of the transmission line LN1 is connected with a via hole 43a. Thus, the transmission line LN1 is connected in series with the PA 126. The output from the transmission line LN1 is transferred via a via hole 43a to the first board 59a, which constitutes the third layer from the top.

The first impedance matching circuit 131 is formed of a capacitor C16 that receives the output from the first impedance shifting circuit 130. The capacitor C16 is formed of a wiring pattern drawn on the first board 59a, and has one end connected to the output end of the transmission line LN1 and the other end grounded.

The length of the transmission line LN1 and the capacitance of the capacitor C16 (concrete values of these parameters are determined depending on the frequency of the signal applied to these circuit elements, the length and width (area) of the wiring patterns formed on the board to realize the elements, etc.) are determined such that impedance matching is achieved between the transmission circuit 37 and the antenna 13 in the state where the PA 126 is activated. For example, the transmission line LN1 shown in FIG. 24 may be formed to have a width of 0.4 mm and a length of 7 mm and the shape (area) of the capacitor C16 shown in FIG. 24 may be determined so as to set the capacitance thereof to be 2.4 pF to adjust the impedance when the PA 126 is activated.

The output from the first impedance matching circuit 131 is input to the first phase adjustment circuit 132. The first phase adjustment circuit 132 includes a transmission line LN2 formed of a wiring pattern drawn on the first board 59a. The transmission line LN2 is connected in series with the output end of the first impedance matching circuit 131. The other end of the transmission line LN2 is connected with the first connection point 39a. The transmission line LN2 has a width of 0.4 mm and a length of 24 mm, for example.

The transmission signal having been subjected to the aforementioned signal processing passes a first connection point 39a, and thereafter, is forwarded from the first board 59a to the uppermost fourth board 59d via a via hole 43e. Then, the transmission signal is emitted to the air from the antenna 13 connected via a DC-cut capacitor 46 on the fourth board 59d. This DC-cut capacitor 46 prevents the voltage (DC bias) applied to the power source line 45 from being transmitted to the antenna 13 and to the reception circuit 38, and allows only the transmission signal to be forwarded to the antennal 13.

The process of adjustment of the impedance of the transmission circuit 37 by the transmission line LN1 constituting the first impedance shifting circuit 130, the capacitor C16 constituting the first impedance matching circuit 131, and the transmission line LN2 constituting the first phase adjustment circuit 132 will be described in detail later with reference to a Smith chart (immittance chart).

In general, the impedance of the output end of the PA 126 changes between when the PA 126 is activated and when the PA 126 is deactivated, and it is only when the PA 126 is activated that impedance matching is achieved by the aforementioned first impedance shifting circuit 130, first impedance matching circuit 131 and first phase adjustment circuit 132.

In other words, in the state where the PA 126 is deactivated, the output impedance of the first impedance matching circuit 131 is not on or in the vicinity of the R50 point on the Smith chart (namely, impedance matching with the antenna 13 is not achieved, though this does not necessarily mean that a high impedance state is achieved). Thus, by shifting the impedance to a point distant from the R50 point by the first impedance shifting circuit 130 and the first impedance matching circuit 131 and further adjusting the impedance by the first phase adjustment circuit 132 that varies the signal phase of the transmission signal, the impedance of the transmission circuit 37 when the PA 126 is deactivated rotates (or changes) around the R50 point significantly and may be shifted to a high impedance state depending on an amount of variation of the signal phase.

In this way, in the state where the PA 126 is activated (namely, during transmission), impedance matching is achieved between the output end of the transmission circuit 37 and the antenna 13, while in the state where the PA 126 is deactivated (namely, during reception), the output end of the transmission circuit 37 is brought into a high impedance state as seen from the antenna 13, preventing the reception signal from flowing into the transmission circuit 37.

It is to be noted that the transmission line LN1 (first impedance shifting circuit 130) connected in series with the circuit and the capacitor C16 (first impedance matching circuit 131) connected in parallel with the circuit exhibit a characteristic of a low-pass filter in relation to signal frequencies. This reduces the signal noise in the transmission circuit 37. In the following, description will be made of a modified embodiment, in which the first phase adjustment circuit 132 also is adapted to function as a low-pass filter.

As described above, in the state where the PA 126 is activated, the output impedance of the first impedance matching circuit 131 in the transmission circuit 37 is adjusted to match the antenna 13 (namely, the impedance is adjusted so as to have a value near the R50 point on the Smith chart). If the signal phase is varied in such an impedance-matched state, the impedance moves on a circle having its center at the R50 point. Namely, in a state where impedance matching has been established, the impedance is in the vicinity of the R50 point that is a rotation center, and therefore, the established impedance matching does not collapse if the signal phase is varied.

Theoretically, it is possible to vary the signal phase by adjusting the length of the transmission line connected in series with an impedance load. However, in some cases, it is possible to reduce the area occupied by the wiring patterns by forming the first phase adjustment circuit 132 of a low-pass filter. This will be explained in the following.

In general, when the damping property of a low-pass filter is improved, the phase delay also is increased, and if this is to be achieved by only adjustment of a transmission line length, a phase delay of ¾ λg, for example, will require a wiring length of 19 mm×3=54 mm. On the other hand, if a low-pass filter is used instead, it can be implemented as a two stage structure, which is compact in size.

In the modified embodiment, the first phase adjustment circuit 132 constitutes a low-pass filter, as described above, but it may be configured to have a band-pass filter characteristic.

In the following, with reference to FIG. 24 and FIG. 9e again, description will be made of individual elements constituting the reception circuit 38 in order along the path through which the reception signal passes.

As shown in FIG. 24, the reception signal received by the antenna 13 passes the second connection point 39b, and thereafter, is forwarded from the fourth board 59d to the reception circuit 38 on the first board 59a via a via hole 43f. The reception signal is first input to the second phase adjustment circuit 133. The second phase adjustment circuit 133 includes a transmission line LN3 formed of a wiring pattern drawn on the first board 59a. One end of the transmission line LN3 is connected with the antenna 13 via the second connection point 39b, and the other end of the transmission line LN3 is connected with the second impedance matching circuit 134. Thus, the transmission line LN3 is connected in series with the antenna 13. The transmission line LN3 has a width of 0.4 mm and a length of 126 mm, for example.

The aforementioned transmission circuit 37 is configured to have a low-pass filter characteristic as a whole to not only shift the signal phase but also remove signal noise (and also to receive DC power supply via the transmission circuit 37, as will be described later). In the reception circuit 38, however, the LNA 36 rarely becomes a noise source, and thus, there is no need for a noise filter, and the impedance of the reception circuit 38 when the LNA 36 is in the deactivated state can be shifted to a sufficiently high impedance by simply connecting the transmission line LN3 in series with the impedance load.

Such a structure corresponds to the characteristics of the LNA 36 adopted in the second embodiment, and another LNA 36 may require a transmission line having a long line length, though, in any case, adjustment of the wiring pattern length can readily achieve a high impedance state of the reception circuit 38 when the LNA 36 is deactivated. It is of course possible to provide a filter that positively rotates the signal phase as the modification of the first phase adjustment circuit 132.

The output from the second phase adjustment circuit 133 is input to the second impedance matching circuit 134. The second impedance matching circuit 134 is formed of a capacitor C10. The capacitor C 10 is formed of a wiring pattern drawn on the first board 59a, and has one end connected to the output of the second phase adjustment circuit 133 and the other end grounded. The capacitor C10 is configured to have a capacitance of 3.8 pF, for example. The output from the second impedance matching circuit 134 is input to the second impedance shifting circuit 135.

The second impedance shifting circuit 135 includes a capacitor C17 formed of a wiring pattern drawn on the first board 59a. One end of the capacitor C17 is connected to the second impedance matching circuit 134 and the other end thereof is connected in series with input end of the LNA 36 for receiving a single-ended signal. Namely, the second impedance shifting circuit 135 includes a capacitor connected in series with the circuit. This capacitor may be formed as the aforementioned interdigital capacitor, for example.

The output from the second impedance shifting circuit 135 is forwarded from the first board 59a to the uppermost fourth board 59d via the via hole 43b, and is input to the LNA 36 of the amplifier module 125 included in the signal processing unit 10 implemented on the fourth board 59d. The LNA 36 amplifies the reception signal and provides it to the TDD/TDMA processor 10e.

The process of adjustment of the impedance of the reception circuit 38 by the capacitor C17 constituting the second impedance shifting circuit 135, the capacitor C10 constituting the second impedance matching circuit 134, and the transmission line LN3 constituting the second phase adjustment circuit 133 will be described in detail later with reference to an immittance chart.

In general, the impedance of the input end of the LNA 36 changes between when the LNA 36 is activated and when the LNA 36 is deactivated, and it is only when the LNA 36 is activated that impedance matching is achieved by the aforementioned second impedance shifting circuit 135, second impedance matching circuit 134 and second phase adjustment circuit 133.

In other words, in the state where the LNA 36 is deactivated, the input impedance of the second impedance matching circuit 134 is not on or in the vicinity of the R50 point on the Smith chart (namely, impedance matching with the antenna 13 is not achieved, though this does not necessarily mean that a high impedance state is achieved). Thus, by shifting the impedance to a point distant from the R50 point by the second impedance shifting circuit 135 and the second impedance matching circuit 134 and further adjusting the impedance by the second phase adjustment circuit 133 that varies the signal phase of the reception signal, the impedance of the reception circuit 38 when the LNA 36 is deactivated rotates (or change) around the R50 point significantly and may be shifted to a high impedance state depending on an amount of variation of the signal phase.

In this way, in the state where the LNA 36 is activated (namely, during reception), impedance matching is achieved between the input end of the reception circuit 38 and the antenna 13, while in the state where the LNA 36 is deactivated (namely, during reception), the input end of the reception circuit 38 is brought into a high impedance state as seen from the antenna 13, preventing the transmission signal from flowing into the reception circuit 38.

Hereinafter, with reference to FIG. 24, description will be given of the structure of the power source line 45 (structure for supplying power) in the second embodiment.

As shown in FIG. 24, the power source line (power source) 45 includes a capacitor C21 and an inductor L21, the inductor L21 having one end connected to the output end of the transmission circuit 37 at the first connection point 39a. The capacitor C21 connected to the power source line 45 forms an open stub 56 on the circuit. It is to be noted here that a stub is a distributed constant line connected in parallel with a transmission line in a high-frequency circuit, and particularly, the one having an open end in accordance with a type of a terminal load is referred to as an open stub. In the second embodiment, the length of the open stub 56 is set to be 19 mm. Further, provided that the connection point between the open stub 56 and the inductor L21 is referred to as a connection point P1, the length of the inductor L21 disposed between the first connection point 39a and the point P1 (namely, inserted in series with the power source line 45) is also set to be 19 mm. The length of 19 mm corresponds to λg/4.

This means that, in the structure configured as above, if the impedance of the power source line 45 is 0, the impedances of the terminal end of the open stub 56 and the output end of the transmission circuit 37 (namely, first connection point 39a) as seen from the power source line 45 are ∞. It is to be noted here that the circuit behaves as having an impedance of ∞ for 1.9 GHz which is a carrier wave frequency, and thus, the output from the transmission circuit 37 modulated at 1.9 GHz cannot enter the power source line 45. Similarly, the 1.9 GHz reception signal received by the antenna 13 cannot enter the power source line 45. Therefore, according to this structure, it is possible to reliably prevent noise from entering the power source from the transmission circuit 37 or the antenna 13.

On the other hand, the power source line 45 supplies DC electric power to the final stage amplifier 126a of the PA 126 via the first connection point 39a and the transmission circuit 37. The transmission power (antenna power) set forth by the DECT standard is on the order of 10 mW in average, but the final stage amplifier 126a consumes a relatively large power, and is repeatedly activated (ON) and deactivated (OFF) at a frequency of several hundred Hz, generating a rush current or the like, which tends to make the final stage amplifier 126a a noise source. In the conventional structure, the power source line 45 is directly connected to the amplifier module 125 to supply electric power, and the noise generated by the final stage amplifier 126a may be transmitted via the power source line 45 to various electronic elements constituting the wireless communication device, and thus, a measure against the noise generated by the final stage amplifier 126a is necessary. Namely, the direct supply of power to the final stage amplifier 126a requires a power feed circuit that can block all harmonic components (2×f0, 3×f0, . . . ) of the fundamental wave frequency f0, and this makes the structure complicated.

However, according to the second embodiment, if the noise generated at the final stage amplifier 126a is superimposed on the transmission signal, the noise is caused to pass the transmission circuit 37 and is attenuated by the low-pass characteristic of the transmission circuit 37 (owing to the transmission line LN1 connected in series with the circuit and the capacitor C1 in parallel with the circuit or owing to the low-pass filter described in the modified embodiment). Therefore, it is only necessary to block 1.9 GHz which is the fundamental frequency f0 in DECT. Further, even if another noise component enters through the power source line 45, the low-pass filter can attenuate the noise component. Namely, a single low-pass filter formed of circuit elements can suppress both the noise on the transmission signal and the noise from the power supply.

Further, the power source line 45 connected to the first connection point 39a is cut off by the open stub 56 and the inductor L21 each having a line length corresponding to λg/4 as described in the foregoing. Thus, the noise attributed to the carrier wave is prevented from entering the power source line 45. This prevents the noise generated at the final stage amplifier 126a from propagating to the various parts of the device via the power source line 45.

On the other hand, the LNA 36 to which the output end of the reception circuit 38 is connected consumes a relatively low power and does not generate high frequency noise, and thus, though not shown in the drawings, the LNA 36 is supplied with electric power from the power source line 45 directly (via the signal processing unit 10).

It is to be noted that theoretically, the first impedance shifting circuit 130 or the like may include a capacitor connected in series with the circuit (for the purpose of achieving impedance matching). However, in the second embodiment, the final stage amplifier 126a of the PA 126 is supplied with DC power supply via the transmission circuit 37, and thus, the transmission circuit 37 should have a low-pass characteristic in principle. If a structure having a high-pass characteristic (e.g., a transmission circuit 37 including a capacitor connected in series to the circuit) were adopted, an additional power source circuit would become necessary, and if an inductor connected in parallel with the circuit (i.e., an inductor having one end grounded) were included, an additional DC-cut filter or the like would become necessary, complicating the structure of the circuit.

On the other hand, there is no such restriction on the reception circuit 38. Therefore, it is possible, for example, to constitute the second impedance shifting circuit 135 of a capacitor connected in series with the circuit, while constituting the second impedance matching circuit 134 of an inductor or a capacitor connected in parallel with the circuit. This makes the reception circuit 38 have a high-pass filter characteristic, preventing the static electricity or the like from entering the circuit.

With reference to FIG. 24, the structure according to the second embodiment includes the first connection point 39a connecting the output of the transmission circuit 37 and the power source line 45 with each other, and the second connection point 39b connecting the antenna 13 and the input of the reception circuit 38 with each other, where the first connection point 39a and the second connection point 39b are connected with each other via a capacitor (DC-cut capacitor 46).

More specifically, the connection between the power source line 45 and the output end of the transmission circuit 37 is achieved at the first connection point 39a on the first board 59a. This first connection point 39a is connected to the via hole 43e extending to the fourth board 59d. On the other hand, the input end of the reception circuit 38 is connected to the via hole 43f extending from the first board 59a to the fourth board 59d and is connected to the antenna 13 on the fourth board 59d to form the second connection point 39b. Further, the first connection point 39a and the second connection point 39b are connected with each other via the DC-cut capacitor 46 surface-mounted on the fourth board 59d.

Thus, the first connection point 39a and the second connection point 39b are not connected with each other directly. However, as described in the foregoing, for high frequencies such as 1.9 GHz that is used in the wireless communication device according to the present invention, the capacitor is virtually conductive, and thus, it may be considered that the first connection point 39a and the second connection point 39b are electrically connected to form a single connection point 39.

In the following, detailed description will be made of the process for adjusting the impedance of the wireless communication device according to the second embodiment.

Figure 25:
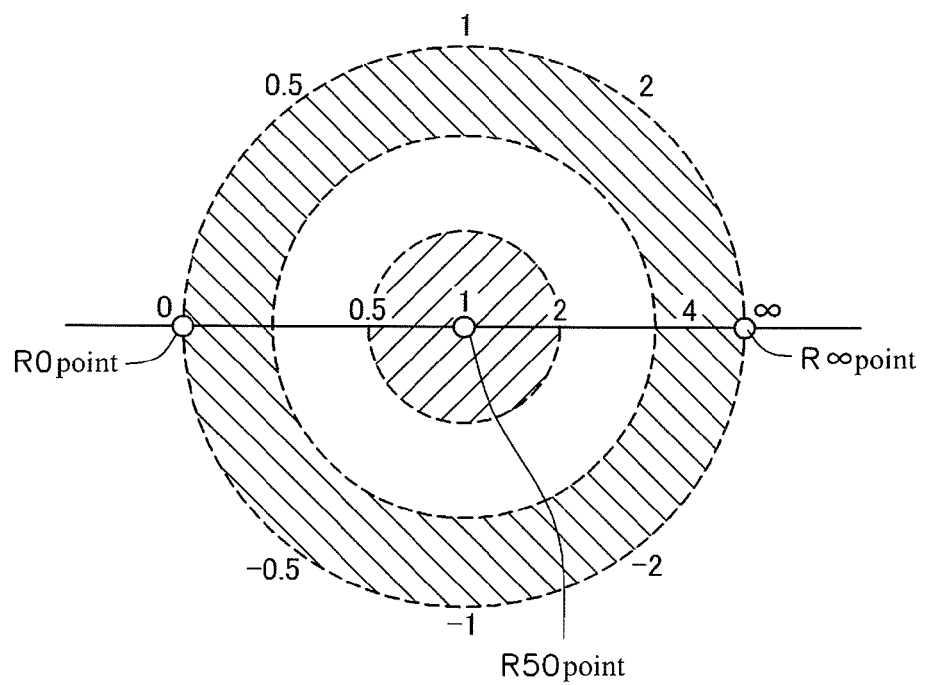
FIG. 25 is an explanatory diagram for explaining target ranges for impedance matching and impedance separation.

As shown in FIG. 25, in the second embodiment, a part of the immittance chart outer than the 4Ω point on the real axis (it is to be noted here that the real axis values in FIG. 21a indicate normalized impedances, and thus, this point generally indicates the point where the impedance is equal to 200Ω (50Ω×4)), namely, a region in which the impedance has a high value greater than or equal to 200Ω on the real axis is considered to correspond to a high impedance state. On the other hand, a region from 0.5 to 2Ω on the real axis, namely, a region from 25 (50×0.5) to 100 (50×2)Ω, is considered to correspond to an impedance-matched state.

It is to be noted that when a circle is drawn to have a center at the R50 point, the right one of the intersection points between the circle and the real axis directly indicates a value of VSWR (Voltage Standing Wave Ratio). Provided that the impedance when the PA 126 or the LNA 36 is ON is referred to as Zon and the impedance when the PA 126 or the LNA 36 is OFF is referred to as Zoff, a desired impedance condition at a certain point during the process of adjustment of the impedance can be expressed using the VSWR as follows:

for Zon, VSWR≤2.0
for Zoff, VSWR≥4.0

By adjusting Zon to achieve the condition VSWR≤2.0, the total reflection loss of the circuit can be made no larger than 0.5 dB, and by adjusting Zoff to achieve the condition VSWR≥4.0, it is possible to suppress the split loss so as to be no larger than 1 dB.

It is to be noted that the absolute value of a voltage reflection coefficient Γ that will be used in the following description is defined as follows:

$$\text{abs}(\Gamma) = (VSWR-1)/(VSWR+1) \quad \text{(Equation 3)}$$

(where abs ( ) is a function that provides an absolute value)

It is also to be noted that in the foregoing description and in the following description, the expression "the vicinity of the R50 point" means a region around the R50 point where VSWR≤2.0. Further, the expressions "the vicinity of the constant conductance circle passing the R50 point" and "the vicinity of the constant resistance circle passing the R50 point" indicate such a region that Zon positioned in the region can be moved to "the vicinity of the R50 point" by rotating it along the constant conductance circle or the constant resistance circle.

In the following, with reference to FIGS. 26-29, detailed description will be made of the impedance state at points TX1 to TX4 (see FIG. 24) in the transmission circuit 37 of the second embodiment.

In the following description, the impedance as seen from the antenna 13 toward the transmission circuit 37 when the PA 126 is activated (ON) is denoted by ZonT, and the impedance as seen from the antenna 13 toward the transmission circuit 37 when the PA 126 is deactivated (OFF) is denoted by ZoffT.

Figure 26:
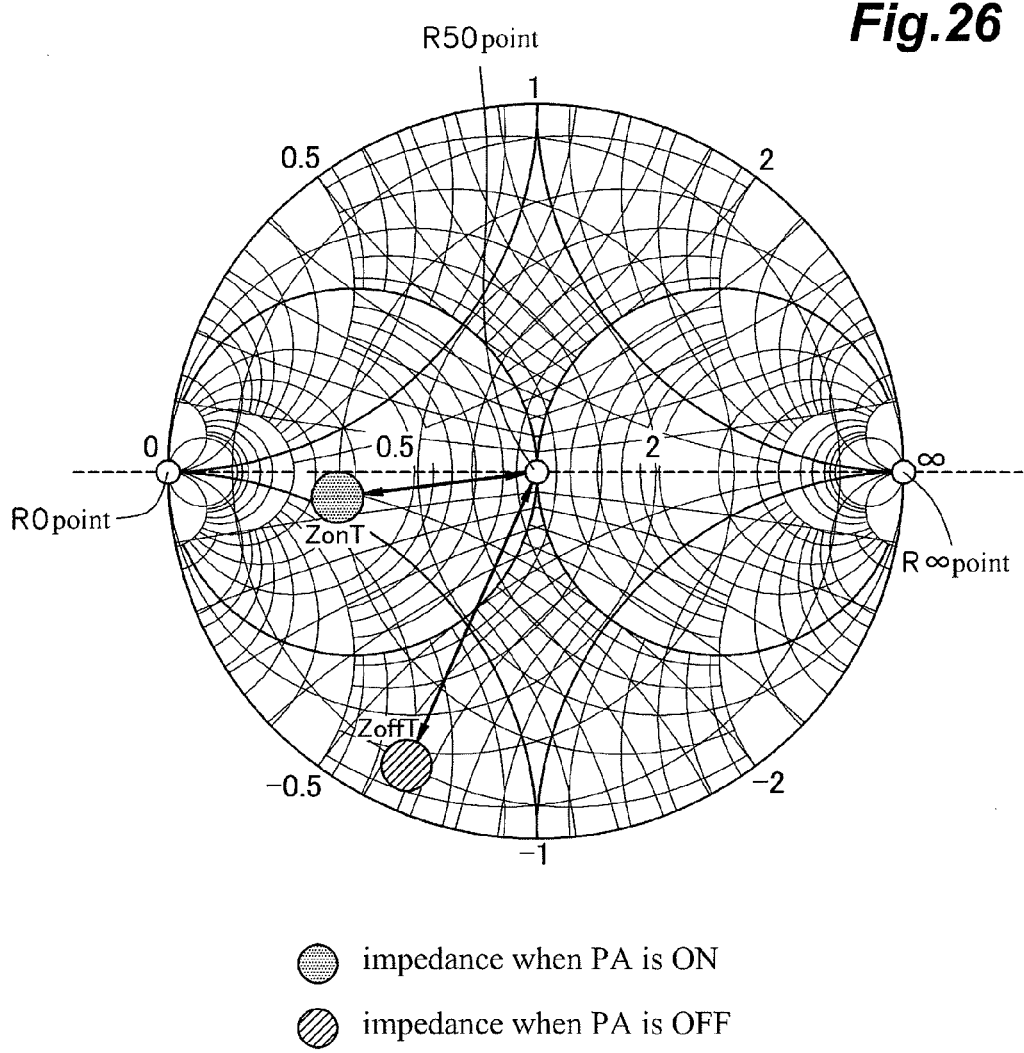
FIG. 26 is an explanatory diagram showing a measured impedance at the output (TX1 in FIG. 24) of the PA when the PA is activated (ON) and deactivated (OFF)

FIG. 26 shows an example of the impedance ZonT at the output of the PA 126 (TX1 in FIG. 24) when the PA 126 is activated (ON) and the impedance ZoffT at the output of the PA 126 when the PA 126 is deactivated (OFF). The circle with a dotted interior indicates the impedance when the PA 126 is activated, while the circle hatched with oblique lines indicates the impedance when the PA 126 is deactivated.

In FIG. 25, these circles are positioned at a substantially same distance from the R50 point, and thus, correspond to a substantially same voltage reflection coefficient Γ, which increases as the impedance moves from the R50 point (Γ=0) toward the outer periphery of the immittance chart. As will be described in the following, the wireless communication device according to the second embodiment has a novel feature that is not disclosed in the prior art; that is, even when an amplifier that provides a substantially same initial voltage reflection coefficient Γ when the amplifier is activated and when the amplifier is deactivated is used, the wireless communication device can shift the impedance when the amplifier is activated so as to achieve an impedance-matched state, while shifting the impedance when the amplifier is deactivated so as to achieve a high impedance state.

Figure 27:
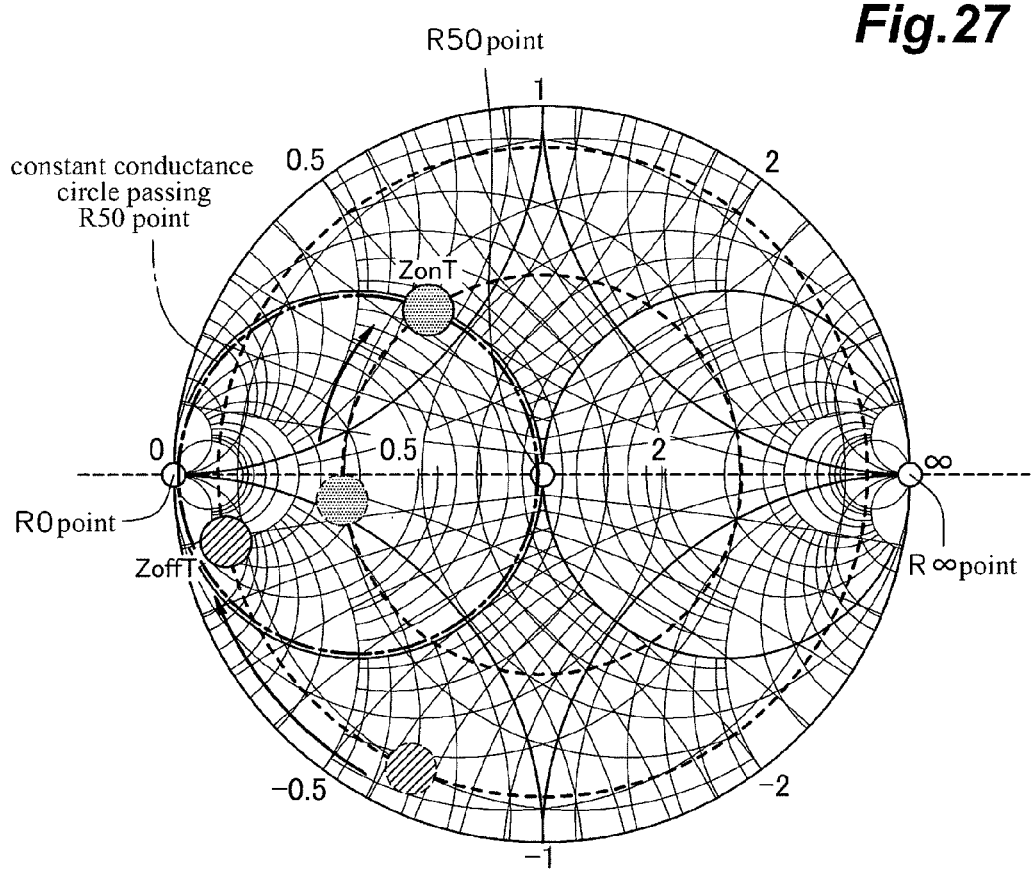
FIG. 27 is an explanatory diagram for explaining a change in the impedance caused by a transmission line LN1 (TX2 in FIG. 24) when the PA is activated (ON) and deactivated (OFF)

FIG. 27 shows an impedance change caused by the transmission line LN1 (TX2 in FIG. 14) forming the first impedance shifting circuit 130. The transmission line LN1 added in series to the circuit causes the signal phase in the line to shift, whereby the impedance rotates clockwise on a circle having the R50 point as its center, as described above with reference to FIG. 13*c*. The rotation of the impedance caused by the transmission line LN1 is a rotation about the R50 point, and therefore, the value of the voltage reflection coefficient Γ does not change before and after the rotation, for each of ZonT and ZoffT.

With regard to the first impedance shifting circuit 130, the line length of the transmission line LN1 is determined so as to move ZonT onto "the constant conductance circle passing the R50 point" (or the vicinity thereof). Further, the first impedance shifting circuit 130 shifts ZonT and ZoffT on the immittance chart, which is a complex plane, to coordinates having opposite signs of imaginary part. Specifically, in FIG. 27, the sign of the imaginary part of ZonT is positive, while the sign of the imaginary part of ZoffT is negative. Thus, ZonT and ZoffT are shifted to positions opposing each other interposing the real axis therebetween. In other words, the foregoing operation causes ZonT and ZoffT of the transmission circuit 37 to shift to opposite sides of the immittance chart relative to the horizontal axis thereof (one corresponding to an inductive characteristic, the other corresponding to a capacitive characteristic).

Figure 28:
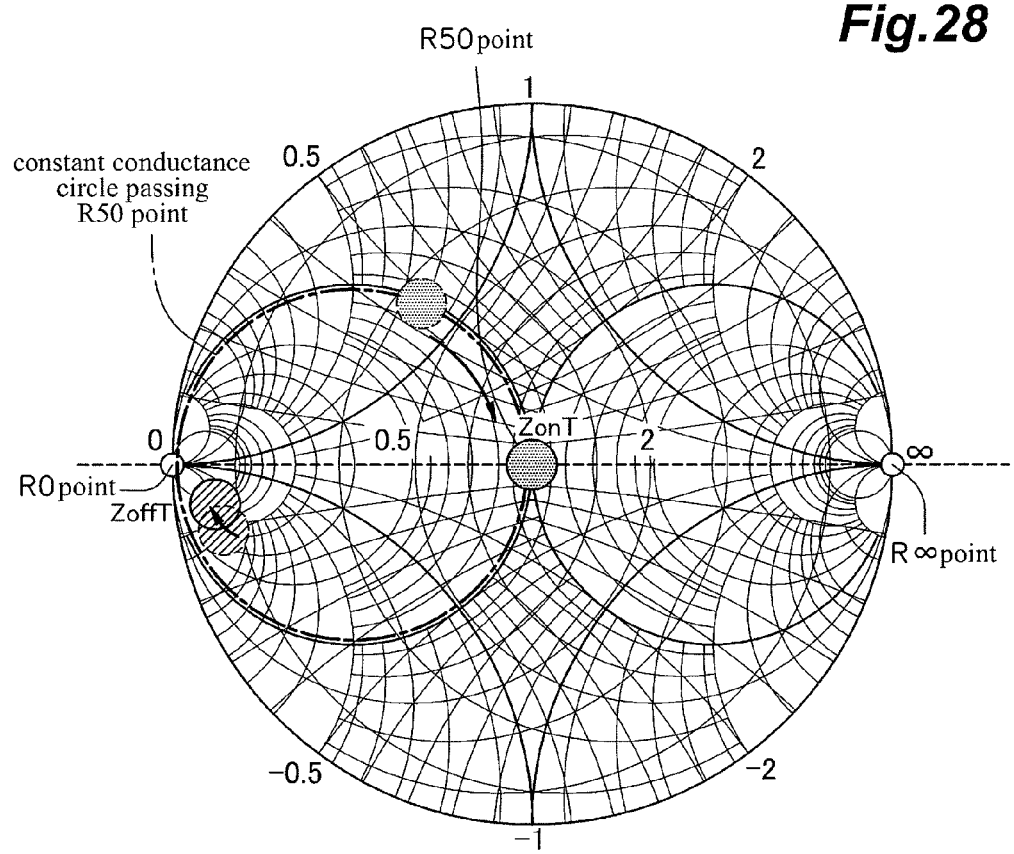
FIG. 28 is an explanatory diagram showing a change in the impedance of the output (TX3 in FIG. 24) of a first impedance matching circuit when PA the PA is activated (ON) and deactivated (OFF)
Figure 29:
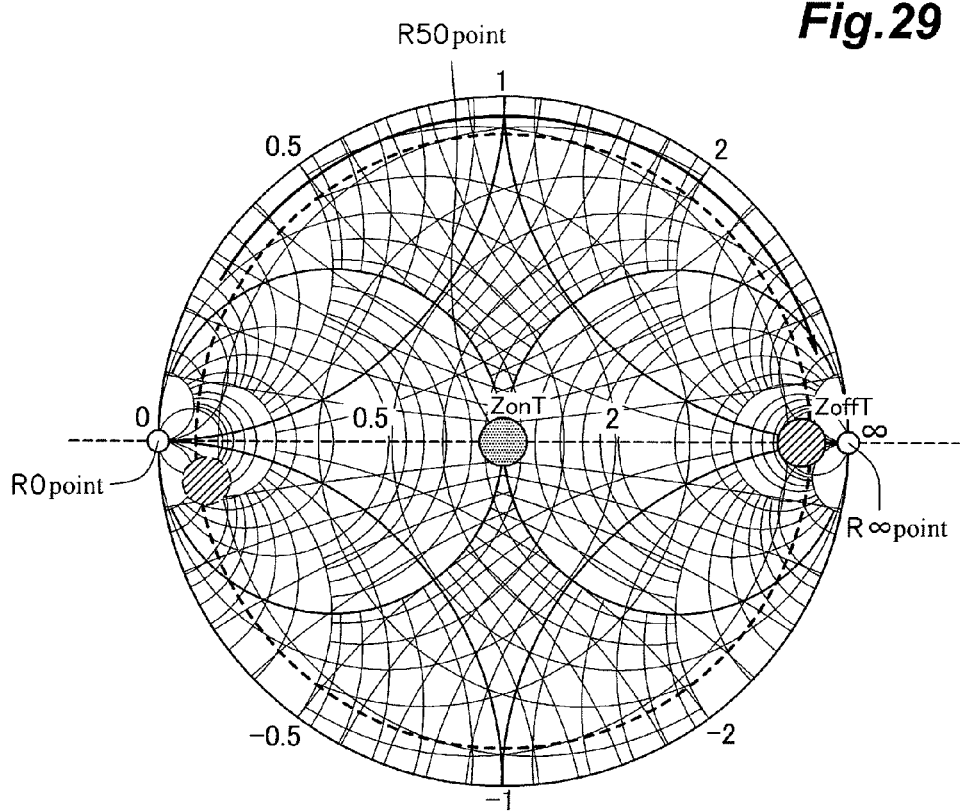
FIG. 29 is an explanatory diagram showing a change in the impedance of the output (TX4 in FIG. 24) of a first phase adjustment circuit when the PA is activated (ON) and deactivated (OFF)
Figure 36:
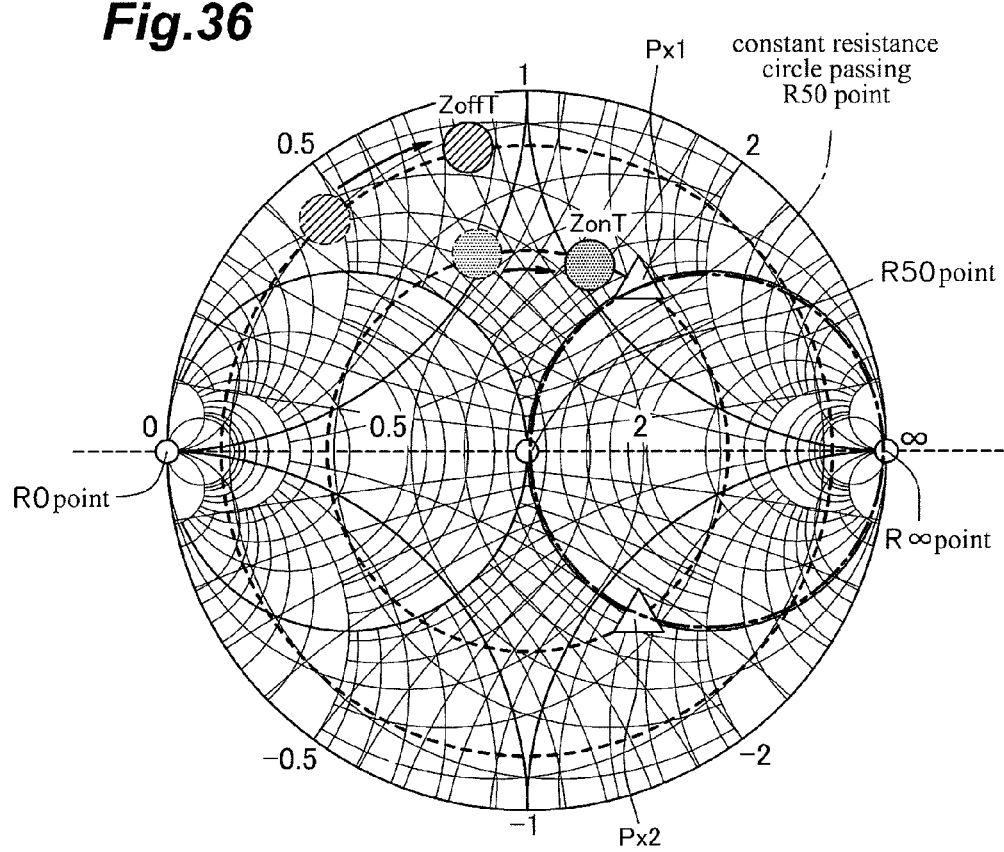
FIG. 36 is an explanatory diagram for explaining a change in the impedance caused by a transmission line LN10 (CX2 in FIG. 34) when the PA is activated (ON) and deactivated (OFF)
Figure 37:
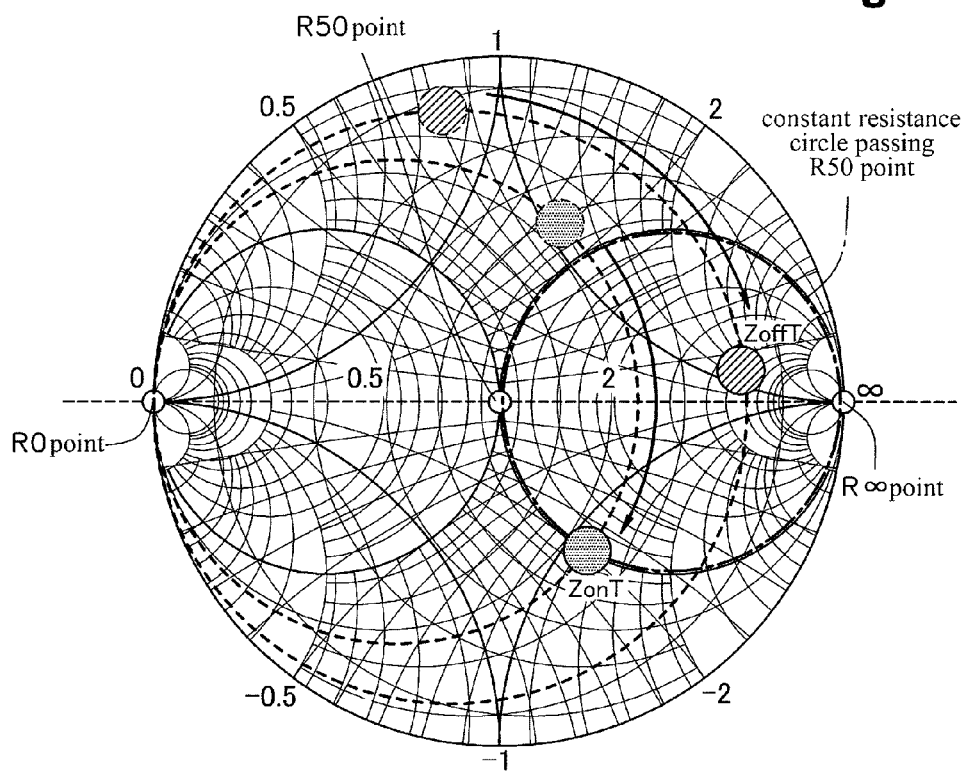
FIG. 37 is an explanatory diagram showing a change in the impedance of the output (CX3 in FIG. 34) of a first impedance shifting circuit when the PA is activated (ON) and deactivated (OFF)
Figure 38:
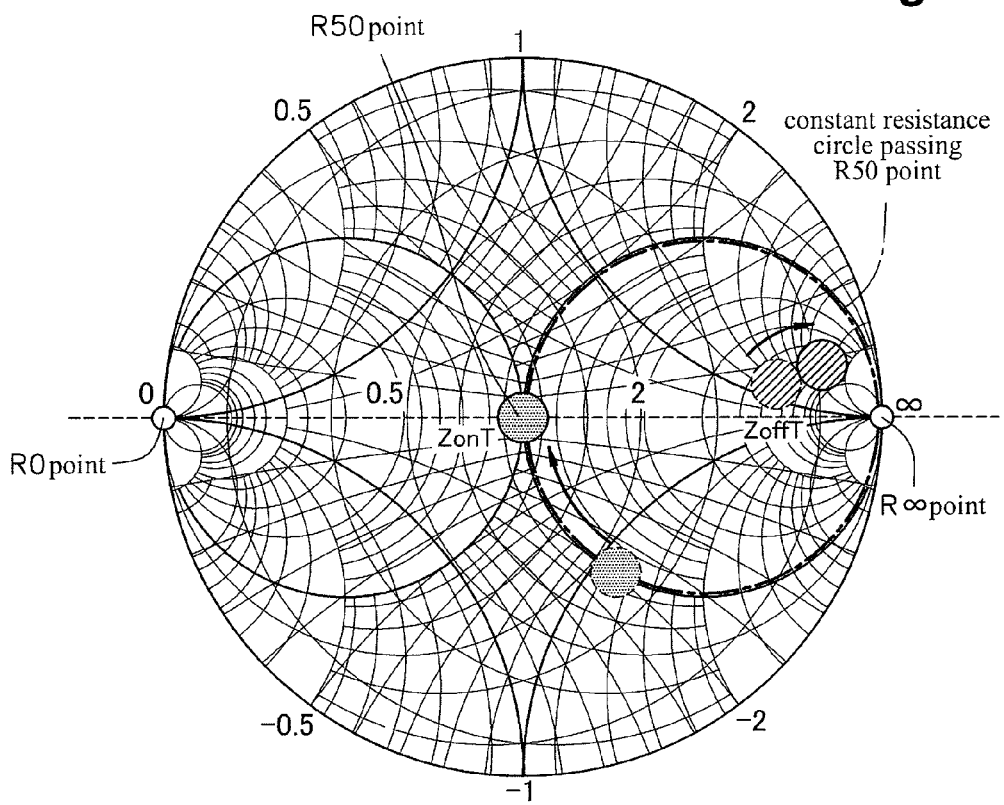
FIG. 38 is an explanatory diagram showing a change in the impedance of the output (CX4 in FIG. 34) of a first impedance matching circuit when the PA is activated (ON) and deactivated (OFF) PA.

It is to be noted that in FIGS. 27-29, the solid line circle with a dotted interior indicates the impedance after shifting when the PA 126 is ON, the broken line circle with a dotted interior indicates the impedance before shifting when the PA 126 is ON, the solid line circle hatched with oblique lines indicates the impedance after shifting when the PA 126 is OFF, and the broken line circle hatched with oblique lines indicates the impedance before shifting when the PA 126 is OFF (this also applies to FIGS. 36-38 described with regard to the third embodiment).

FIG. 28 shows an impedance change at the output of the first impedance matching circuit 131 (TX3 in FIG. 24). Namely, FIG. 28 shows the states before and after the impedance change caused by the capacitor C16 connected in parallel with the circuit. As is described with reference to FIG. 13*a*, the capacitor connected in parallel with the circuit causes the impedance to rotate clockwise on a circle tangent to the R0 point on the immittance chart. Since ZonT has been shifted onto "the constant conductance circle passing the R50 point" by the first impedance shifting circuit 130, ZonT can be moved onto the R50 point to achieve an impedance-matched state (a small voltage reflection coefficient Γ) without fail by appropriately selecting the capacitance of the capacitor C16 in the first impedance matching circuit 131.

On the other hand, ZoffT has been shifted by the first impedance shifting circuit 130 so as to have an imaginary part sign different from that of ZonT, and thus, the clockwise rotation of ZoffT on the constant conductance circle (in general, this constant conductance circle does not pass the R50 point, though it may pass the R50 point) shifts ZoffT such that the corresponding voltage reflection coefficient Γ increases.

Thus, in this operation, ZonT having an imaginary part positioned in the positive region is caused to rotate clockwise to minimize the reactance by addition of an electronic element having a negative imaginary part (imaginary part having the opposite sign) connected in parallel with the circuit (namely, the capacitor C16 in this embodiment). At the same time, ZoffT having a negative imaginary part (opposite to that of ZonT) is shifted so that the corresponding voltage reflection coefficient Γ increases (the reactance approaches zero).

In the second embodiment, the first impedance matching circuit 131 is formed of a capacitor connected in parallel with the circuit. However, if ZonT has a negative imaginary part, the first impedance matching circuit 131 should be formed of an inductor connected in parallel with the circuit, thereby to cause ZonT to rotate counterclockwise on the constant conductance circle passing the R50 point (see FIG. 13b) so as to shift ZonT on or near the R50 point. It is to be noted, however, that in the second embodiment, the PA 126 is supplied with DC electric power via the transmission circuit 37, and thus, in the case where the first impedance matching circuit 131 is formed of an inductor connected in parallel with the circuit, a DC cut structure will become necessary to prevent DC current from flowing to the ground.

FIG. 29 shows an impedance change at the output of the first phase adjustment circuit 132 (namely, at the output of the transmission circuit 37. TX4 in FIG. 24). The first phase adjustment circuit 132 in the second embodiment includes the transmission line LN2 (or a two-stage low-pass filter described with the modified embodiment) as describe above to shift the signal phase of the transmission signal, whereby the impedance rotates clockwise on a circle having its center at the R50 point. The amount of rotation of the impedance caused by the first phase adjustment circuit 132 is set such that ZoffT approaches the R∞ point (namely, to achieve a high impedance state). The line length of the transmission line LN2 or the parameters of the low-pass filter is determined accordingly.

Thus, the first phase adjustment circuit 132 increases the impedance (ZoffT) while maintaining the voltage reflection coefficient Γ corresponding to ZoffT. On the other hand, ZonT, when rotated by the first phase adjustment circuit 132, is kept from moving out of the region where the impedance-matched state is achieved, because ZonT has been shifted by the first impedance matching circuit 131 to the vicinity of the R50 point that is the rotation center.

In the case where a low-pass filter is used as the first phase adjustment circuit 132, it is preferred that the amount of shift of the signal phase be set such that the impedance rotates over one revolution on the immittance chart. In the illustrated embodiment, the first phase adjustment circuit 132 is configured to cause the signal phase of the transmission signal (intra-board wavelength λg) propagating in the aforementioned first board 59a to shift by slightly less than ¾ λg, such that the impedance rotates on the immittance chart about one and a half revolutions. To simply achieve phase adjustment, it is not necessary for the first phase adjustment circuit 132 to cause a phase shift beyond ½ λg. However, to improve the damping property and enhance the low-pass filter function of the first phase adjustment circuit 132 (removal of noise from the transmission signal and prevention of entry of noise from the power source line 45), it is desirable to design the first phase adjustment circuit 132 to cause a large signal phase shift, as described above. On the other hand, in view of the phase adjustment, the first phase adjustment circuit 132 is equivalent to an element shifting the signal phase by slightly less than ¼λg, and this causes the impedance of the transmission circuit 37 when the PA 126 is deactivated to shift from the vicinity of the R0 point to the vicinity of the R∞ point, thereby achieving a high impedance state.

In the foregoing example, description was made with an assumption that the initial state of the impedance of the PA 126 is as that shown in FIG. 26. However, the first impedance shifting circuit 130 may include appropriate structural elements for shifting a given state of the impedance of the PA 126 to the state shown in FIG. 27 via the state shown in FIG. 26. Thus, the first impedance shifting circuit 130 may be formed of a plurality of electronic elements (with regard to a concrete structure, refer to the second embodiment), so long as ZonT after being shifted by the electronic elements is in the vicinity of "the constant conductance circle passing the R50 point," as described in the foregoing.

Also, in the foregoing, description was made of the example where the first impedance shifting circuit 130 shifts ZonT on or in the vicinity of "the constant conductance circle passing the R50 point," but the first impedance shifting circuit 130 may be configured to shift ZonT on or in the vicinity of the "constant resistance circle passing the R50 point." In such a case, the first impedance matching circuit 131 should be configured to rotate ZonT along a constant resistance circle (clockwise or counterclockwise depending on the position of ZonT before being shifted by the first impedance matching circuit 131) (see FIGS. 12a and 12b).

In the following, with reference to FIGS. 30-33, detailed description will be given of the impedance state at points RX1 to RX4 (see FIG. 24) in the reception circuit 38 of the second embodiment.

In the following description, the impedance as seen from the antenna 13 toward the reception circuit 38 when the LNA 36 is activated (ON) is denoted by ZonR, and the impedance as seen from the antenna 13 toward the reception circuit 38 when the LNA 36 is deactivated (OFF) is denoted by ZoffR.

Figure 30:
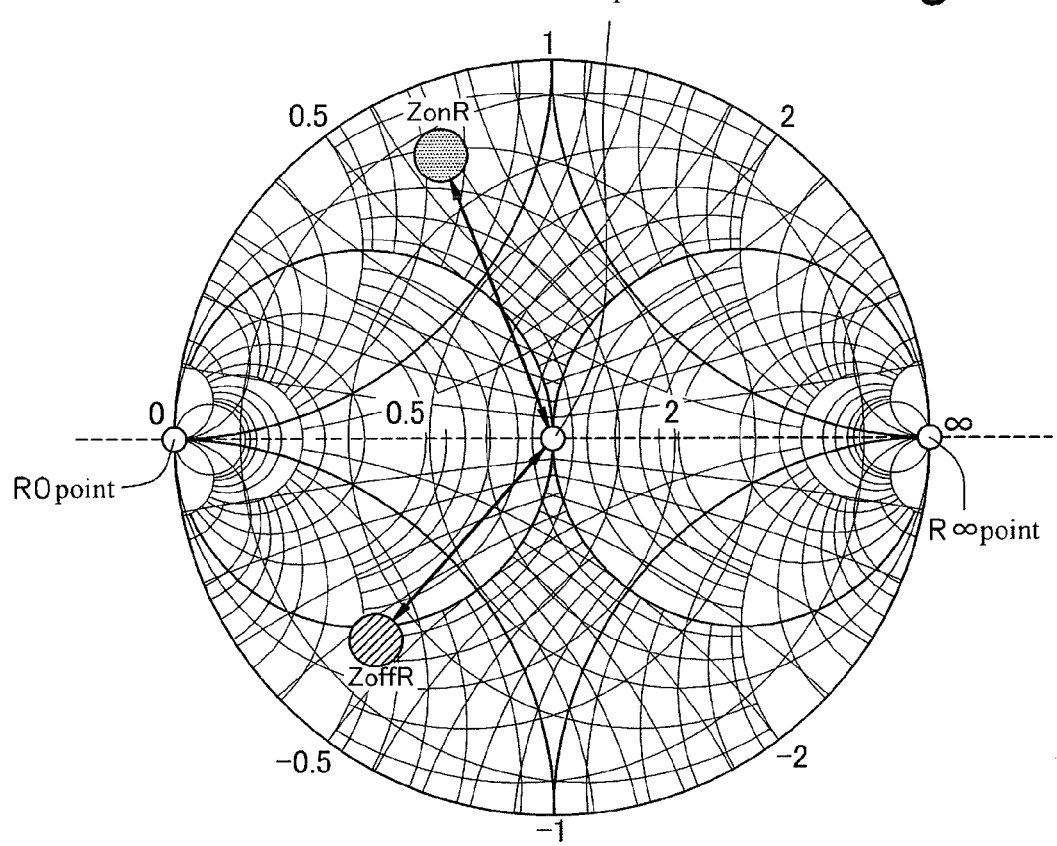
FIG. 30 is an explanatory diagram showing a measured impedance at the input (RX1 in FIG. 24) of the LNA when the LNA is activated (ON) and deactivated (OFF)

FIG. 30 shows an example of the impedance at the input of the LNA 36 (RX1 in FIG. 24) when the LNA 36 is activated and when the LNA is deactivated. The circle with a dotted interior indicates the impedance when the LNA 36 is activated, while the circle hatched with oblique lines indicates the impedance when the LNA 36 is deactivated.

In FIG. 30, these two circles are at a substantially same distance form the R50 point, and thus, correspond to a substantially same voltage reflection coefficient Γ.

Figure 31:
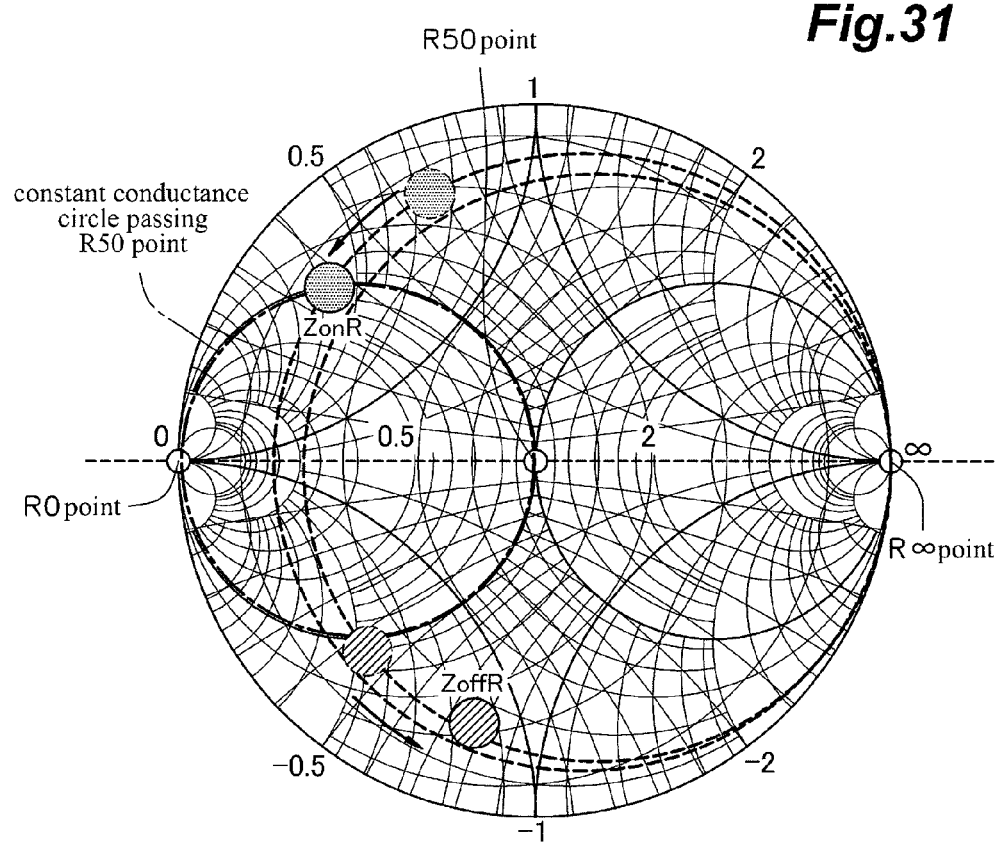
FIG. 31 is an explanatory diagram for explaining a change in the impedance caused by a capacitor C11 (RX2 in FIG. 24) when the LNA is activated (ON) and deactivated (OFF)

FIG. 31 shows an impedance change caused by a capacitor C17 (RX2 in FIG. 24) forming the second impedance shifting circuit 135. Addition of the capacitor C17 connected in series with the circuit causes the impedance to rotate counterclockwise on a circle tangent to the R∞ point (constant resistance circle), as described above with reference to FIG. 12a.

In the second impedance shifting circuit 135, the capacitance of the capacitor C17 is determined so as to shift ZonR onto the "constant conductance circle passing the R50 point" (or in the vicinity thereof). In the example shown in FIG. 31, ZonR and ZoffR have opposite signs of imaginary part from the beginning. However, if they have the same sign of the imaginary part, the second impedance shifting circuit 135 may be configured to shift ZonR and ZoffR such that they have opposite signs of imaginary part (similarly to the operation of the first impedance shifting circuit 130 described above).

Figure 32:
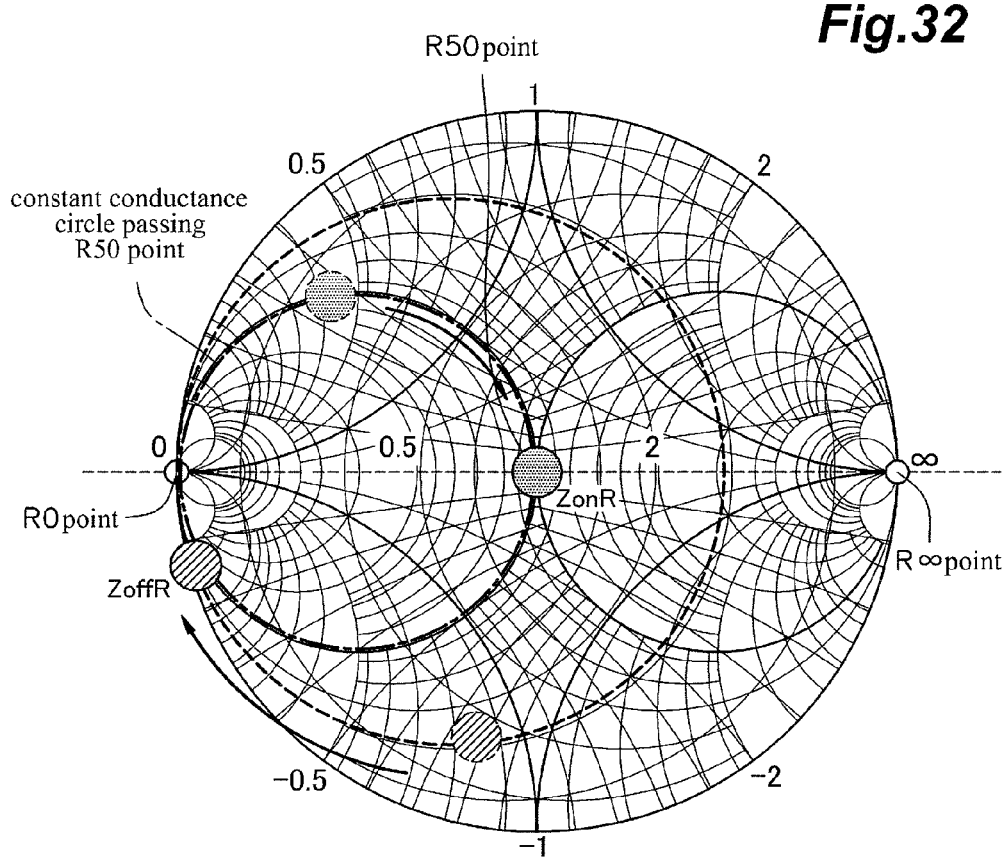
FIG. 32 is an explanatory diagram showing a change in the impedance of the input (RX3 in FIG. 24) of a second impedance matching circuit when the LNA is activated (ON) and deactivated (OFF)
Figure 33:
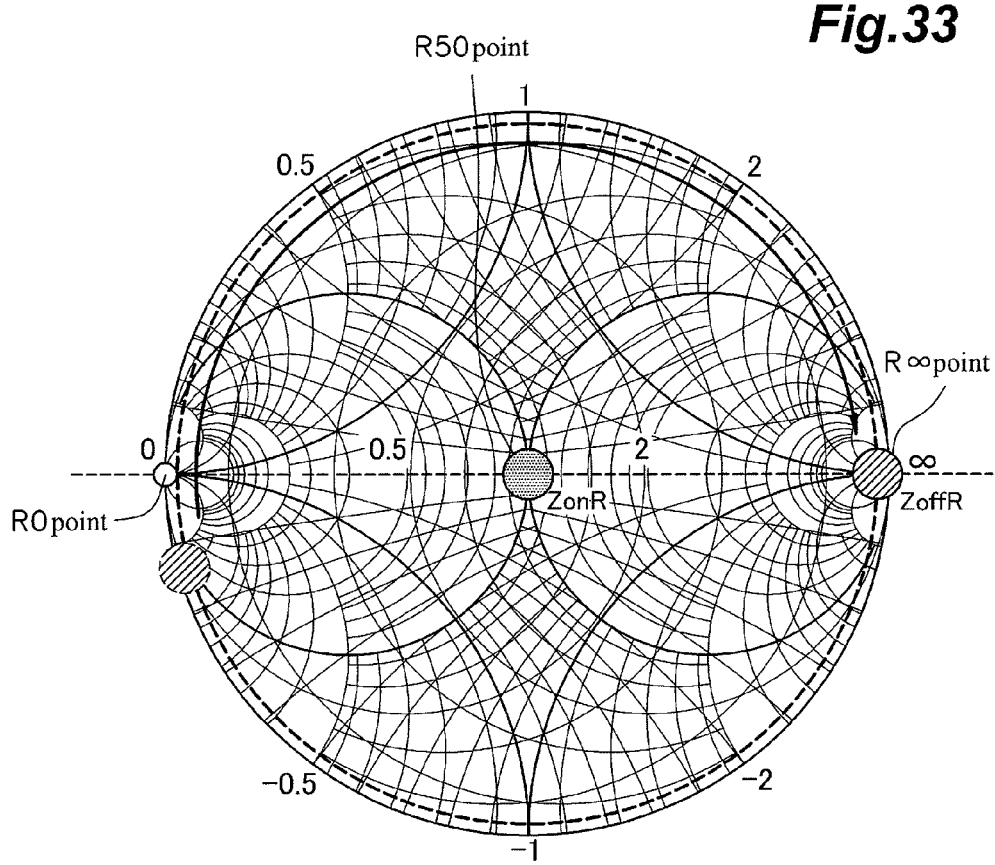
FIG. 33 is an explanatory diagram showing a change in the impedance of the input (RX4 in FIG. 24) of a second phase adjustment circuit when the LNA is activated (ON) and deactivated (OFF)

It is to be noted that in FIGS. 31-33, the solid line circle with a dotted interior indicates the impedance after shifting when the LNA 36 is ON, the broken line circle with a dotted interior indicates the impedance before shifting when the LNA 36 is ON, the solid line circle hatched with oblique lines indicates the impedance after shifting when the LNA 36 is OFF, and the broken line circle hatched with oblique lines indicates the impedance before shifting when the LNA 36 is OFF.

FIG. 32 shows an impedance change at the input of the second impedance matching circuit 134 (RX3 in FIG. 24). Namely, FIG. 32 shows the states before and after the impedance change caused by the capacitor C10 connected in parallel with the circuit. As is described with reference to FIG. 13a, the capacitor connected in parallel with the circuit causes the impedance to rotate clockwise on a circle tangent to the R0 point on the immittance chart. Since ZonR has been shifted onto "the constant conductance circle passing the R50 point" by the second impedance shifting circuit 135, ZonR can be moved onto the R50 point to achieve an impedance-matched state (a small voltage reflection coefficient Γ) without fail by appropriately selecting the capacitance of the capacitor C10 in the second impedance matching circuit 134.

On the other hand, since ZoffR and ZonR have opposite signs of imaginary part, ZoffR is caused to rotate clockwise on a constant conductance circle (as shown in FIG. 32, this constant conductance circle does not pass R50 point) to increase the voltage reflection coefficient Γ (the closer the impedance approaches the R0 point, the larger the voltage reflection coefficient Γ becomes).

FIG. 33 shows an impedance change at the input of the second phase adjustment circuit 133 (namely, at the input of the reception circuit 38. RX4 in FIG. 24). The second phase adjustment circuit 133 includes the transmission line LN3 to shift the signal phase of the reception signal, whereby ZoffR rotates clockwise on a circle having its center at the R50 point. The amount of rotation of the impedance caused by the second phase adjustment circuit 133 is set such that ZoffR approaches the R∞ point (namely, to achieve a high impedance state). The line length of the transmission line LN3 is determined accordingly. At this time, since ZonR has been shifted to the vicinity of the R50 point, the second phase adjustment circuit 133 virtually shifts only ZoffR.

(Third Embodiment)

In the following, description will be made of the third embodiment of the present invention with reference to FIGS. 34-38.

With regard to the structure, operation, function, etc. of the base unit 100 and the handset 200 of the wireless communication device, and the structure of the multi-layer board on which the electronic elements constituting the transmission circuit 37, etc., are formed of wiring patterns drawn on the board, the third embodiment is the same as the first embodiment, and thus, description of these features will be omitted.

Figure 34:
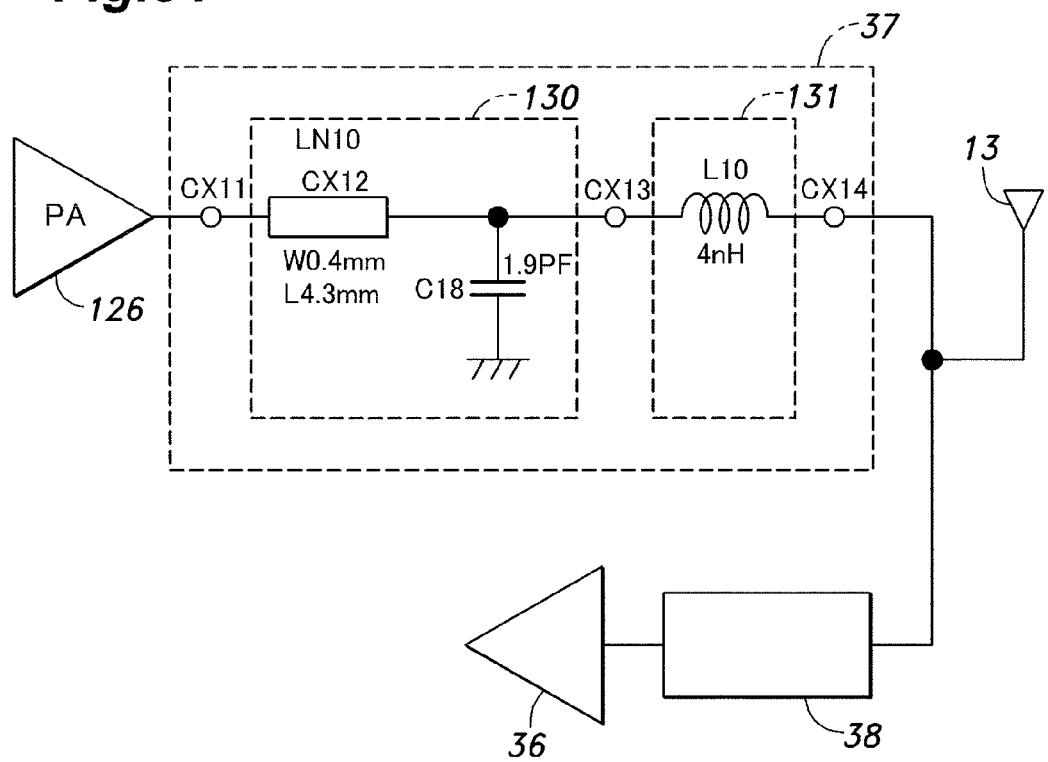
FIG. 34 is a block diagram showing a structure of a transmission circuit according to a third embodiment.

With reference to FIG. 34, the transmission circuit 37 in the third embodiment is formed of the first impedance shifting circuit 130 and the first impedance matching circuit 131, and in comparison with the second embodiment, the first phase adjustment circuit 132 (see FIG. 24) is omitted.

The first impedance shifting circuit 130 in the third embodiment is formed of a transmission line LN10 connected in series with the output of the PA 126 and a capacitor C18 having one end connected to the output end of the transmission line LN10 and the other end grounded. Thus, according to the structure of the third embodiment, ZonT is moved to the vicinity of "the constant resistance circle passing the R50 point" or "the constant conductance circle passing the R50 point" on the immittance chart by two shifting operations.

In the third embodiment, the transmission line LN10 is configured to have a width of 0.4 mm and a line length of 4.3 mm, the capacitor C18 is configured to have a capacitance of 1.9 pF, and the inductor L10 (described later) is configured to have an inductance of 4 nH.

The output from the first impedance shifting circuit 130 is input to the first impedance matching circuit 131. In the third embodiment, the first impedance matching circuit 131 is formed of an inductor L10 inserted in series to the circuit. The inductor L10 serves to shift ZonT to the vicinity of the R50 point to achieve an impedance-matched state, while shifting ZoffT to a sufficiently high impedance to achieve a high impedance state. Thus, in the third embodiment, the first impedance matching circuit 131 includes the function of the first phase adjustment circuit 132 in the second embodiment.

In the following, with reference to FIGS. 35-38, detailed description will be made of the change in ZonT and ZoffT at points CX11 to CX14 (see FIG. 34) in the transmission circuit 37 of the third embodiment.

Figure 35:
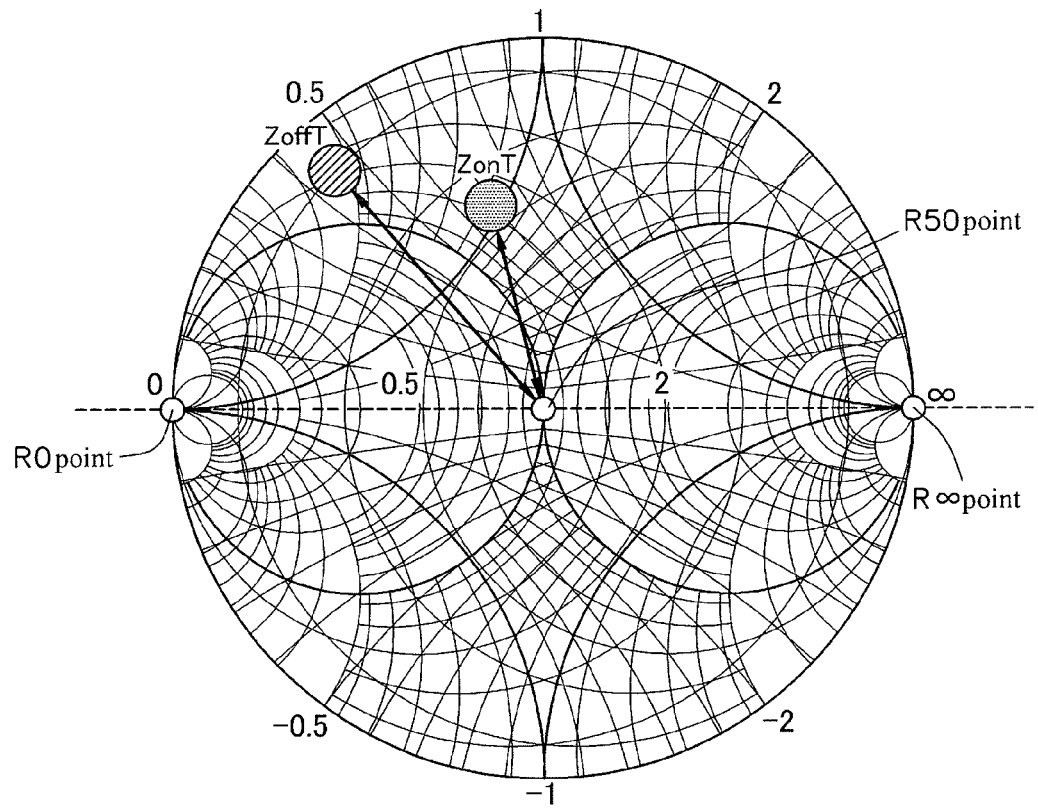
FIG. 35 is an explanatory diagram showing a measured impedance at the output (CX1 in FIG. 34) of the PA when the PA is activated (ON) and deactivated (OFF)

FIG. 35 shows an example of the impedance ZonT at the output of the PA 126 (CX11) when the PA 126 is activated (ON) and the impedance ZoffT at the output of the PA 126 when the PA 126 is deactivated (OFF). The circle with a dotted interior indicates the impedance when the PA 126 is activated, while the circle hatched with oblique lines indicates the impedance when the PA 126 is deactivated.

FIG. 36 shows an impedance change caused by the transmission line LN10 (CX12) forming the first impedance shifting circuit 130. The transmission line LN10 added in series with the circuit causes the signal phase in the line to shift, whereby the impedance rotates clockwise on a circle having the R50 point as its center, as described above with reference to FIG. 13c. The rotation of the impedance caused by the transmission line LN10 is a rotation about the R50 point, and therefore, the value of the voltage reflection coefficient Γ does not change before and after the rotation, for each of ZonT and ZoffT.

Here, attention is made to ZonT. It is possible to shift ZonT onto "the constant resistance circle passing the R50 point" (for example, to such a point denoted by Px1 or Px2) by a single electronic element, namely, by adjusting the line length of the transmission line LN10. However this is not the case in the third embodiment. The reason for this will be described below.

If ZonT were shifted to the point Px1, it would be necessary to connect a capacitor in series with the circuit as shown in FIG. 13a to shift ZonT from the point Px1 to the R50 point along "the constant resistance circle passing the R50 point." However, as described in the second embodiment, the PA 126 is supplied with DC power from outside via the transmission circuit 37, and thus, if a capacitor were connected in series with the circuit, the DC power supply to the PA 126 via the transmission circuit 37 would be prevented, and a DC bypass circuit would become necessary.

Further, if ZonT were shifted to the point Px2 at a time, the line length of the transmission line LN10 would become so long, making it practically impossible to form the transmission line LN10 on the first board 59a (see FIG. 6).

In the third embodiment, these problems are solved by forming the first impedance shifting circuit 130 of two electronic elements.

FIG. 37 shows an impedance change at the output of the first impedance shifting circuit 130 (CX13). Namely, FIG. 37 shows the states before and after the impedance change caused by the capacitor C 18 connected in parallel with the circuit. As is described with reference to FIG. 13a, the capacitor connected in parallel with the circuit causes the impedance to rotate clockwise on a circle tangent to the R0 point on the immittance chart. As a result, ZonT is shifted onto the point Px2 on "the constant resistance circle passing the R50 point."

It is to be noted here that the capacitance of the capacitor C10 should be selected such that ZonT and ZoffT after being shifted by the capacitor C10 have opposite signs of imaginary part. Specifically, in FIG. 37, ZonT and ZoffT are shifted such that ZonT has a negative imaginary part while ZoffT has a positive imaginary part. In this way, in the adjustment process described with reference to FIG. 38, when ZonT is caused to rotate on "the constant resistance circle passing the R50 point" so as to approach the R50 point, ZoffT is shifted without fail to a position corresponding to a larger voltage reflection coefficient Γ.

FIG. 38 shows an impedance change at the output of the first impedance matching circuit 131 (CX14). Namely, FIG. 38 shows the states before and after the impedance change caused by the inductor L10 connected in series with the circuit. As is described with reference to FIG. 13b, the inductor connected in series with the circuit causes the impedance to rotate clockwise on a circle tangent to the R∞ point on the immittance chart. Since ZonT has been shifted onto "the constant resistance circle passing the R50 point" by the first impedance shifting circuit 130, ZonT can be moved onto the R50 point to achieve an impedance-matched state (a small voltage reflection coefficient Γ) without fail by appropriately selecting the inductance of the inductor L10 in the first impedance matching circuit 131.

On the other hand, ZoffT has been shifted by the first impedance shifting circuit 130 so as to have an imaginary part sign different from that of ZonT, and thus, the clockwise rotation of ZoffT on the constant resistance circle (in general, this constant resistance circle does not pass the R50 point, though it may pass the R50 point) shifts ZoffT such that the corresponding voltage reflection coefficient Γ increases. Thus, in the third embodiment, the first impedance matching circuit 131 causes ZonT and ZoffT to rotate on the respective constant resistance circles, such that as ZonT approaches the R50 point, ZoffT moves to the vicinity of the R∞ point (namely, a high impedance state).

Thus, as in the structure shown in the third embodiment, there is a case in which the first phase adjustment circuit 132 (see FIG. 24) may be omitted when a structure for rotating ZonT on a constant resistance circle to achieve impedance matching is used. Of course, the first phase adjustment circuit 132 may be used to shift ZoffT to a sufficiently high impedance to achieve a high impedance state. For example, in the state shown in FIG. 38, it is possible to make ZoffT further approach the R∞ point (high impedance state) by adding a transmission line in series with the output end of the first impedance matching circuit 131.

In the third embodiment, the transmission circuit 37 as a whole forms a so-called T-type low-pass filter.

Further, in the third embodiment, the first impedance matching circuit 131 is formed of an inductor connected in series with the circuit. However, if ZonT has a positive imaginary part, the first impedance matching circuit 131 should be formed of a capacitor connected in series with the circuit, thereby to cause ZonT to rotate counterclockwise on the constant resistance circle passing the R50 point (see FIG. 12a) so as to shift ZonT on or near the R50 point. It is to be noted, however, that in a case where the PA 126 is supplied with DC electric power via the transmission circuit 37, if the first impedance matching circuit 131 is formed of a capacitor connected in series with the circuit, a DC bypass circuit will become necessary to feed DC current to the PA 126.

In the second embodiment and the third embodiment, each of the PA 126 and the LNA 36 is a single-ended type, but the present invention may be applicable to amplifiers having differential input/output terminals. In a case where amplifiers of a differential input/output type are used, a differential signal is converted to a single-ended signal between the first impedance matching circuit 131 and the first phase adjustment circuit 132, for example. This conversion may be performed by use of a balun, for example, and in such a case, the balun reduces the impedance of the transmission circuit (reception circuit) as seen from the antenna 13 to a half (½).

In such a case, the first impedance shifting circuit 130 described in the foregoing should be configured to shift ZonT onto "the constant conductance circle passing the 100Ω point on the real axis" of "the constant resistance circle passing the 100Ω point on the real axis" and the first impedance matching circuit 131 should be configured to further shift ZonT to "the 100Ω point on the real axis," so that the balun provided downstream of the first impedance matching circuit 131 reduces the value of ZonT on the real axis, whereby ZonT is shifted onto the R50 point to achieve an impedance-matched state. Further, by providing the first phase adjustment circuit 132 downstream of the balun, ZoffT can be shifted to a sufficiently high impedance to achieve a high impedance state.

In the foregoing, detailed description has been made of the wireless communication device according to the present invention in terms of the concrete embodiments. However, these embodiments are mere examples and the present invention should not be limited to these embodiments.

For example, each of the foregoing embodiments includes, as an electronic element, a capacitor having one end connected to the circuit and the other end grounded (i.e., a capacitor connected in parallel with the circuit). However, in some cases, a stub or an inductor connected in parallel with the circuit may be used in place of the capacitor. Further, theoretically, an inductor and/or a capacitor connected in series with the circuit may be used in some cases to achieve the effects of the present invention. It should be noted that not all of the structural elements illustrated in the foregoing embodiments are necessarily indispensable, and they may be selectively used as appropriate within the scope of the present invention present invention.

The wireless communication device according to the present invention allows an antenna switch module to be removed from the wireless communication device without complicating the structure, thereby reducing the power consumption and cost. Further, the wireless communication device can prevent the removal of the antenna switch module from adversely affecting the transmission and reception characteristics from deteriorating. Moreover, these effects can be achieved regardless of the characteristics of the power amplifier and/or low noise amplifier. Thus, the wireless communication device according to the present invention can be favorably used as wireless communication devices, such as mobile information terminals, having wireless transmission and reception functions and used in wireless communication systems, such as a cordless telephone system, a PHS, a WLAN and so.

The invention claimed is:

1. A wireless communication device, comprising:
a first amplifier that amplifies a transmission signal;
a transmission circuit that processes the transmission signal amplified by the first amplifier;
an antenna that transmits the transmission signal processed by the transmission circuit; and
a control unit that alternately activates and deactivates the first amplifier,
wherein, provided that an impedance as seen from the antenna toward the transmission circuit when the first amplifier is activated by the control unit is denoted by ZonT and an impedance as seen from the antenna toward the transmission circuit when the first amplifier is deactivated by the control unit is denoted by ZoffT,
the transmission circuit comprises:
a first impedance matching circuit that shifts ZonT and ZoffT such that ZonT matches an impedance of the antenna and an absolute value of a voltage reflection coefficient Γ corresponding to ZoffT increases; and
a first phase adjustment circuit that further shifts ZoffT to a high impedance state.

2. The wireless communication device according to claim 1, wherein the first impedance matching circuit comprises a first capacitor that matches ZonT with the impedance of the antenna.

3. The wireless communication device according to claim 2, wherein one end of the first capacitor is connected between the first amplifier and the first phase adjustment circuit and the other end of the first capacitor is grounded.

4. The wireless communication device according to claim 1, wherein the first phase adjustment circuit shifts ZoffT such that ZoffT becomes greater than 2×ZonT.

5. A wireless communication device, comprising:
an antenna;
a reception circuit that processes a reception signal received by the antenna;
a second amplifier that amplifies the reception signal processed by the reception circuit; and
a control unit that alternately activates and deactivates the second amplifier,
wherein, provided that an impedance as seen from the antenna toward the reception circuit when the second amplifier is activated by the control unit is denoted by ZonR and an impedance as seen from the antenna toward the reception circuit when the second amplifier is deactivated by the control unit is denoted by ZoffR,
the reception circuit comprises:
a second impedance matching circuit that shifts ZonR and ZoffR such that ZonR matches an impedance of the antenna and an absolute value of a voltage reflection coefficient Γ corresponding to ZoffR increases; and
a second phase adjustment circuit that further shifts ZoffR to a high impedance state.

6. The wireless communication device according to claim 5, wherein the second impedance matching circuit comprises a second capacitor that matches ZonR with the impedance of the antenna.

7. The wireless communication device according to claim 6, wherein one end of the second capacitor is connected between the second amplifier and the second phase adjustment circuit and the other end of the second capacitor is grounded.

8. The wireless communication device according to claim 5, wherein the second phase adjustment circuit shifts ZoffR such that ZoffR becomes greater than 2×ZonR.

9. A wireless communication device, comprising:
a first amplifier that amplifies a transmission signal;
a transmission circuit that processes the transmission signal amplified by the first amplifier;
an antenna that transmits the transmission signal processed by the transmission circuit;
a reception circuit that processes a reception signal received by the antenna;
a second amplifier that amplifies the reception signal processed by the reception circuit; and
a control unit that alternately and exclusively activates the first and second amplifiers,
wherein, provided that an impedance as seen from the antenna toward the transmission circuit when the first amplifier is activated by the control unit is denoted by ZonT and an impedance as seen from the antenna toward the transmission circuit when the first amplifier is deactivated by the control unit is denoted by ZoffT, and provided that an impedance as seen from the antenna toward the reception circuit when the second amplifier is activated by the control unit is denoted by ZonR and an impedance as seen from the antenna toward the reception circuit when the second amplifier is deactivated by the control unit is denoted by ZoffR,
the transmission circuit comprises:
a first impedance matching circuit that shifts ZonT and ZoffT such that a voltage reflection coefficient Γ corresponding to ZonT is in the vicinity of zero (0) and an absolute value of a voltage reflection coefficient Γ corresponding to ZoffT increases; and
a first phase adjustment circuit that further shifts ZoffT to a high impedance state, and
the reception circuit comprises:
a second impedance matching circuit that shifts ZonR and ZoffR such that a voltage reflection coefficient Γ corresponding to ZonR is in the vicinity of zero (0) and an absolute value of a voltage reflection coefficient Γ corresponding to ZoffR increases; and
a second phase adjustment circuit that further shifts ZoffR to a high impedance state.

10. The wireless communication device according to claim 9, wherein the first impedance matching circuit comprises a first capacitor, one end of the first capacitor connected between the first amplifier and the first phase adjustment circuit and the other end of the first capacitor grounded.

11. The wireless communication device according to claim 9, wherein the second impedance matching circuit comprises a second capacitor, one end of the second capacitor connected between the second amplifier and the second phase adjustment circuit and the other end of the second capacitor grounded.

12. The wireless communication device according to claim 9, wherein the first phase adjustment circuit shifts ZoffT such that ZoffT becomes greater than 2×ZonT, and the second phase adjustment circuit shifts ZoffR such that ZoffR becomes greater than 2×ZonR.

13. The wireless communication device according to claim 9, wherein, provided that a wavelength of the transmission signal in the transmission circuit is denoted by $\lambda g$, the first phase adjustment circuit changes a phase of the transmission signal by more than $\frac{1}{2} \lambda g$.

14. The wireless communication device according to claim 9, wherein inductors and capacitors constituting the first impedance matching circuit, the first phase adjustment circuit, the second impedance matching circuit and the second phase adjustment circuit are formed of wiring patterns.

15. The wireless communication device according to claim 14, further comprising:
a first board having the wiring patterns formed thereon; and
second and third boards each having a ground pattern formed thereon, the second and third boards sandwiching the first board therebetween such that the ground patterns overlap the wiring patterns.

16. The wireless communication device according to claim 9, wherein the first phase adjustment circuit comprises first stage Π-type low-pass filter and a second stage Π-type low-pass filter connected in series with each other, wherein a single capacitor is commonly used as a capacitor disposed at an output of the first stage low-pass filter and as a capacitor disposed at an input of the second low-pass filter.

17. The wireless communication device according to claim 9, wherein
the first amplifier is configured to output a differential signal,
the transmission circuit includes a first balun disposed between the first impedance matching circuit and the first phase adjustment circuit and configured to convert a differential signal to a single-ended signal, and
the first balun including a parallel circuit that shifts ZoffT such that the absolute value of the voltage reflection coefficient Γ corresponding to ZoffT increases.

18. The wireless communication device according to claim 9, wherein the second amplifier is configured to receive a differential signal, the reception circuit includes a second balun disposed between the second impedance matching circuit and the second phase adjustment circuit and configured to convert a single-ended signal to a differential signal, and the second balun including a parallel circuit that shifts ZoffR such that the absolute value of the voltage reflection coefficient $\Gamma$ corresponding to ZoffR increases.

19. The wireless communication device according to claim 18, wherein the second balun comprises a resonator having a band-pass filter characteristic.

* * * * *